(12) United States Patent
Stehling et al.

(10) Patent No.: US 7,775,167 B2
(45) Date of Patent: Aug. 17, 2010

(54) CUSTOM PLANTER AND METHOD OF CUSTOM PLANTING

(75) Inventors: Sam Stehling, Monmouth, IL (US); Kevin L. Deppermann, St. Charles, MO (US); Brian J. Forinash, St. Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 133 days.

(21) Appl. No.: 11/841,421

(22) Filed: Aug. 20, 2007

(65) Prior Publication Data
US 2008/0047475 A1 Feb. 28, 2008

Related U.S. Application Data

(60) Provisional application No. 60/839,168, filed on Aug. 22, 2006.

(51) Int. Cl.
*A01C 5/00* (2006.01)
*A01C 7/18* (2006.01)
*A01C 15/00* (2006.01)

(52) U.S. Cl. .................................. 111/69; 111/200
(58) Field of Classification Search .................. 111/69, 111/200, 900
See application file for complete search history.

(56) References Cited

U.S. PATENT DOCUMENTS

| | | | |
|---|---|---|---|
| 4,407,371 A | 10/1983 | Hohl | |
| 4,771,713 A | 9/1988 | Kinzenbaw | |
| 5,170,730 A | 12/1992 | Swallow | |
| 5,535,917 A | 7/1996 | Ribouleau | |
| 5,913,915 A | 6/1999 | McQuinn | |
| 5,915,313 A | 6/1999 | Bender et al. | |
| 6,070,538 A | 6/2000 | Flamme et al. | |
| 6,474,500 B1 | 11/2002 | Carr et al. | |
| 6,615,754 B2 | 9/2003 | Unruh et al. | |
| 6,672,228 B1 | 1/2004 | Groelz et al. | |
| 7,174,839 B2 | 2/2007 | Tsing | |
| 2002/0062771 A1 | 5/2002 | Unruh et al. | |

(Continued)

FOREIGN PATENT DOCUMENTS

CL 233-92 3/1992

(Continued)

*Primary Examiner*—Christopher J. Novosad
(74) *Attorney, Agent, or Firm*—James E. Davis; Joseph A. Schaper; Harness, Dickey & Pierce, P.L.C.

(57) ABSTRACT

A planter for planting multiple rows of seeds in which the spacing between rows and the spacing between seeds in a row can be varied includes at least two planting units, each planting unit adapted for planting a row of seeds, the planting units being mounted so that the spacing between the at least two of the planting units can be changed, and the rate of planting of at least one of the planting units being independently changeable. A method of planting seeds in a field with a multi-row planter having a plurality of planting units each adapted for planting a row of seeds, includes selectively changing at least one of the spacing between at least two adjacent planting units and the rate of operation of at least one of the planting units during the planting so that at least one of the row spacing or the seed spacing in the rows is not uniform across the planted field.

22 Claims, 51 Drawing Sheets

U.S. PATENT DOCUMENTS

2006/0243179 A1 11/2006 Landphair

FOREIGN PATENT DOCUMENTS

| CL | 1085-06 | 5/2006 |
| DE | 1457765 | 12/1969 |
| DE | 39 17 438 C1 | 10/1990 |
| DE | 3917438 C1 | 10/1990 |
| DE | 297 18 303 U1 | 1/1998 |
| DE | 29718303 | 1/1998 |
| EP | 0636305 | 2/1995 |
| WO | WO-2006/121973 | 11/2006 |

CUSTOM PLANTER AND METHOD OF CUSTOM PLANTING

CROSS-REFERENCE TO RELATED APPLICATIONS

This application claims the benefit of U.S. Provisional Patent Application Ser. No. 60/839,168, filed Aug. 22, 2006, the entire disclosure of which is incorporated herein by reference.

BACKGROUND

This present disclosure relates to planters and methods of planting, and in particular to planters for, and methods of, planting custom plots with different types of seeds.

Modern planters can reliably simultaneously plant twelve or more rows as the planter traverses a field. With such planters, large fields can be quickly planted. However, with existing planters it can be difficult to plant small plots, such as are planted during seed tests. When it is desired to plant small plots of different types of seeds, for example when planting test plots of different seed varieties, seeds of a first variety must be loaded into the hoppers of the individual planting units on the planter, and the planter traversed across the field to plant a first plot. After the first plot is completed, the planter must be stopped so that the first variety of seeds can be manually removed from the hoppers and a new variety of seed loaded in the hopper. This process must be repeated each time a plot of a new variety of seed is desired.

When planting test plots, relatively skilled personnel are typically involved in either performing or supervising the complex task of manually changing the seeds in the planters, to ensure that the proper seeds are used. For widespread field testing, skilled personal must be widely deployed, consuming wasting valuable various time and increasing costs.

SUMMARY

Embodiments of planters of the present disclosure provide a planter that facilitates planting of plots of different kinds of seeds, as is often done in planting test plots of different seeds, and which may become more popular as farmers try to match the seed variety being planted with local conditions within a field. Similarly, embodiments of the methods of the present disclosure provide for the planting of plots of different seeds, for example for testing purposes or for matching the kinds of seeds being planted with the local conditions within a field.

Various embodiments of a planter constructed according to the principles of the present disclosure comprise a planter with a plurality of individual planting units. These planting units can be mounted on extensible booms that can be stowed to facilitate moving and storing the planter when the booms are not in use. The planter can also include a storage system for separately storing two or more varieties of seeds. A transfer system transfers seed between the storage system and the planting units.

Various embodiments of a method of planting according to the principles of the present disclosure comprise preparing a predetermined planting plan, loading the seeds for the predetermined plan into a storage unit, transferring seeds for a test plot from the storage system to the planting units, and traversing a field with the planter to plant the seeds in a test plot. If there is another test plot to plant according to the predetermined plan, then the seeds for the next test plot are transferred from the storage system to the planting units.

Various embodiments of planters in accordance with the principles of the present disclosure provide for the fast and automatic change of the seeds in the individual planting units, facilitating the planting of plots of different types of seeds in the same field. Various embodiments of the planting methods of the present disclosure provide for the organized planting of plots of different types of seeds in the same field, with a minimum of field supervision, freeing skilled personal from manual labor to concentrate on the design of planting plans and other more important tasks. Various embodiments of the planter and method facilitate the automation of the entire planting process from the distribution of seeds, the loading of the planters, to the planting of plots. The principles of the present disclosure have applicability both to small test plots for seed testing, and to customized production planting of precision agriculture. These and other features and advantages will be in part apparent and in part pointed out hereinafter.

BRIEF DESCRIPTION OF THE DRAWINGS

Corresponding reference numerals indicate corresponding parts throughout the several views of the drawings.

DETAILED DESCRIPTION

Figure 1:
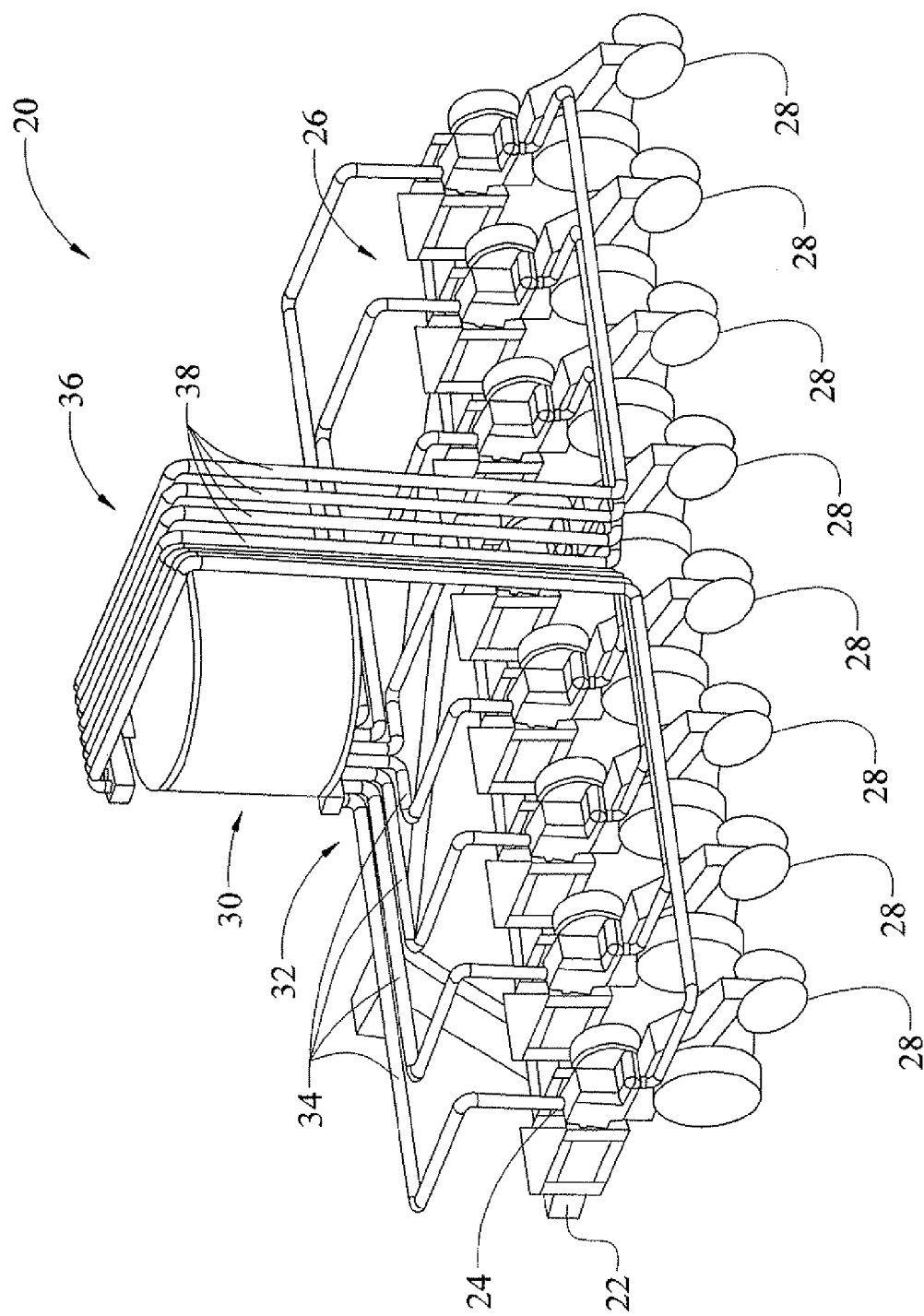
FIG. 1 is a schematic diagram of a planter constructed in accordance with various embodiments and implementations of the principles of the present disclosure.

Referring to FIG. 1, in various embodiments of the present disclosure, a multi-row planter 20 is provided. The planter 20 can be towed, or it can be incorporated on a tractor so that it is self propelled. Generally the planter 20 comprises a frame 22 with two extensible booms 24, 26. A plurality (eight in FIG. 1) of individual planting units 28 are mounted on the booms 24 and 26. The planter 20 also includes a seed storage system 30. The seed storage system 30 may be a 24-compartment rotating hopper, or some other device with sufficient capacity (both in number of seed types and in quantity).

A seed transportation system 32 transports seeds from a selected one of the compartments of the seed storage system 30. As shown in FIG. 1 the seed transportation system 32 comprises a plurality of tubes 34 extending between the storage system 30 and each of the individual planting units. A pneumatic system conducts seeds through the tubes 34. While the system illustrated in FIG. 1 shows parallel connections between the storage device and the individual planting units, the storage device could be connected to the individual planters in one or more series connections, in which case a valve may be provided to control the flow of seeds among the serially connected planting units. A seed transportation system 36 transports seeds from the individual planting units to the storage device. As shown in FIG. 1, the seed transportation system 36 comprises a plurality of tubes 38 extending between each of the individual planting units and the storage system 30. While the system illustrated in FIG. 1 shows parallel connections between the individual planting units and the storage system, the individual planting units can be connected to the storage device in one or more series connections, although a series return path generally is not as well suited for transporting seeds to the storage device, it is still comprehended by the present disclosure.

Referring now to FIGS. 2-18, in various other embodiments of the present disclosure, the planter 20 can be modified to provide a multi-row planter 100. The planter 100 comprises a frame 102, and having a transversely extending support member 104, and left and right pivotable support members 106 and 108. A plurality (six in FIGS. 2-18) of individual planting units 110 are mounted on the support members 104, 106 and 108. In various embodiments, four of the planting units 110 are mounted on the support member 104, and one planting unit 110 is mounted on each of the left and right pivotable support members 106 and 108. Generally, the planter 100 can be configured to be collapsed or folded to a width such that it can meet Department Of Transportation (DOT) standards and travel on conventional roads, for example approximately one-hundred-two inches or less. Thus, in the various embodiments, the center two of the four planting units 110 on the support member 104 are fixedly mounted, and the planting units 110 on the left and right ends are mounted to translate toward the center the support members. The supports 106 and 108 are mounted to pivot about a vertical axis and swing forwardly. The planting units 110 on the supports 106 and 108 can pivot upwardly about a generally horizontal axis to stowed position.

The planting units 110 can be conventional planting units. In other various embodiments additional planting units may be provided to allow for planting up to twelve rows of seed, e.g., corn. Additional planting units 110 may also be provided to enable the planting of various other types of seed, such as soybean seed. The units 110 can be adapted to handle more than one type of seeds or can be quickly converted to handle a single type of seed.

The planter 100 also includes a superstructure 112 supporting a seed storage system 114. The planter 100 also includes a seed transport system 116 for transporting seeds from the seed storage system 114 to the planting units 110, and a seed transport system 118 for transporting seeds from the planting units 110 to the seed storage system 114.

As shown in the Figures, the seed storage system 114 comprises a plurality of hoppers 120 (40 as shown in the Figures). The hoppers 120 are mounted on a plurality of wheels 122 (FIG. 17) which rolls on a platform 123 for rotation about a generally vertical axis. The hoppers 120 rotate to bring a particular hopper 120 into alignment with an inlet funnel 124 of the seed transport system 116. A conduit 126 extends from the funnel 124 in series to each of the planters 110. The conduit 126 extends to a valve 128 (FIG. 4) mounted on each of the planters 110. Seeds from the hoppers 120 are drawn through the conduit 126, through each of the valves 128, to each of the planters 110. A blower 130 mounted on the superstructure 112 is connected to a manifold 132 extending transversely across the planter 100. A plurality of ducts 134 extends from the manifold 132 to each of the planting units 110. The blower 130 is driven, for example by hydraulic power provided by hydraulic lines 133 (FIG. 5) or by electrical power, to create suction at each planting unit 110 via manifold 132 and duct 134. By opening the valves 128, the suction provided by the blower 130 at each planting unit 110 can draw seeds through the conduit 126 to each of the planting units. The blower 130 can also apply positive pressure to the conduit 126 via a duct 135 which extends between the outlet of the blower and the funnel 124.

The seed transport system 118 includes a plurality of conduits 136 extending from each of the planting units 110 to a funnel 138 above the hoppers 120. A second blower 140 mounted on the superstructure 112, is connected to two ducts 142 and 144 which connect to the funnel 138 to draw air from the funnel, drawing air and seeds from the planting units 110 to the funnel, and back into the appropriate hopper 120. The second blower 140 can be driven hydraulically, with hydraulic lines 146.

The planter 100 can be towed or transported on a trailer to the field where it is used. The planter 100 is adapted to be towed, for example by a conventional tractor. However, it is envisioned that the planter can be incorporated into a conventional over the road vehicle that could also be driven across fields.

The planter 100 is prepared for use by rotating the planting units 110 on supports 106 and 108 into an operative position, and then pivoting supports 106 and 108 into alignment with support 104. The planting units 110 on the support 104 are translated to their operative positions. The supports 104, 106, and 108 are locked into operative position. The hydraulic lines 133 and 146 are connected to a supply of pressurized hydraulic fluid.

The hoppers 120 are rotated to bring the appropriate hopper 120 into alignment with the funnel 124. A gate at the bottom of the selected hopper 120 is operated to allow seed to flow into the funnel 124. When the appropriate amount of seed has been metered out, the gate is closed. The seeds in the funnel are distributed to each of the planting units 110. Blower 130 is operated to draw air from each planting unit, through the ducts 134 and the manifold 132. Seeds are drawn from the funnel 124 through the conduit 126 to the valves 128. The valves 128 are operated to load each planting unit 110 with seeds. Air pressure from the blower 130 is also delivered to the funnel 124 via conduit 135 to facilitate the flow of seeds through the conduit 136 to the planting units 110. Once the individual planting units 110 are filled, the planter 100 is operated across a field, each planting unit 110 planting a row of seeds. When the desired amount of seeds has been planted, each planting unit 110 is emptied of seeds. This is conveniently done by operating blower 140, which draws air from the funnel 138 via ducts 142 and 144. This draws air and seeds from the individual planting units 110 through conduits 137. The funnel 138 deposits the seeds back into the appropriate hopper 120. Once all of the seeds have been returned to the storage system 114, another variety of seeds can be transported from one of the hoppers 120 to the planting units 110, and the process repeated until all of the desired seed varieties have been planted.

Figure 19:
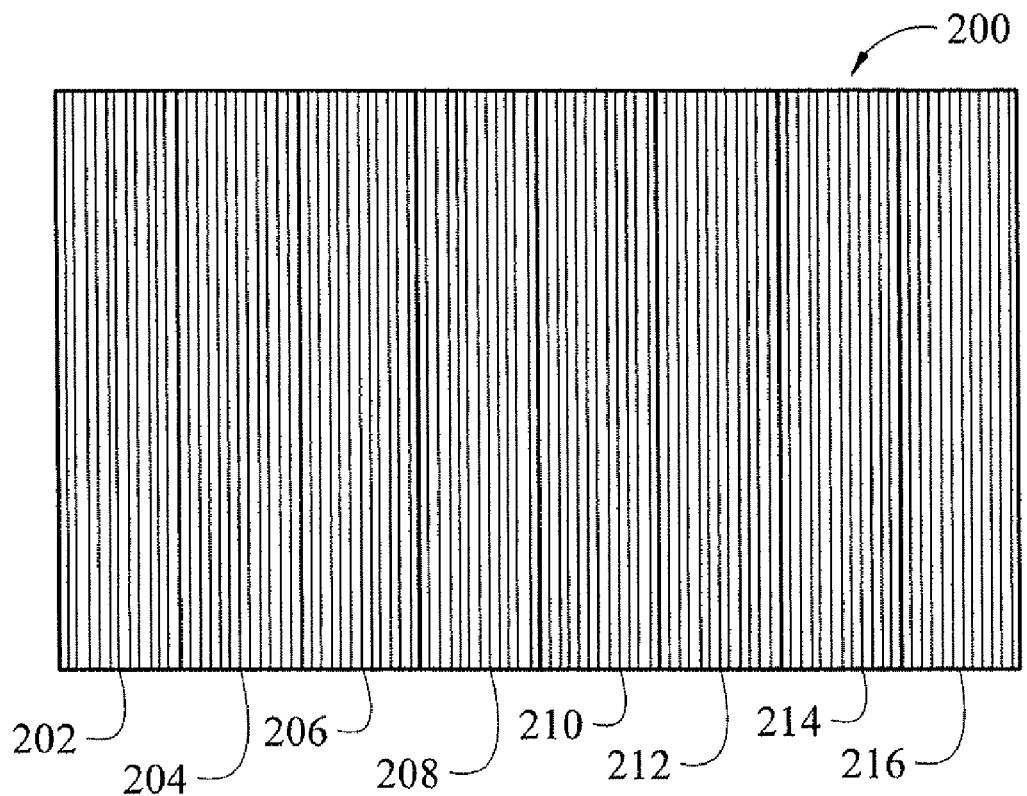
FIG. 19 is a schematic diagram of a field comprising a plurality of plots of different seed varieties.

Various embodiments of the planter and of the methods of the present disclosure provide for and facilitate the planting of individual plots of different seeds in the same field. Thus, as illustrated schematically in FIG. 19, a field indicated generally as 200 can be planted as a plurality of individual plots 202, 204, 206, 208, 210, 212, 214, and 216. Each of the plots 202-216 can extend across the entire field 200 so that each plot can be planted with one or more complete passes across the field for convenience in planting. Each plot comprises a plurality of rows, for example twelve. In the case of field testing, the center rows of each plot would typically be harvested for evaluation purposes, with the outer rows serving as protective barriers from adjacent plots.

Referring now to FIGS. 19-22, it should be understood that the various methods described herein, can be executed and carrying out implementing a suitable multi-row planter such as the planter 20, shown and described above with reference to FIG. 1, or the planter 100, shown and described above in reference to FIGS. 2-18, or the planter 603, shown and described below in FIGS. 23-36.

Figure 20:
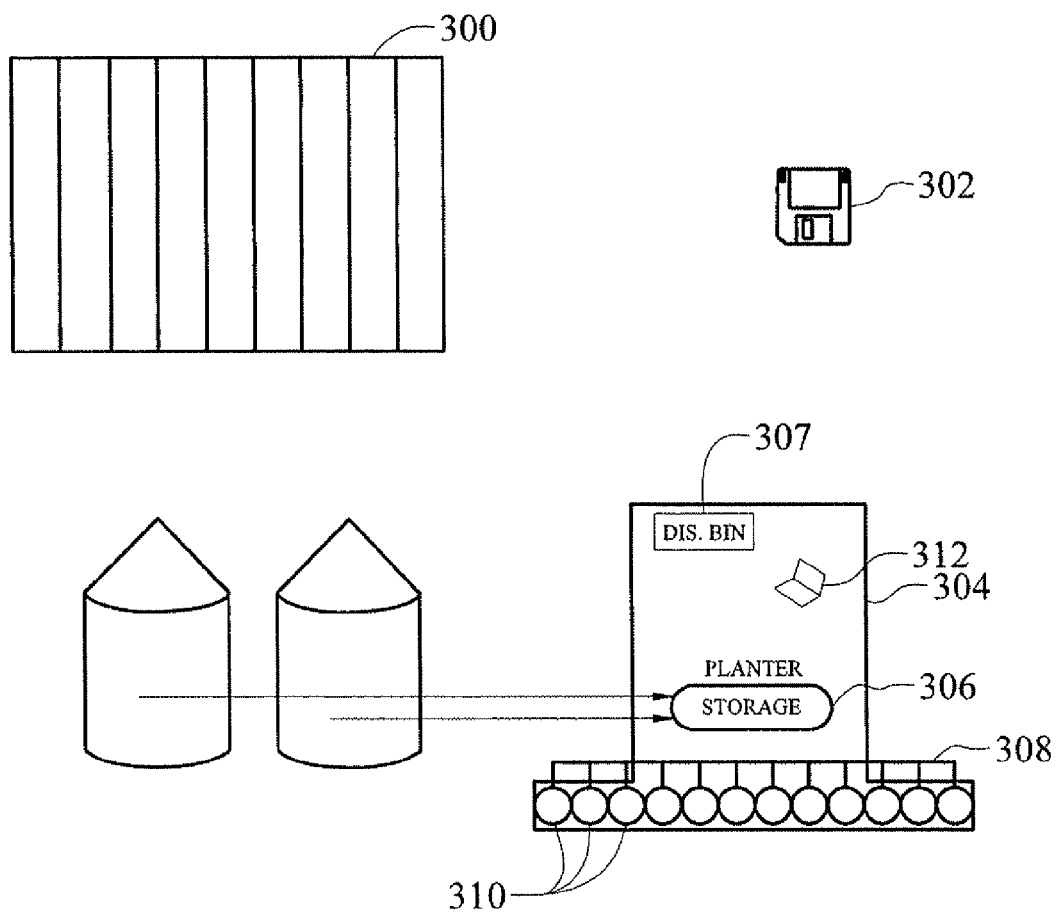
FIG. 20 is a schematic diagram of various embodiments of methods in accordance with various embodiments and implementations of the principles of the present disclosure.
Figure 21:
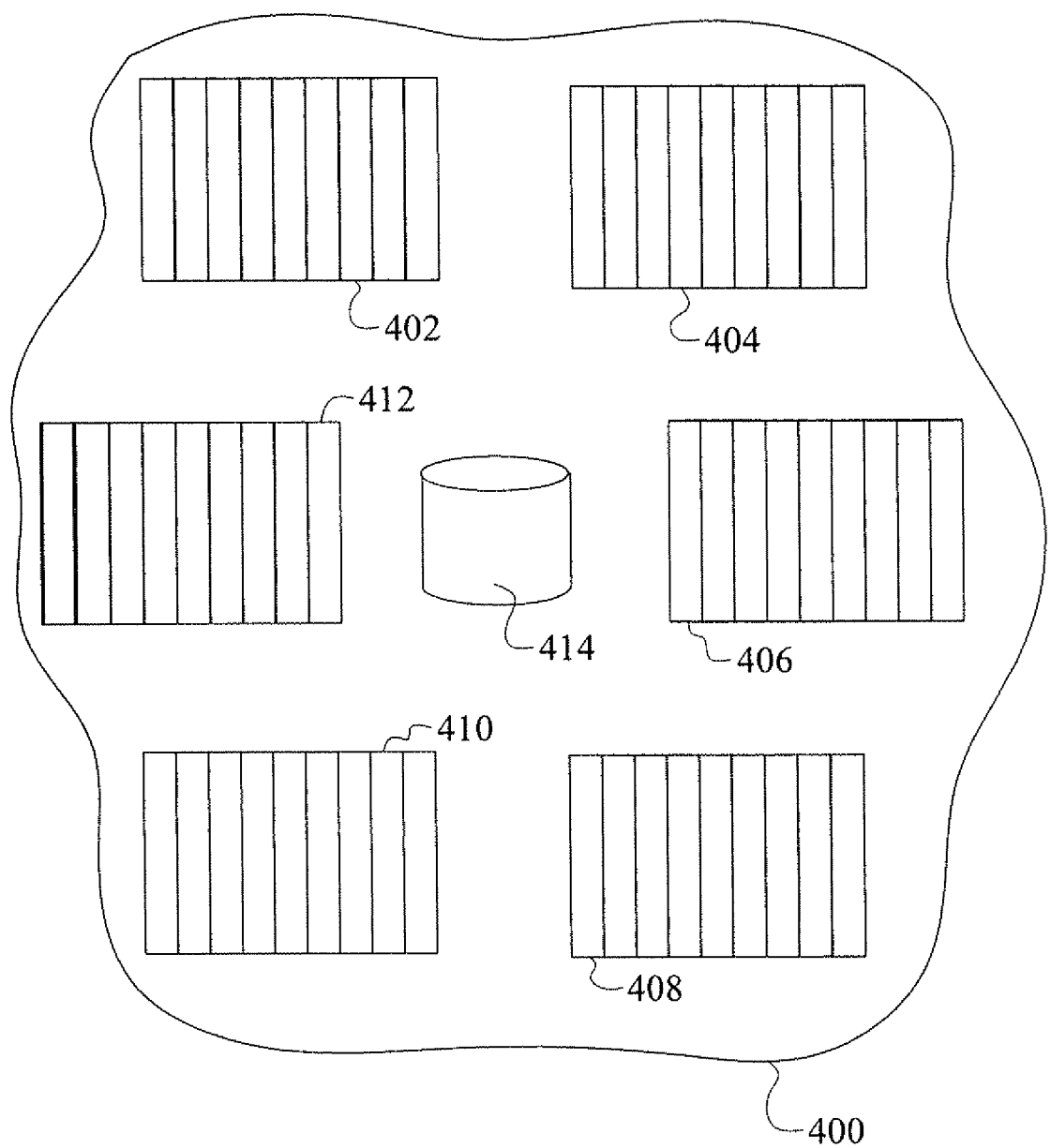
FIG. 21 is a schematic diagram of a test area comprising a plurality of test fields and served by a central distribution location, in accordance with various embodiments and implementations of the principles of the present disclosure.

In accordance with various embodiments, a method for the planting of plots of different seeds in a field, as is common in the testing of seed varieties, is illustrated in FIG. 20. This method provides for the planting of plots of different seeds in a field, as is common in the testing of seed varieties. The ability to plant plots of different seeds also facilitates the tailoring of planting to local conditions within a field for optimum production. Thus, seeds for the particular local soil and other conditions can be selected and planted within a field, rather than planting the entire field with a single variety of seed.

Broadly, the method of the various embodiments comprises loading a multi-row planter, e.g., planter 20, 100 or 603, with a first seed type. The planter traverses the field (e.g. field 200 in FIG. 19), planting a plot of the first seed in a portion of the field. After the first plot (e.g. 202 in FIG. 19) is planted, the seed remaining in the planter is automatically removed. A second seed is then automatically loaded into the planter. The planter again traverses the field, plating a second plot (e.g., 204 in FIG. 19). This process can be repeated for each variety of seed to be planted. This results in a field similar to field 200, comprising a plurality of plots 202-216.

Figure 2:
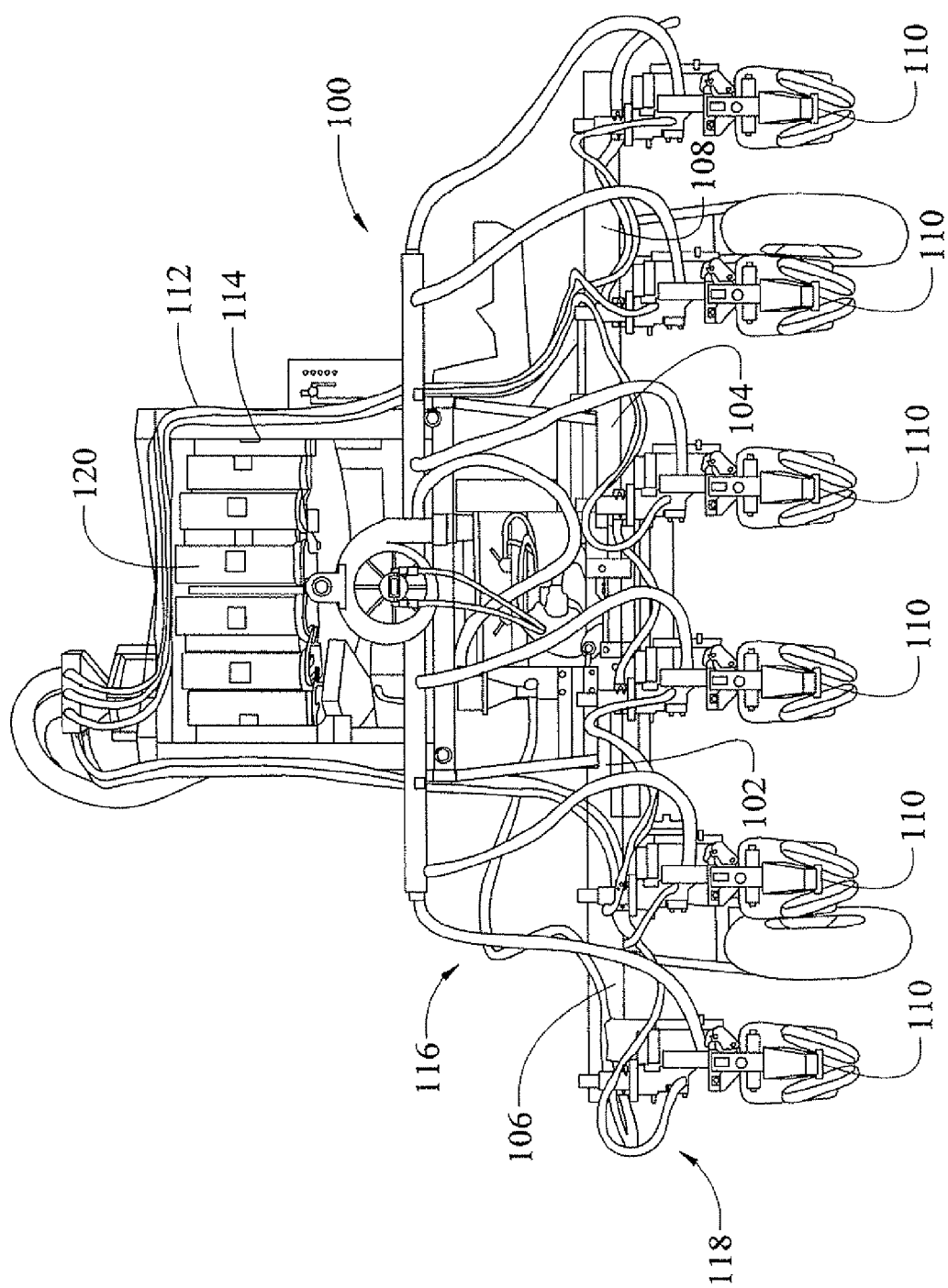
FIG. 2 is a rear elevation view of various embodiments of a planter in accordance with various other embodiments and implementations of the principles of the present disclosure.
Figure 3:
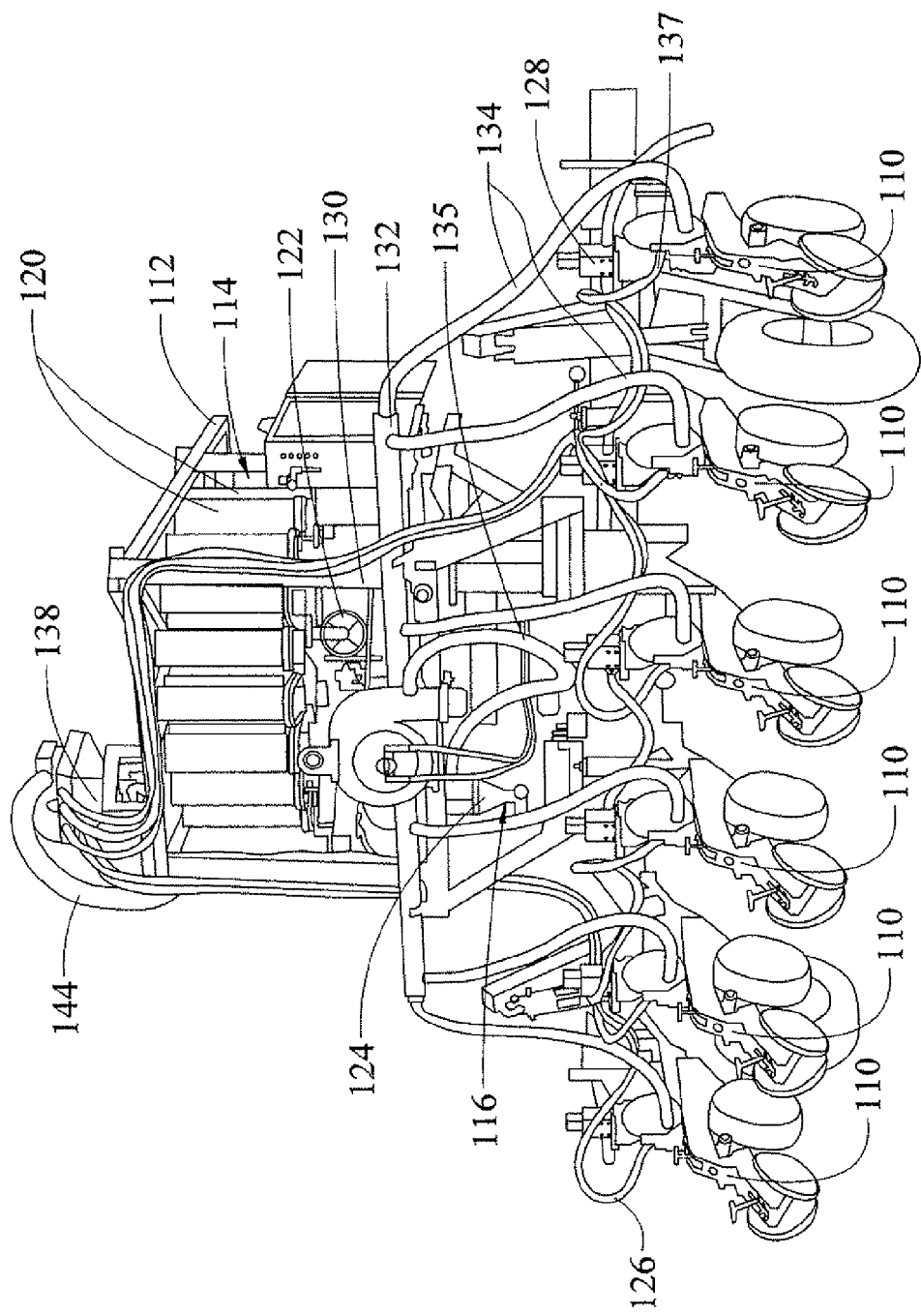
FIG. 3 is a rear perspective view of the various embodiments of the planter shown in FIG. 2.
Figure 4:
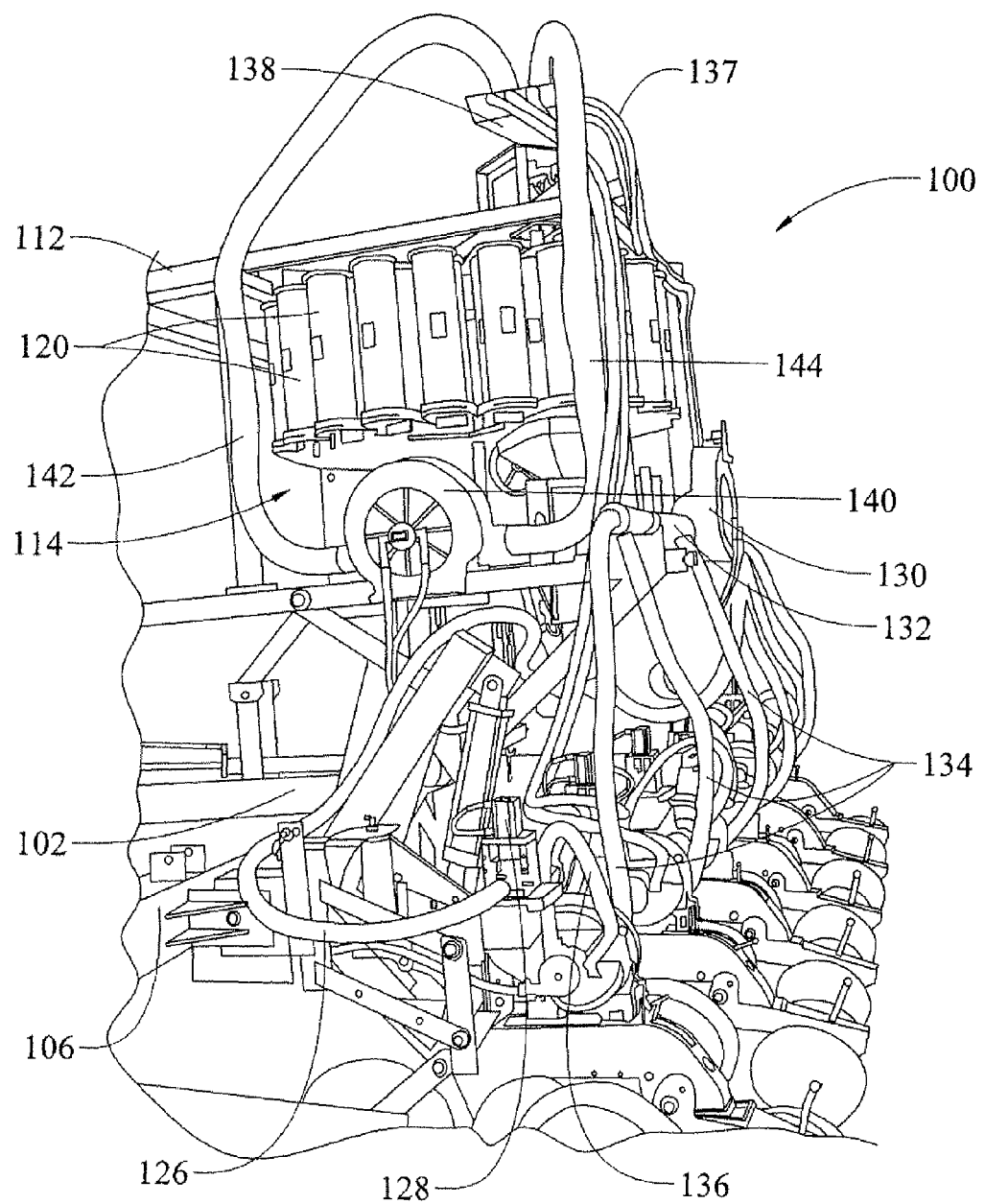
FIG. 4 is a right side elevation view of the planter shown in FIG. 2.
Figure 5:
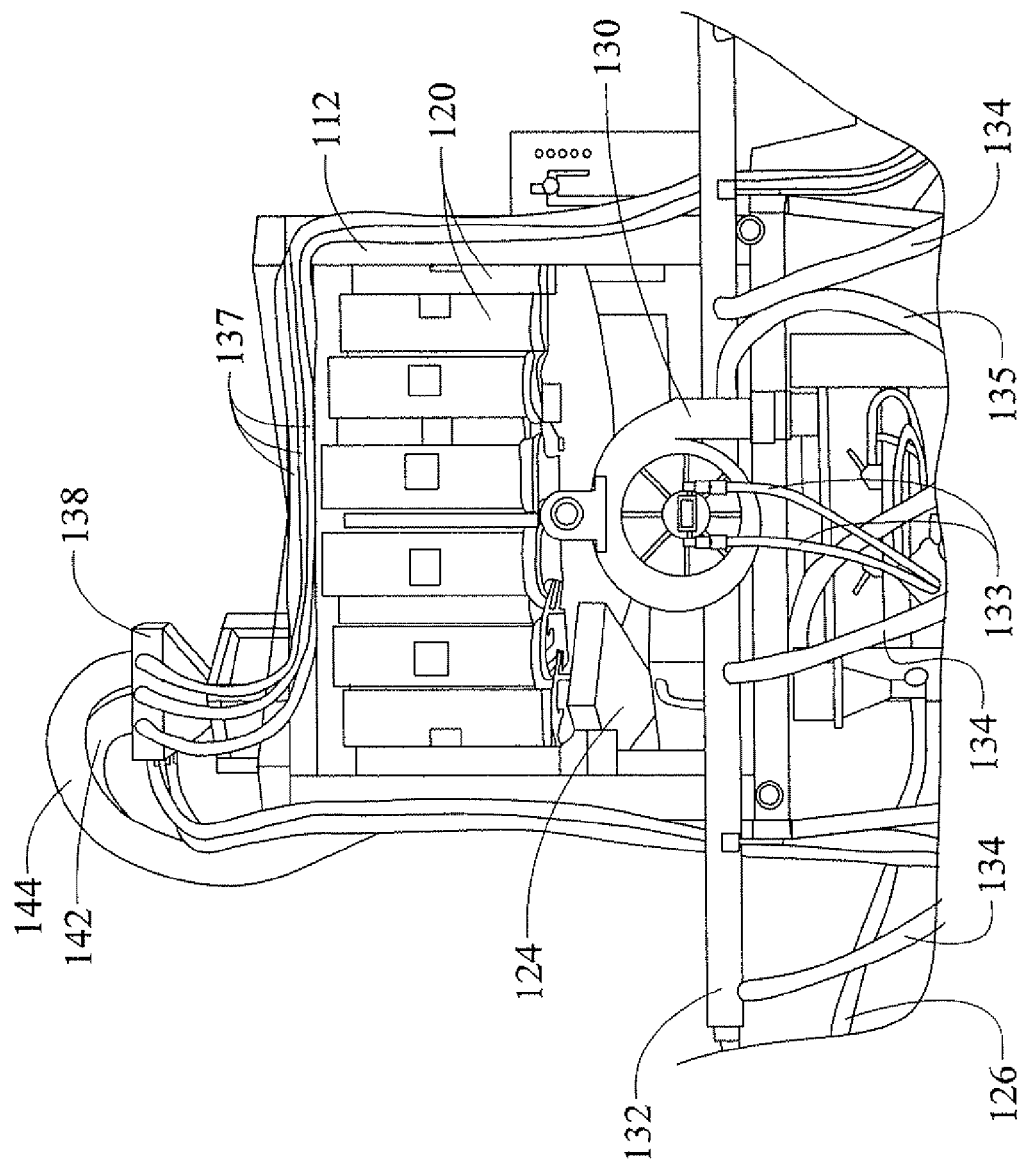
FIG. 5 is a rear elevation view of the storage device on the planter shown in FIG. 2.
Figure 6:
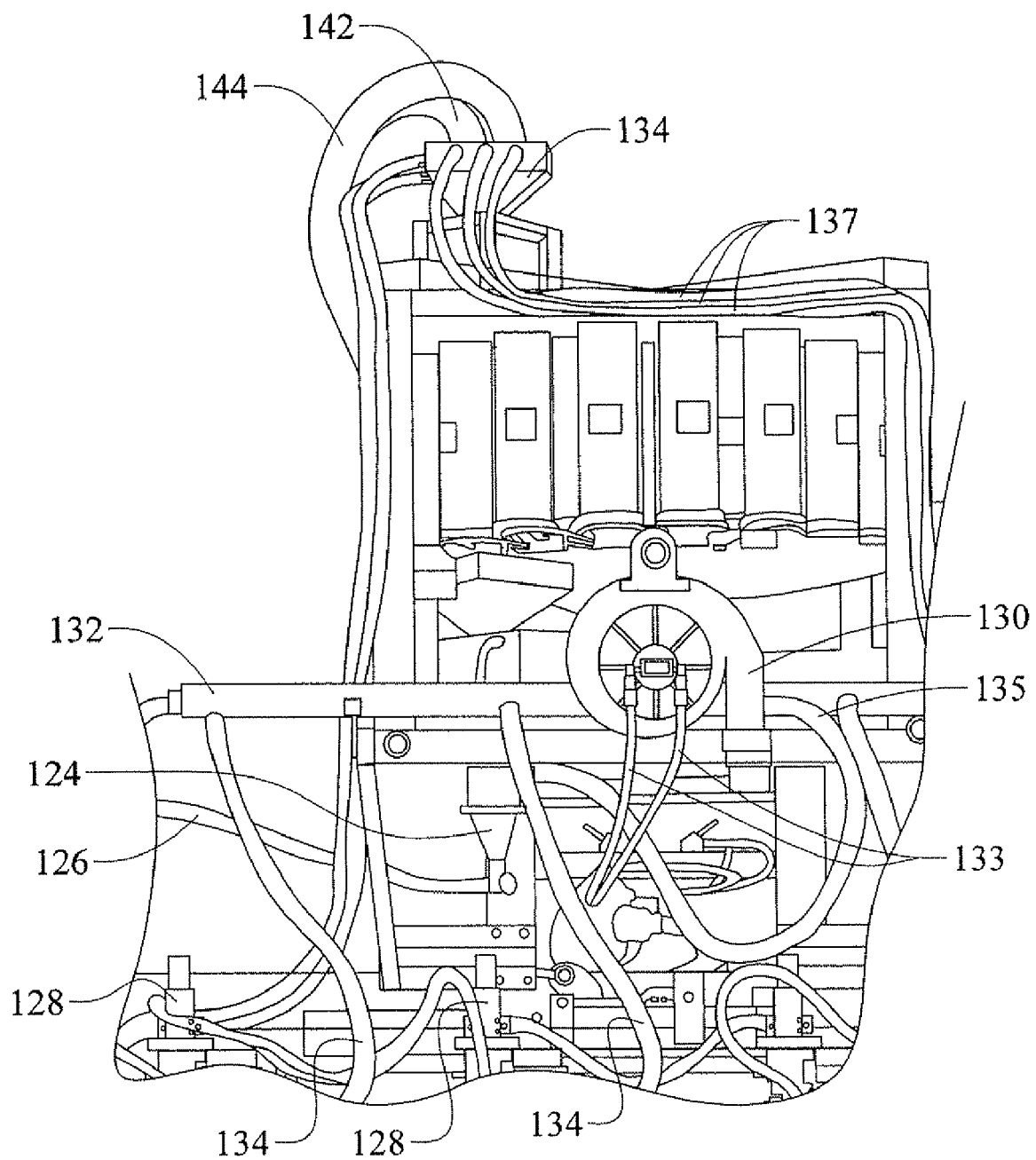
FIG. 6 is a rear elevation view of the mechanism for unloading the storage device on the planter shown in FIG. 2.
Figure 7:
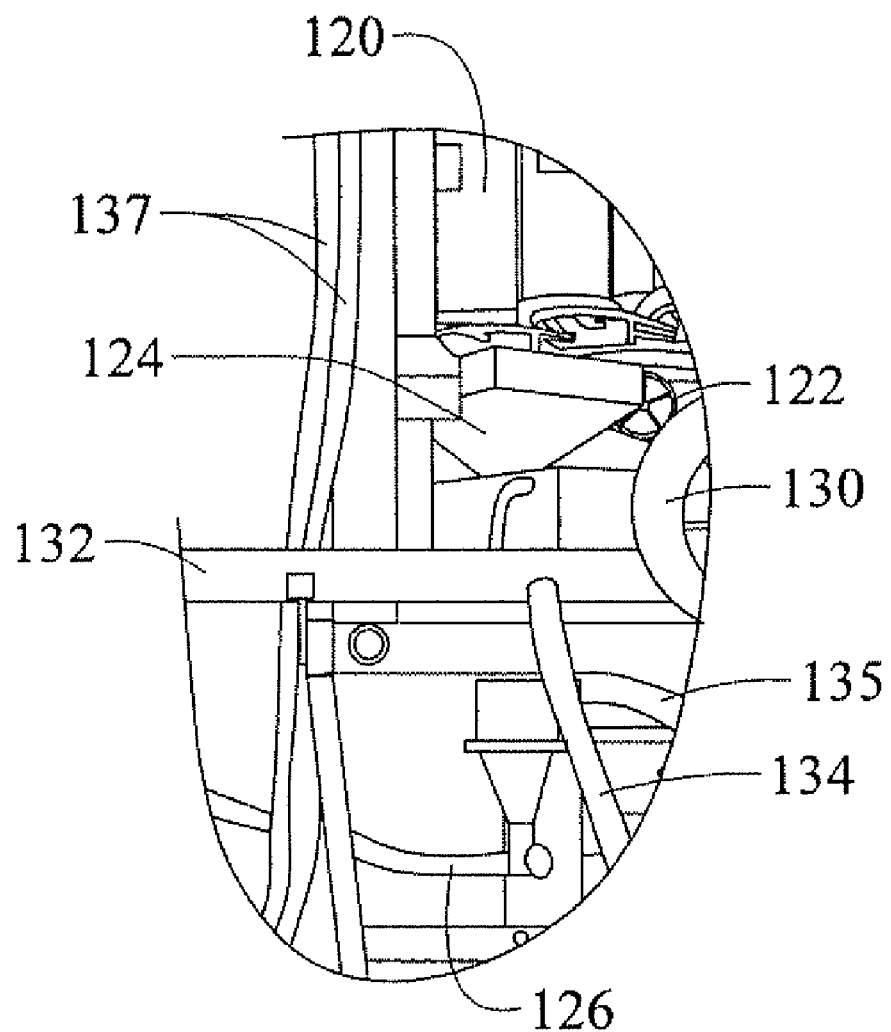
FIG. 7 is a rear elevation view of the mechanism for unloading the storage device on the planter shown in FIG. 2.
Figure 8:
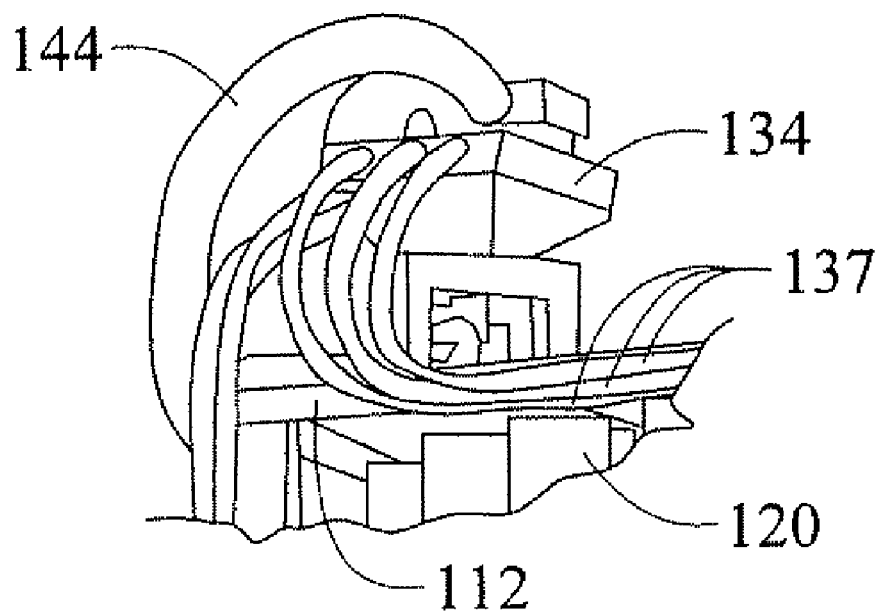
FIG. 8 is a perspective view of the mechanism for loading the storage device on the planter shown in FIG. 2.
Figure 9:
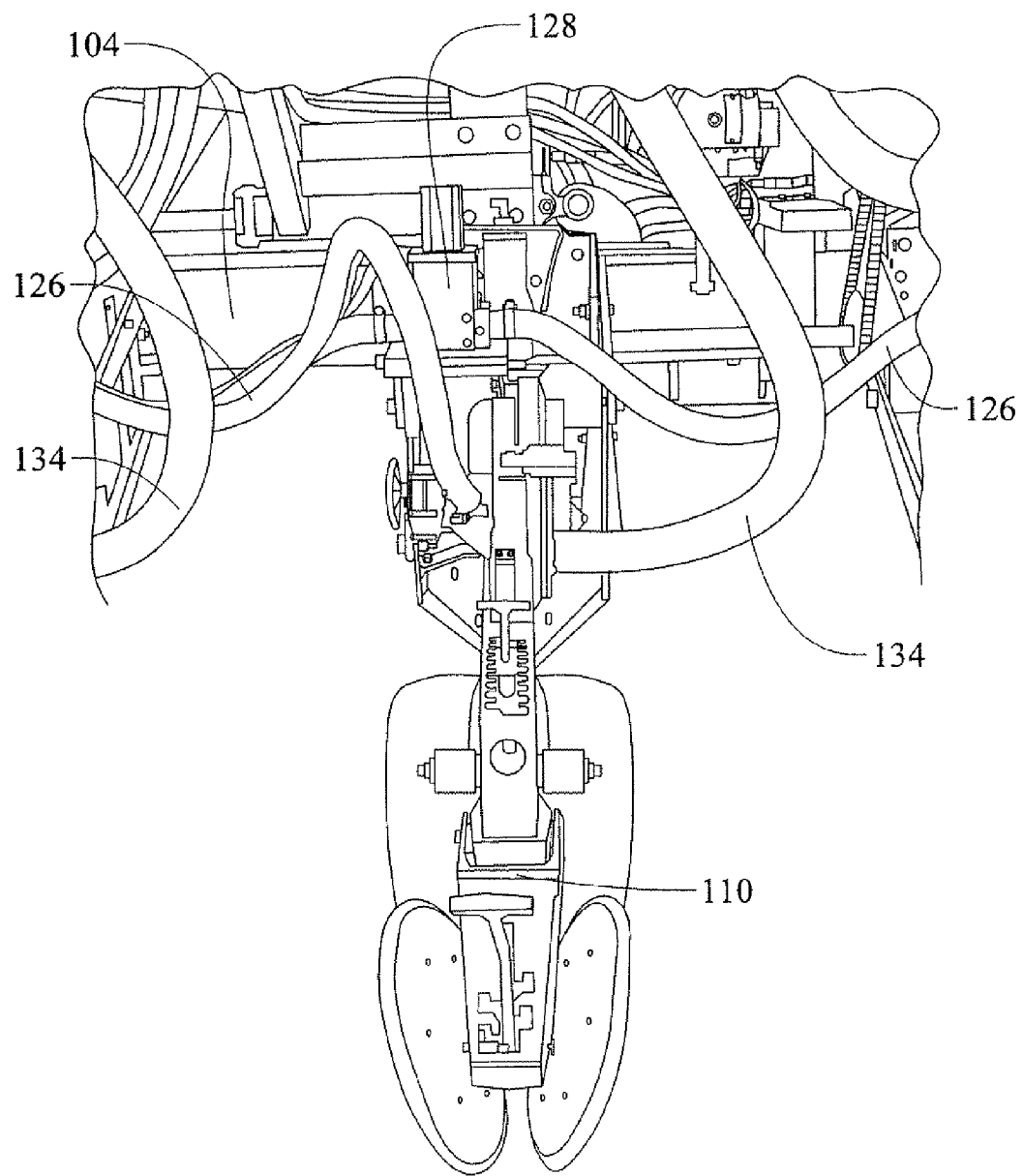
FIG. 9 is a rear elevation view of a planting unit on the planter shown in FIG. 2.
Figure 10:
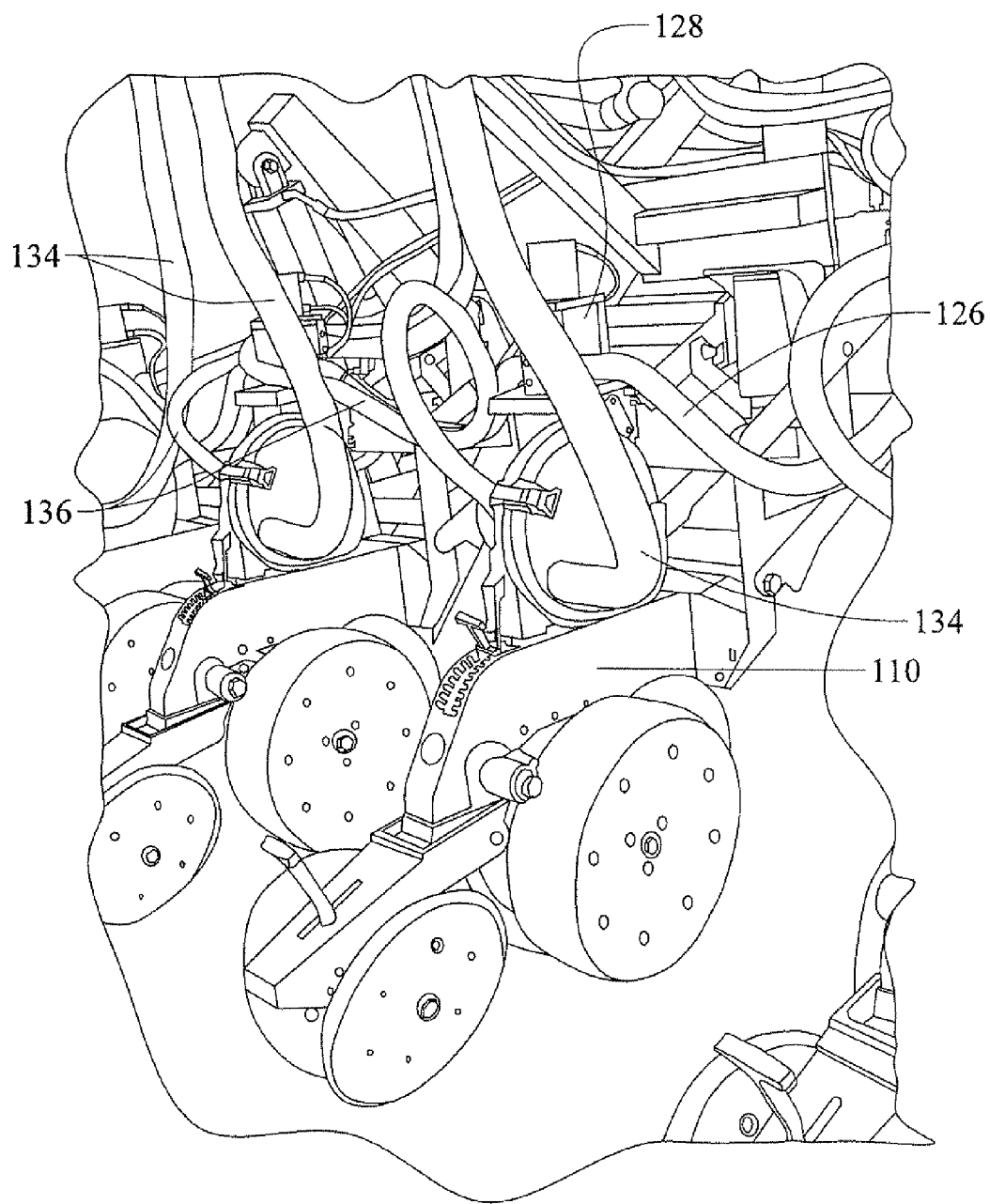
FIG. 10 is a right side elevation view of a planting unit on the planter shown in FIG. 2.
Figure 11:
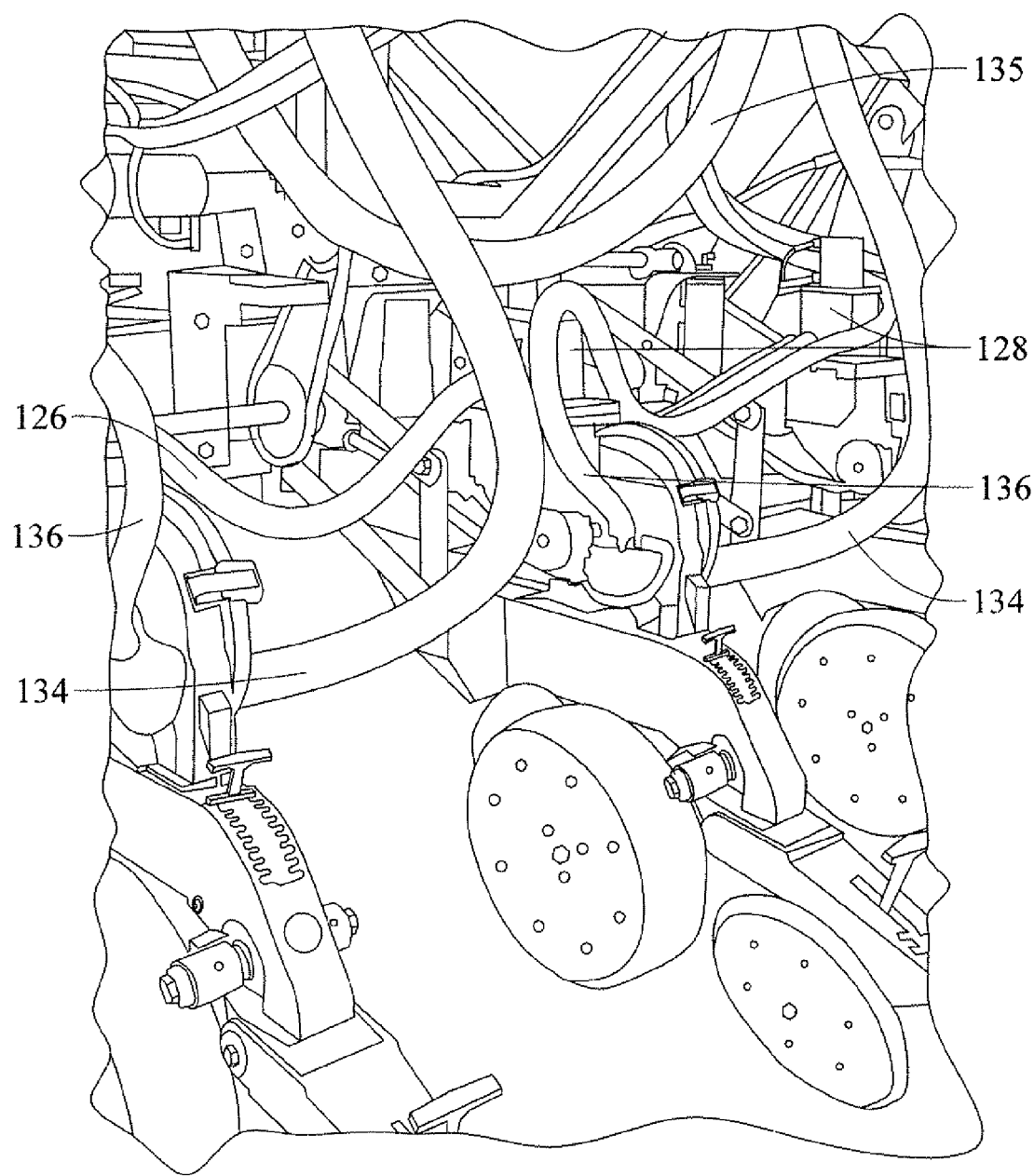
FIG. 11 is a left side elevation view of a planting unit on the planter shown in FIG. 2.
Figure 12:
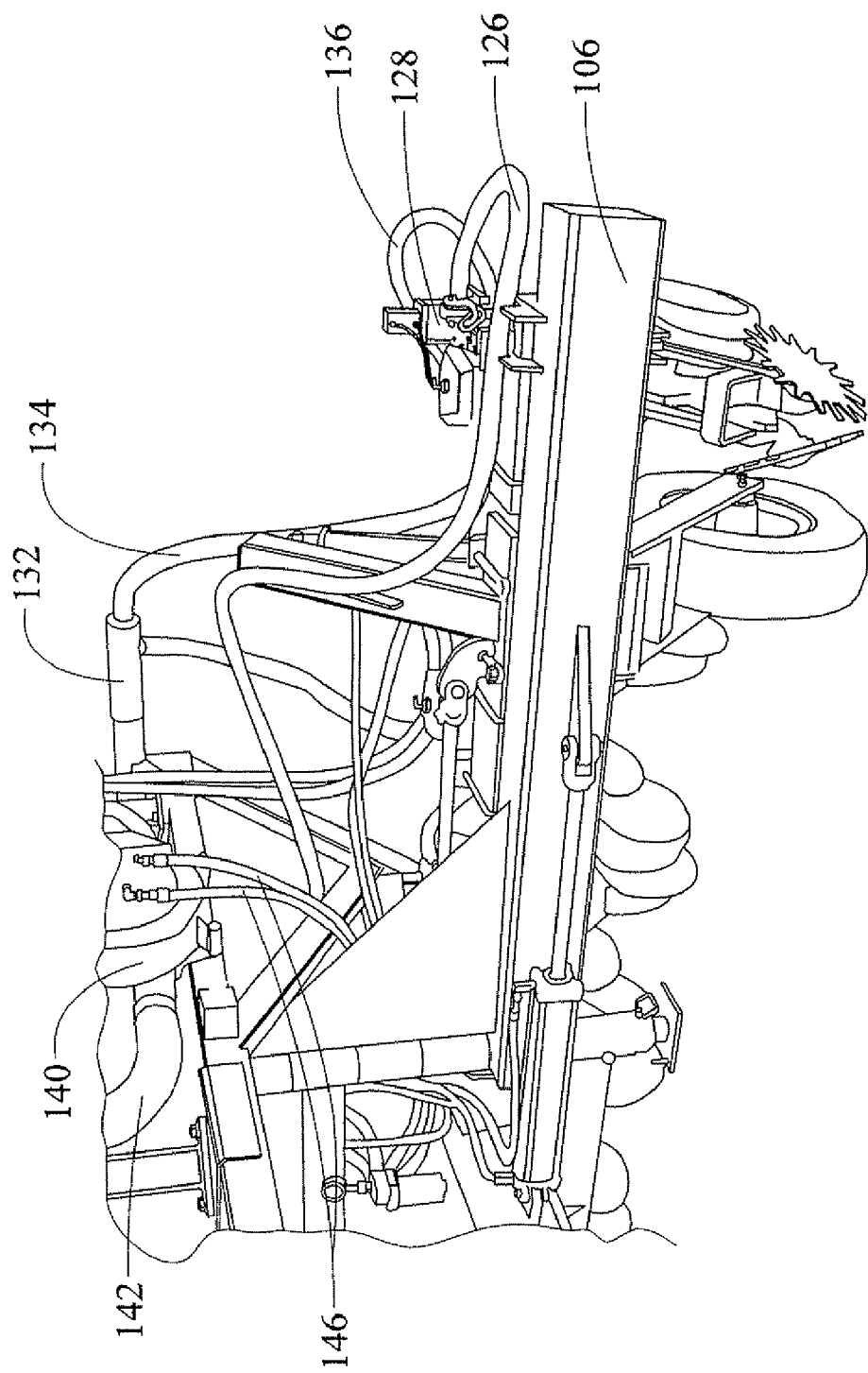
FIG. 12 is a front elevation view of left side of the planter shown in FIG. 2, showing the folding mechanism.
Figure 13:
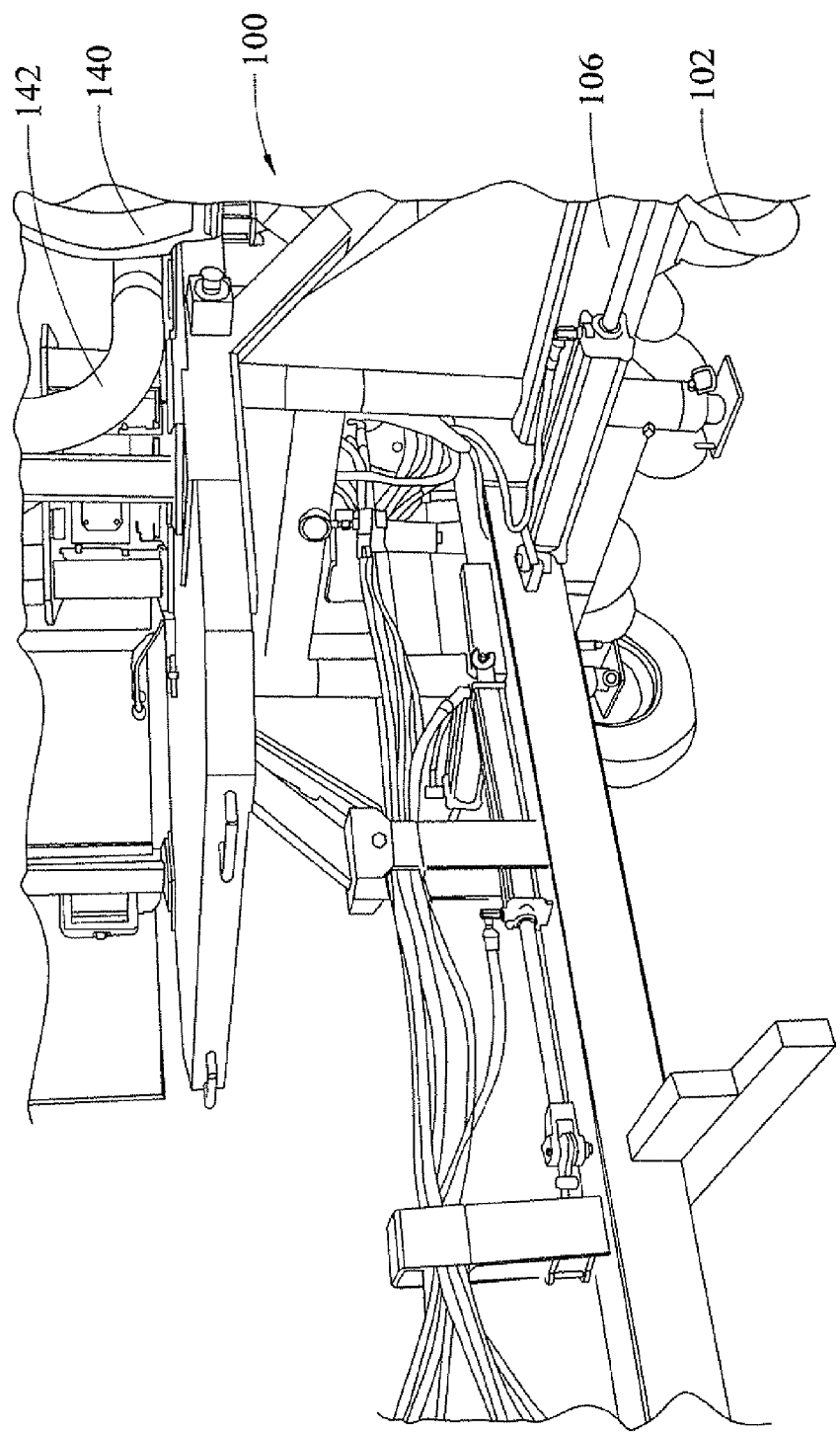
FIG. 13 is a left side elevation of the front portion of the planter shown in FIG. 2.
Figure 14:
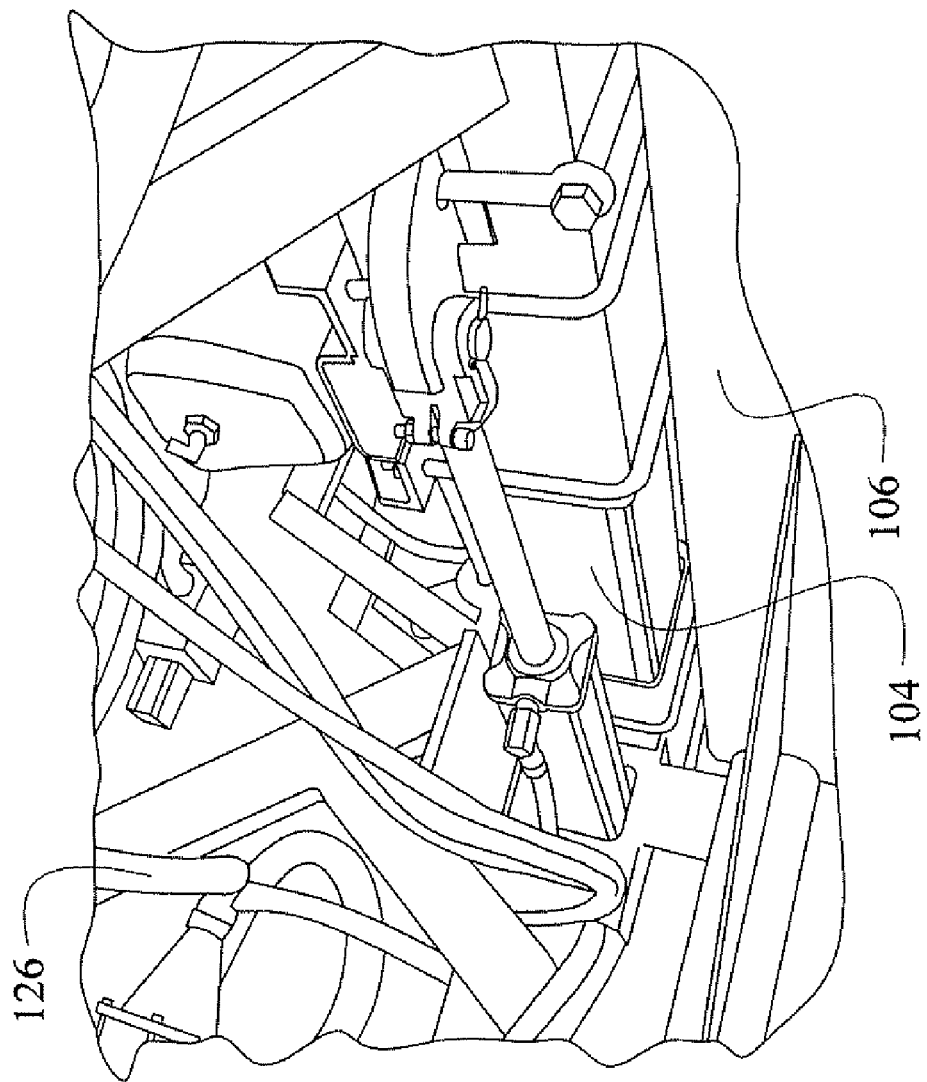
FIG. 14 is a top view of the left side of the planter shown in FIG. 2.
Figure 15:
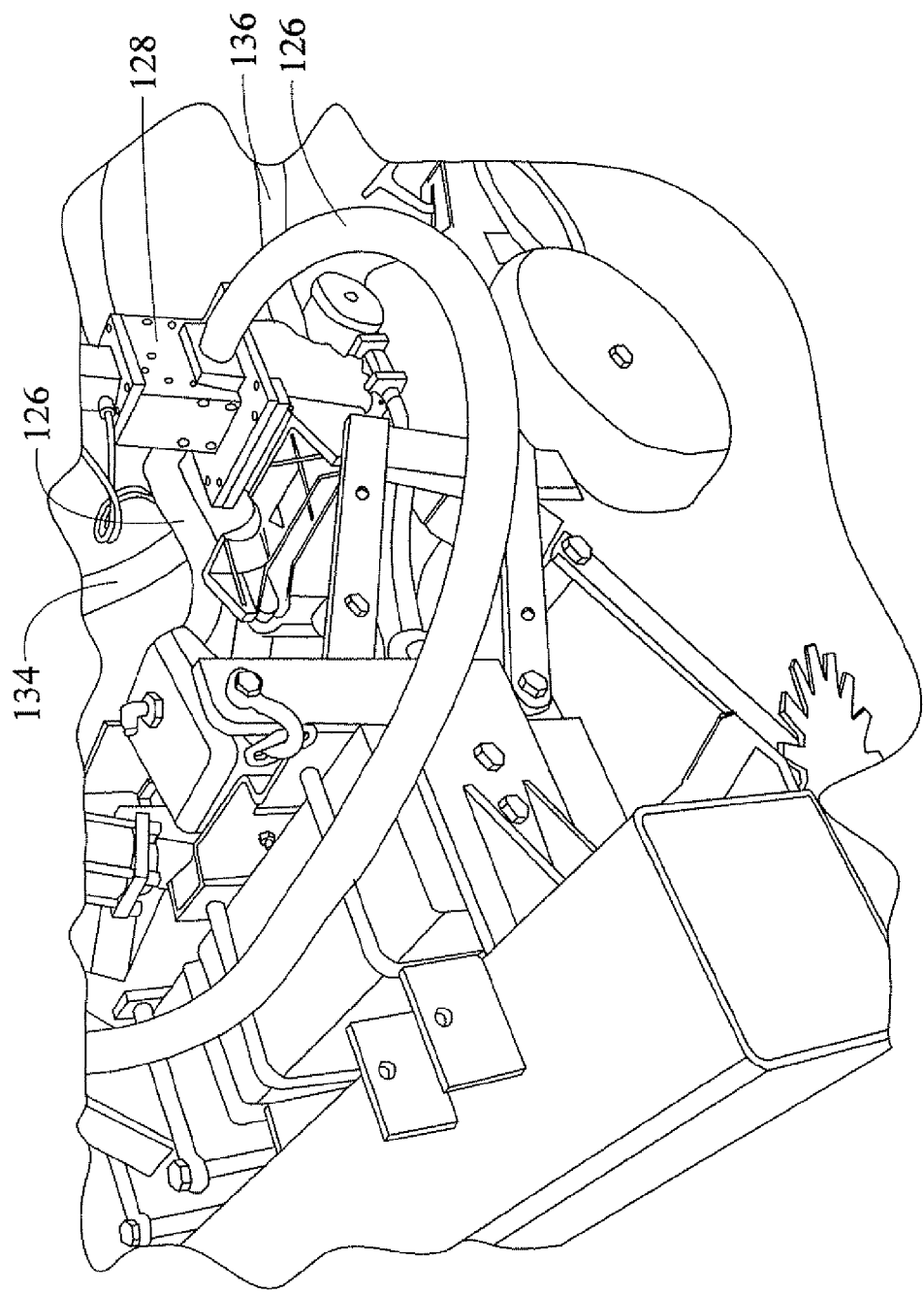
FIG. 15 is a perspective view of the right end of the planter shown in FIG. 2.
Figure 16:
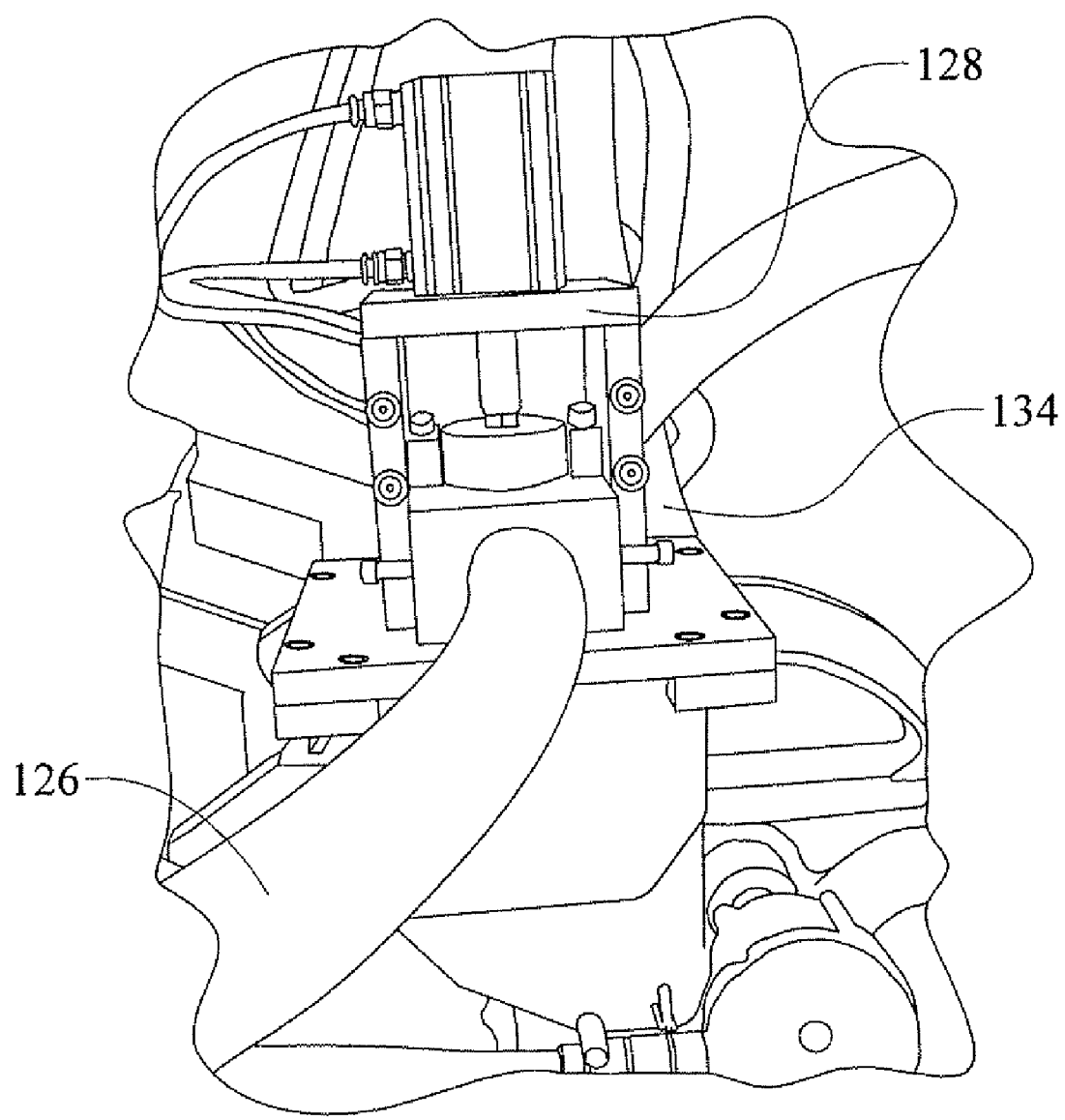
FIG. 16 is a side elevation view of a valve in the seed transport system on the planter shown in FIG. 2.
Figure 17:
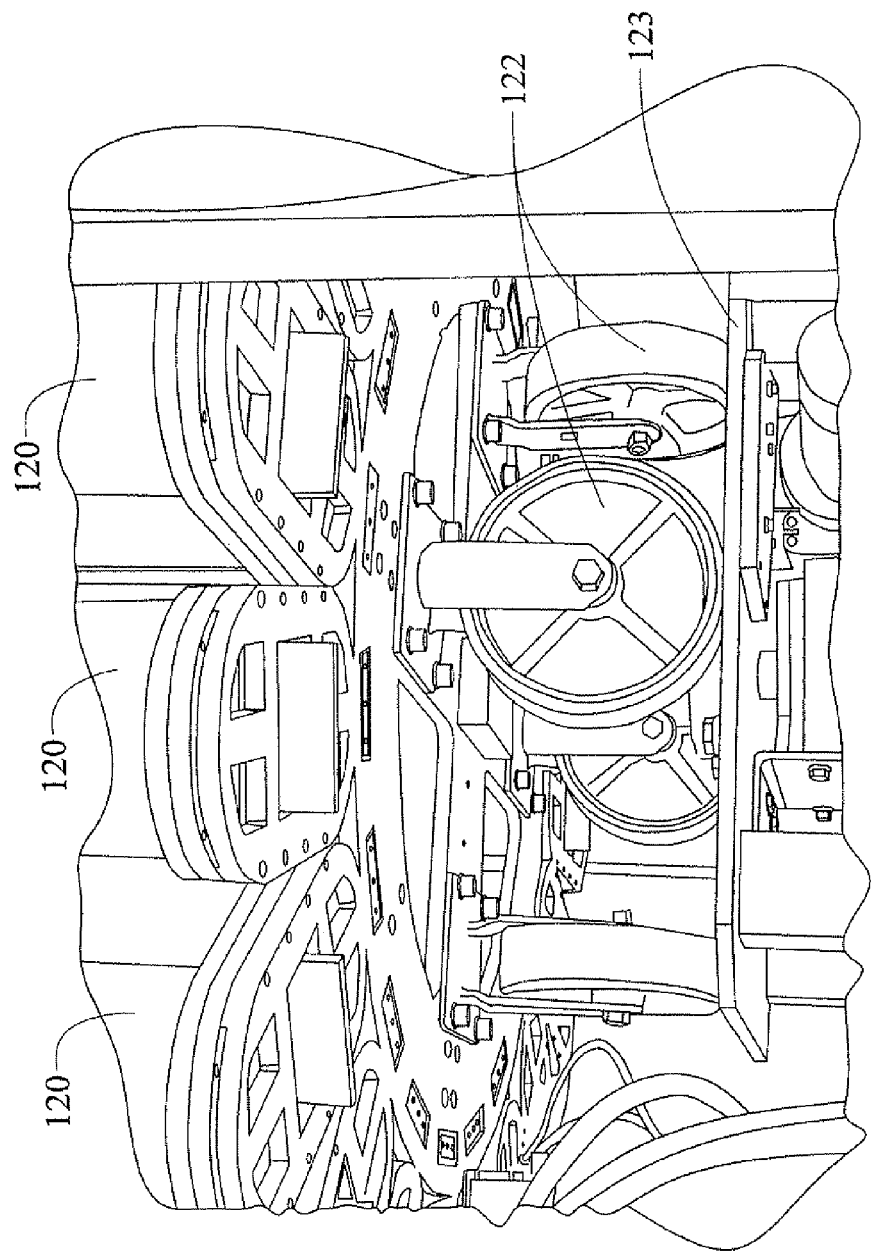
FIG. 17 is a side elevation view of the rotation mechanism on the storage device on the planter shown in FIG. 2.
Figure 18:
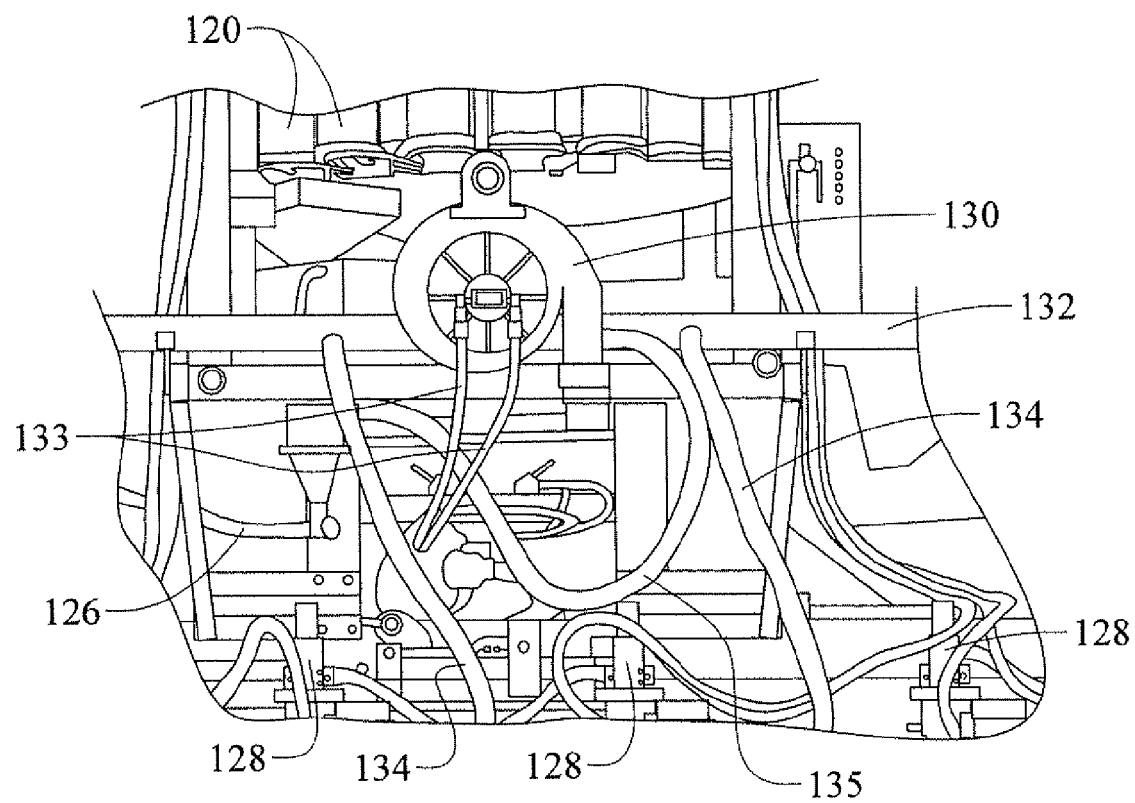
FIG. 18 is a rear elevation view of the planter showing the fan for the seed transport system on the planter shown in FIG. 2.
Figure 39:
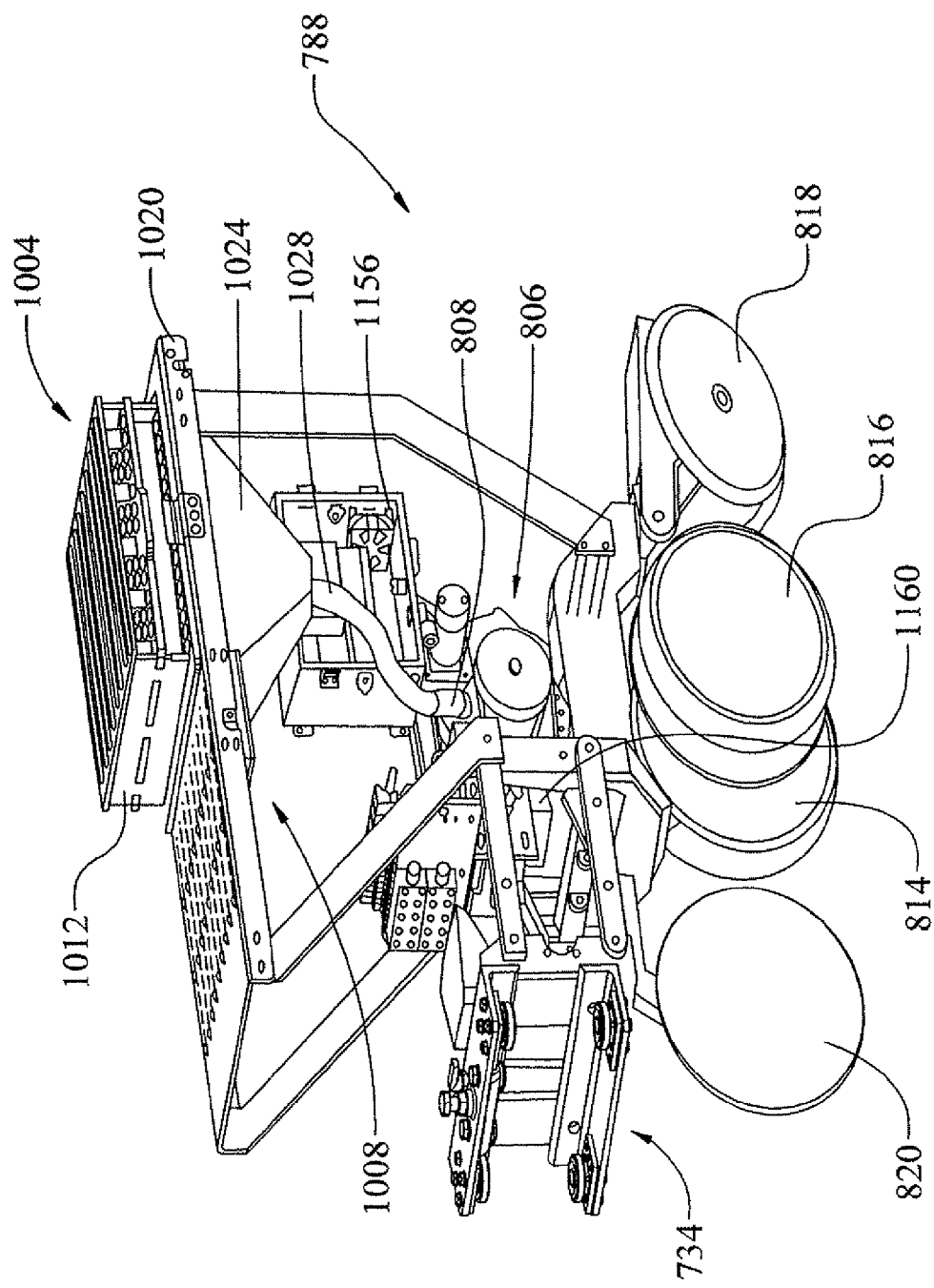
FIG. 39 is an isometric view of a planting unit including a seed storage system and a seed transfer system, in accordance with various embodiments of the present disclosure.

In accordance with the various embodiments, the various seed types are stored separately on board the planter. The steps of loading each type of seed, and of unloading each type of seed can comprise transferring seed from and to an on-board storage system, e.g., storage system 30 (FIG. 1), storage system 114 (FIG. 2) or storage system 1004 (FIG. 39). This transfer can be accomplished by pneumatic or mechanical transfer system, e.g., transfer system 32 (FIG. 1) or transfer system 116/118 (FIG. 2). In most testing applications, a plot will comprise one or more complete traverses across the field. In some embodiments, the seeds can be changed "on the fly", as the planter is being turned at the end of one pass across the field, prior to making the next pass across the field, without the need to stop the planter or interrupt the planting operation. The transfers of seed can be initiated manually by an operator, or they can be initiated automatically, for example based on sensed movement of the planter and/or position of the planter (e.g. from GPS or from a local positioning system).

Some embodiments of the methods of the present disclosure are particularly adapted for planting test plots of at least two different seeds in a test field. An example is shown schematically in FIG. 20. In general, as indicated at 300, the method comprises preparing a predetermined planting plan of the at least two test plots in the test field. Nine such plots are shown in FIG. 20. This test plan can include both the identities and the amount of each type of seed to plant. The plan can be manually prepared by the scientists conducting the test, or its preparation can be automated. As shown schematically at 302, a planter control program can be prepared for controlling the operation of a planter, e.g., planter 20, 100 or 603, in accordance with the predetermined planting plan. This planter control program is communicated to a processor on board the planter for execution to control the operation of the planter. As the planter is operated across the field, and the planter control program is executed to automatically load the planting units with the appropriate seed before each pass and remove the seed after the completion of the pass, to plant the test fields in accordance with the predetermined planting plan 300.

A planter assembly for carrying out the method, such as planter 20, 100 or 603, is generally indicated as 304, is shown schematically in FIG. 20. The planter 304 comprises an on-board storage system 306, e.g., storage system 30, 114 or 1004, and a seed transfer system 308, e.g., seed transfer system 32, 116/118, or 1008 (FIG. 39), for transferring seeds between the storage system 306 and a plurality of individual planting units, e.g., planting units 28, 110 or 788 (described below). The operation of the planter 304 (or at least the transfer system 308 of the planter) is under the control of a processor 312.

Generally, the seeds are stored on board the planter in the storage system 306 with separate storage for each of the seeds specified in the predetermined planting plan. Before the planting, the storage system 306 is loaded with the specified seed in quantities sufficient to complete the predetermined planting plan. The storage system 306 could have a removable "magazine type" seed storage module which can be loaded separately and installed on the planter. An exemplary removable seed storage system, in accordance with various embodiments, is described below with reference to 39 through 46. These loaded seed storage modules could be provided, for example from a central location where the predetermined planting plan and the control program are created. In implementation, the control program, which can be provided on magnetic, optical, or other media, or provided as a data stream through a wired (or wireless) connection, and a pre-loaded seed storage module of seeds can be dispatched to the site of test, and installed on processor 312 on the planter 304. Alternatively, the planter 304 can be prepared with the appropriate control program and loaded with the appropriate seeds at a central location, and dispatched to the test site.

The planter 304 is operated to make one or more passes across the test field, and after a particular pass that completes a plot, the control program automatically removes the seed from the planting units and transfers the seed to the storage system 306, or alternatively to a discard bin 307, on board the planter 304. The control program then transfers the seeds for the next test plot from the storage device to the planting units. The planter 304 is operated to make one or more passes across the test field until a particular pass completes a plot. The control program then switches the seeds for the next plot, and the process continues until all of the plots are completed.

As shown and described herein each plot is assumed to constitute one or more complete passes across a field. However, a complete plot could include a partial pass across the field. This would be the case, for example, where seed is planted based upon local conditions within a field, and it is desirable to change seeds one or more times within a single pass.

Current methods of planting test patches are labor intensive, and in particular require substantial action in the field by highly educated test monitoring personnel. These personnel are responsible for designing the test program, and making sure that the proper seeds are planted in the proper locations. Embodiments of the present disclosure reduce the amount of labor required to execute test programs, and in particular the amount of skilled labor to execute test programs. Test plans for a plurality of fields scattered over a wide area can be created at a central location. Similarly a program for controlling the planter to implement the predetermined plan can also be developed at a central location. Lastly the seeds for implementing the plan can be assembled in a central location, or provided and loaded locally. Thus, all that is needed at the local test sites is someone who can operate the planter to traverse the test fields. The seeds simply have to be appropriately loaded into the storage device on the planter (or they can be provided preloaded in a seed storage module that is simply installed on the planter), and the control program uploaded. A relatively unskilled operator simply operates the planter to traverse the field.

In some embodiments the operator simply indicates to the system when each pass is completed, and the system automatically responds by changing the seeds at the appropriate pass. In other embodiments, the system is motion or direction responsive and automatically changes the seeds based on movement or direction. In still other embodiments, the system is GPS enabled, and automatically changes the seeds at the proper location, which may or may not be at the end of a pass. Furthermore, it is possible to completely automate the planting process, with control systems that can automatically traverse the planter across the field.

Instead of delivering the control program and seeds, the planter can be pre-programmed and pre-loaded, and delivered to local contactors to operate the planter in the designated test fields.

The transfer mechanism for transferring seeds between the storage unit, e.g., storage system 30, 114 or 1004, and the planting units, e.g., planting units 28, 110 and 788, can be any system that quickly and reliable transfers seeds without damage, e.g., transfer system 32, 116/118 or 1008. The system could be a mechanical system, or a pneumatic system that transfers seeds with air pressure. The transfer system can comprise separate loading and unloading systems. The loading system can comprise a plurality of pneumatic transfer tubes extending in parallel between the seed storage system and each planting unit. In various embodiments, however, the loading system comprises a plurality of pneumatic transfer tubes extending in series between the seed storage system and some or all of the planting units. The pneumatic system can include at least two branches, e.g., booms 24 and 26 (FIG. 1) or support members 104, 106 and 108 (FIG. 2), with each branch extending in series to at least two planting units. The loading system could be used for unloading the system as well, or as in some embodiments, a separate unloading system can comprise a plurality of pneumatic transfer tubes extending in parallel between the storage system and each planting unit. The unloading system could alternatively comprise a plurality of pneumatic transfer tubes extending in series between the storage system and some or all of the planting units.

In large scale tests involving multiple test plots in multiple fields throughout an area, the area is divided into at least two test regions, and a predetermined test plan is created for each region. As shown schematically in FIG. 21 one such region 400 comprises six fields 402, 404, 406, 408, 410, and 412. Test plans for each of the fields 402-412 are developed and sufficient seeds for the predetermined test plan are sent to a loading location 414 convenient to the region. At least one multi-row planter is provided in each region. Depending upon the location and timing, separate planters can be provided, or some or all of the planters can be used in more than one location. Each of the planters can comprise a plurality of planting units, e.g., planting units 28, 110 or 788; a storage system for storing at least two types of seeds, e.g., e.g., storage system 36, 114 or 1004 and a transfer system, e.g., transfer system 32, 116/118 1008, for transferring seeds between the storage system and the planting units. The test plots are planted by (a) loading each planter at its respective loading location with seeds to complete at least some of the test plots in the test fields in its respective test region; and (b) operating the planter across the test fields in its respective region to plant test plots in its testing region, and repeating these steps until all of the test plots in the test area are completed.

At the storage location, the loading of the seeds into the planter or into a "magazine type" seed storage module for the planter can be done manually based on a print out or display for the particular portion of the predetermined plan that is being executed, or it can be automated. Where the loading is automated, the system can specify to the planter operator where to plant, or the planter operator can specify what fields will be planted next, and the appropriate types of seed, in the appropriate quantities can be automatically loaded into the planter.

Figure 22:
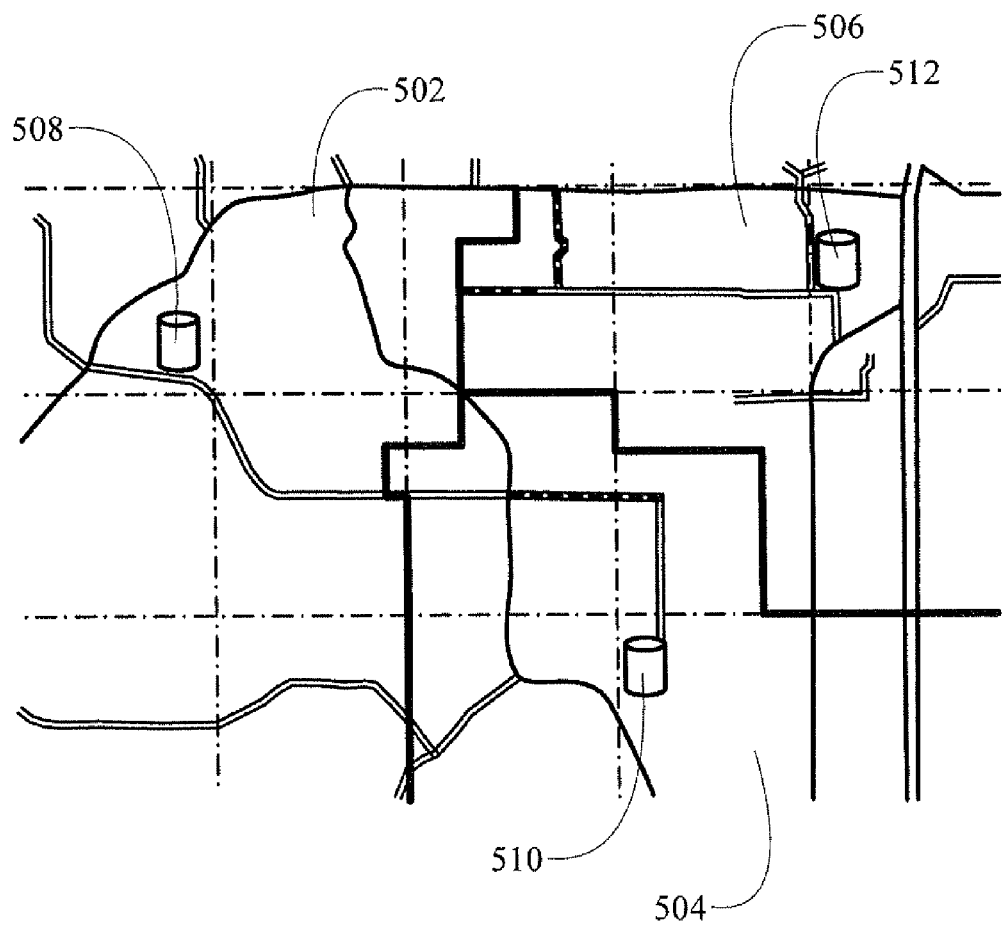
FIG. 22 is a schematic diagram of a test area broken down into a plurality of test regions, with designated distribution locations.
Figure 23:
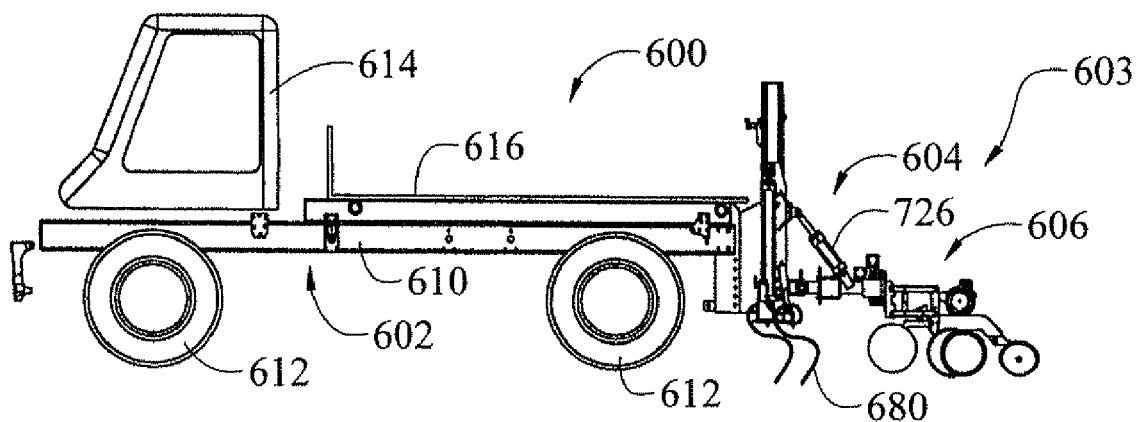
FIG. 23 is a left side elevation view of various embodiments of a planting system in accordance with the principles of the present disclosure, with the planter shown in its deployed or "planting" position.

As shown in FIG. 22, an area can be divided into multiple test regions 502, 504, and 506, each having its own central loading location (508, 510, and 512, respectively) where the seed for the test and other support materials can be delivered and stored.

Referring now to FIGS. 23-38, in various embodiments of the present disclosure a planting system 600 can be provided. Generally, the planting system 600 comprises a vehicle 602 and a planter 603 that includes a planting unit lift and position (PULP) assembly 604 removably mountable to the vehicle 602, and a planter assembly 606 mounted on the PULP assembly 604. The vehicle 602 has a chassis 610 on which four wheels 612 are mounted. A cab 614 is positioned at the front of the chassis 610, and a bed 616 is positioned on the chasses behind the cab.

The vehicle 602 can be a UNIMOG, available from the Freightliner Group, a DaimlerChrysler company, but it could be any other vehicle suitable for carrying the planter 603 across fields to plant seed. However, in various embodiments, the vehicle 602 is also suitable for travel on roads so that the planting system 600 can move independently from location to location, without the need for special equipment to transport the planting system. This facilitates the use of the planting system 600 in custom planting of a plurality of different fields within an area, as well as use of the planting system in different areas.

Figure 24:
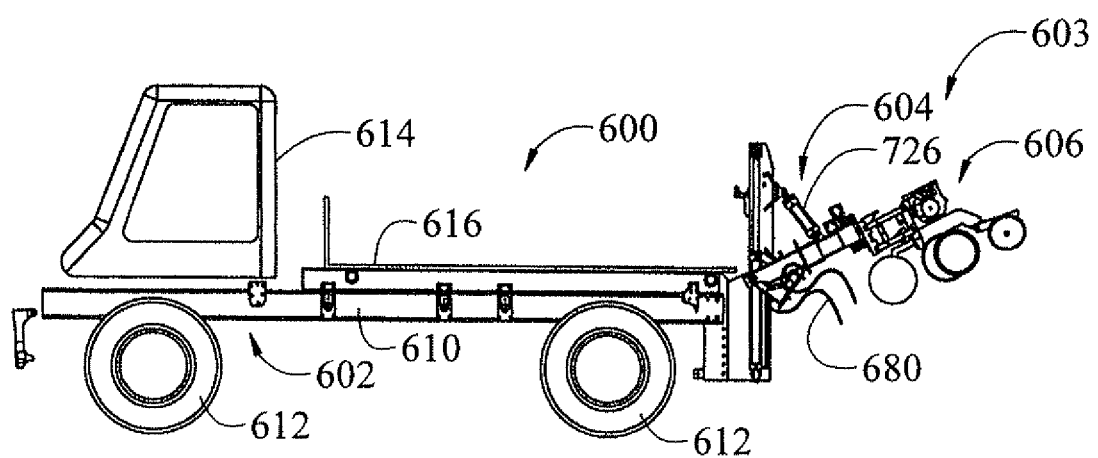
FIG. 24 is a left side elevation view of the various embodiments of the planting system, with the planter shown in its stowed or "transport" position.
Figure 25:
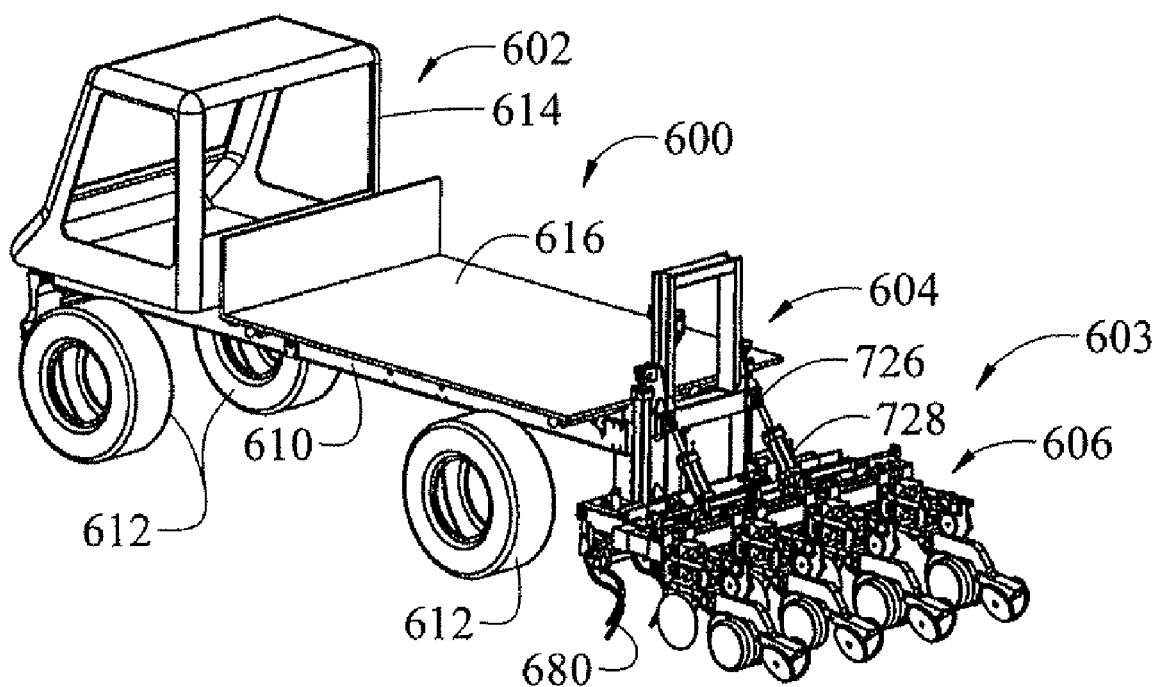
FIG. 25 is a rear perspective view of the various embodiments of the planting system, with the planter shown in its "planting" position.
Figure 26:
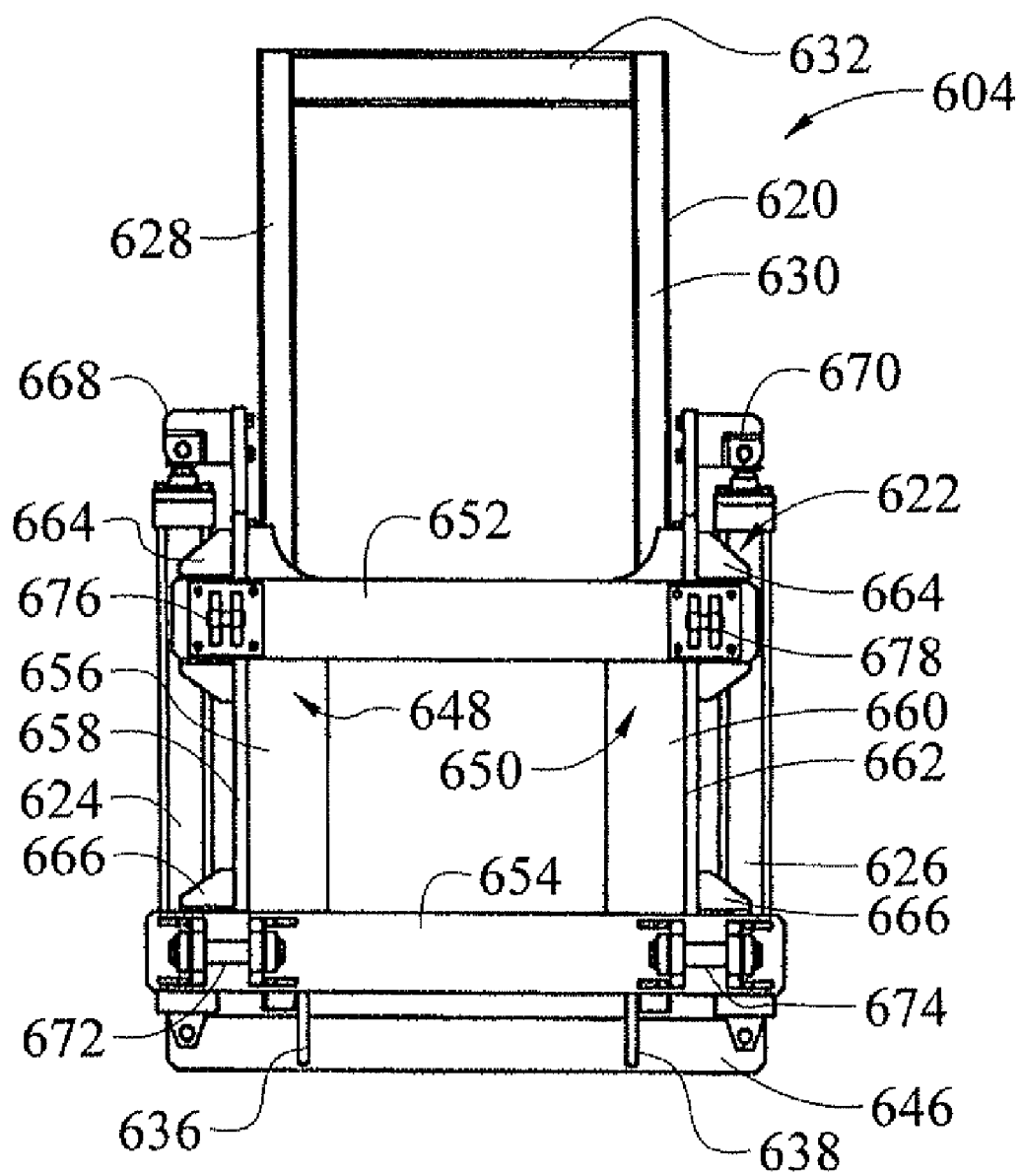
FIG. 26 is a rear elevation of the lift mast and carriage of the various embodiments of the planting system, for mounting a planter on a vehicle.
Figure 27:
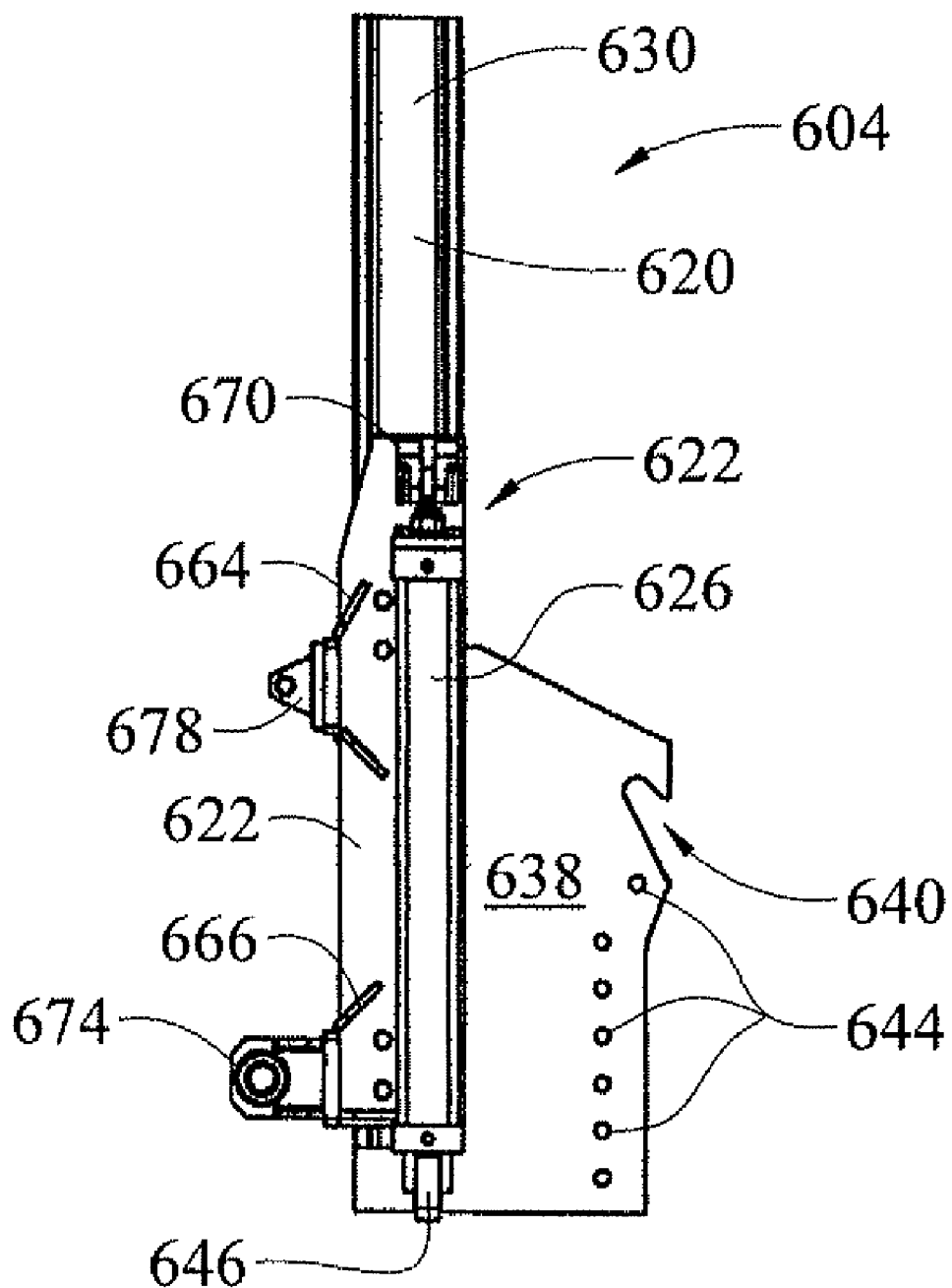
FIG. 27 is a right side elevation view of the lift mast and carriage.
Figure 28:
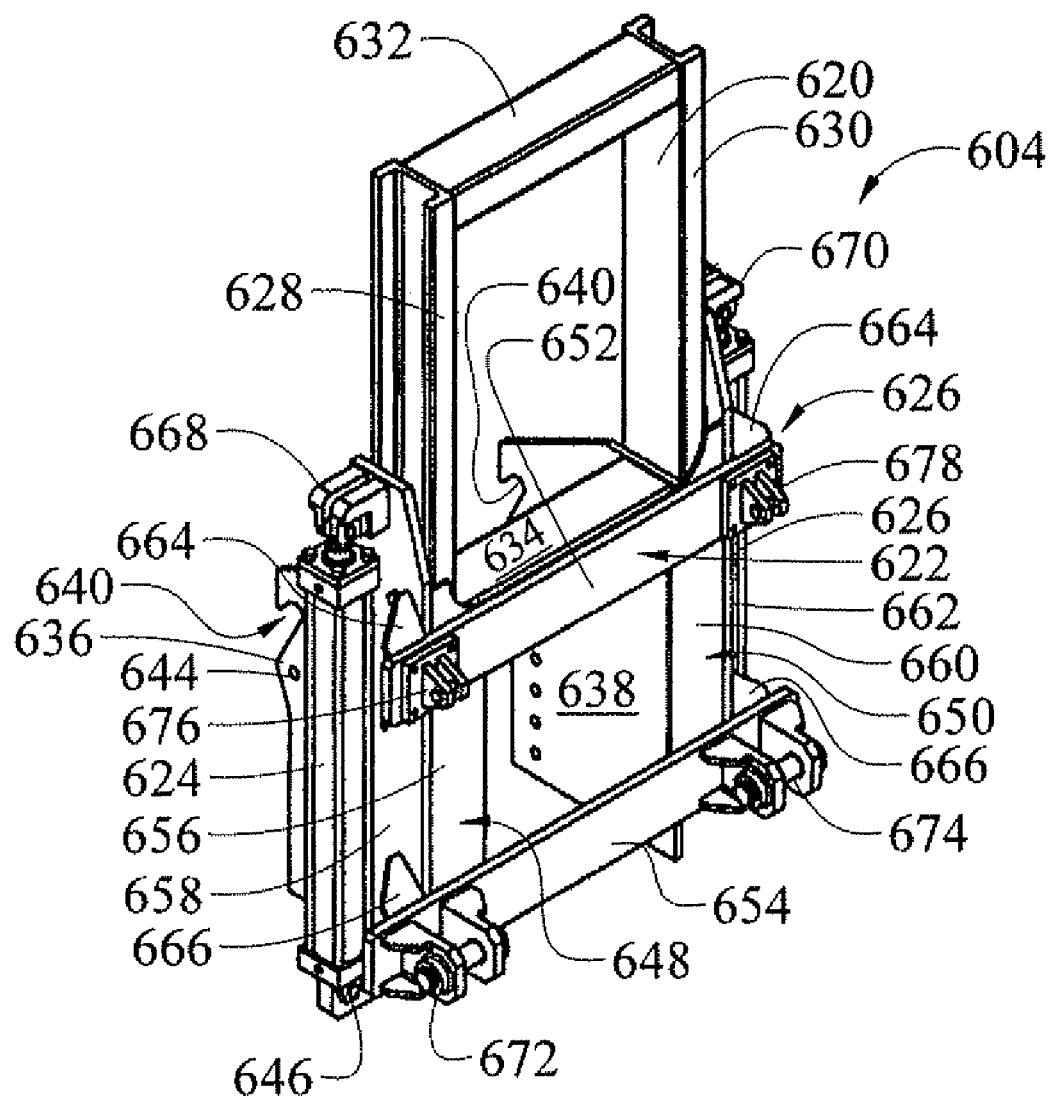
FIG. 28 is a rear perspective view of the lift mast and carriage.
Figure 29:
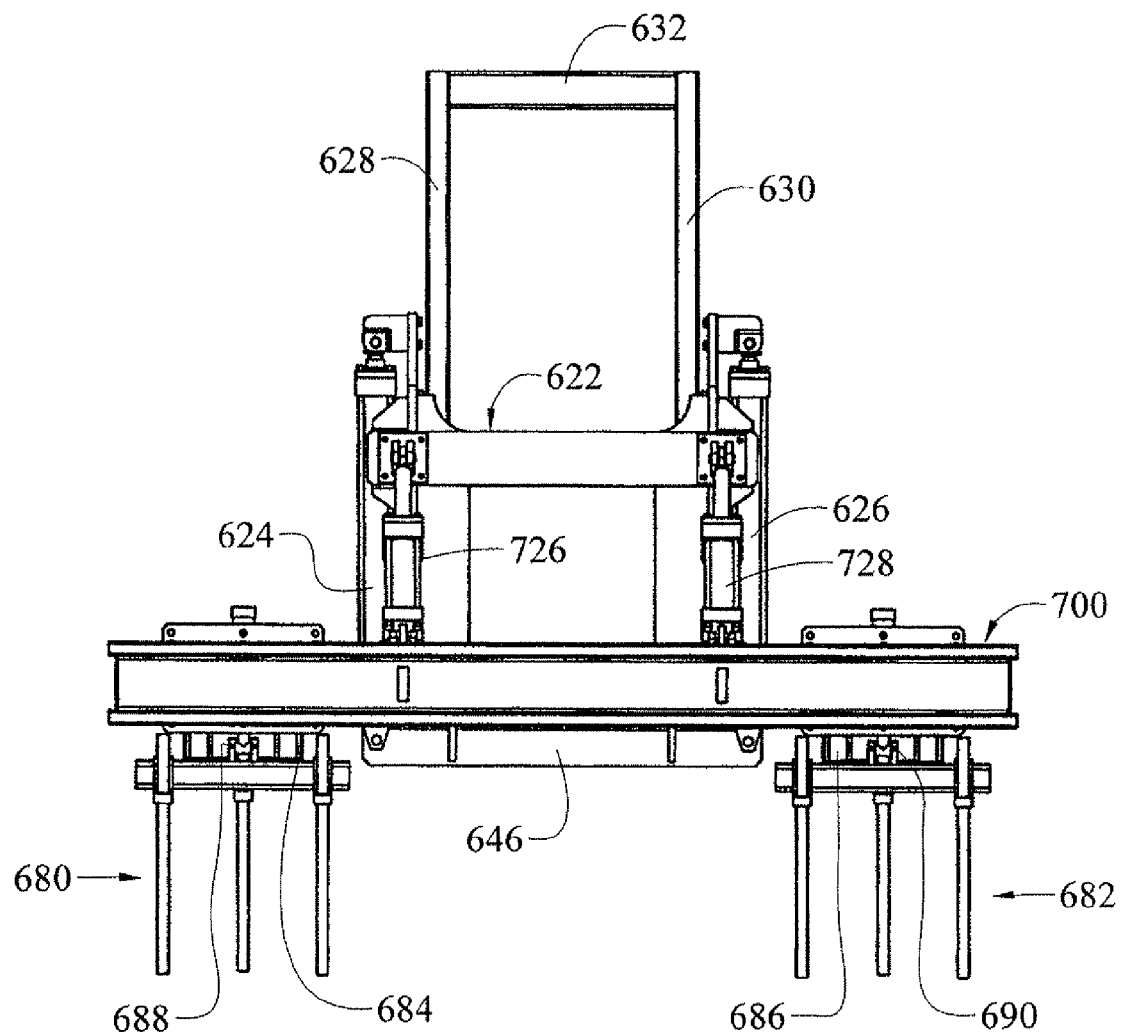
FIG. 29 is a rear elevation view of the lift mast and carriage and portions of the planter of the various embodiments of the planting system.
Figure 30:
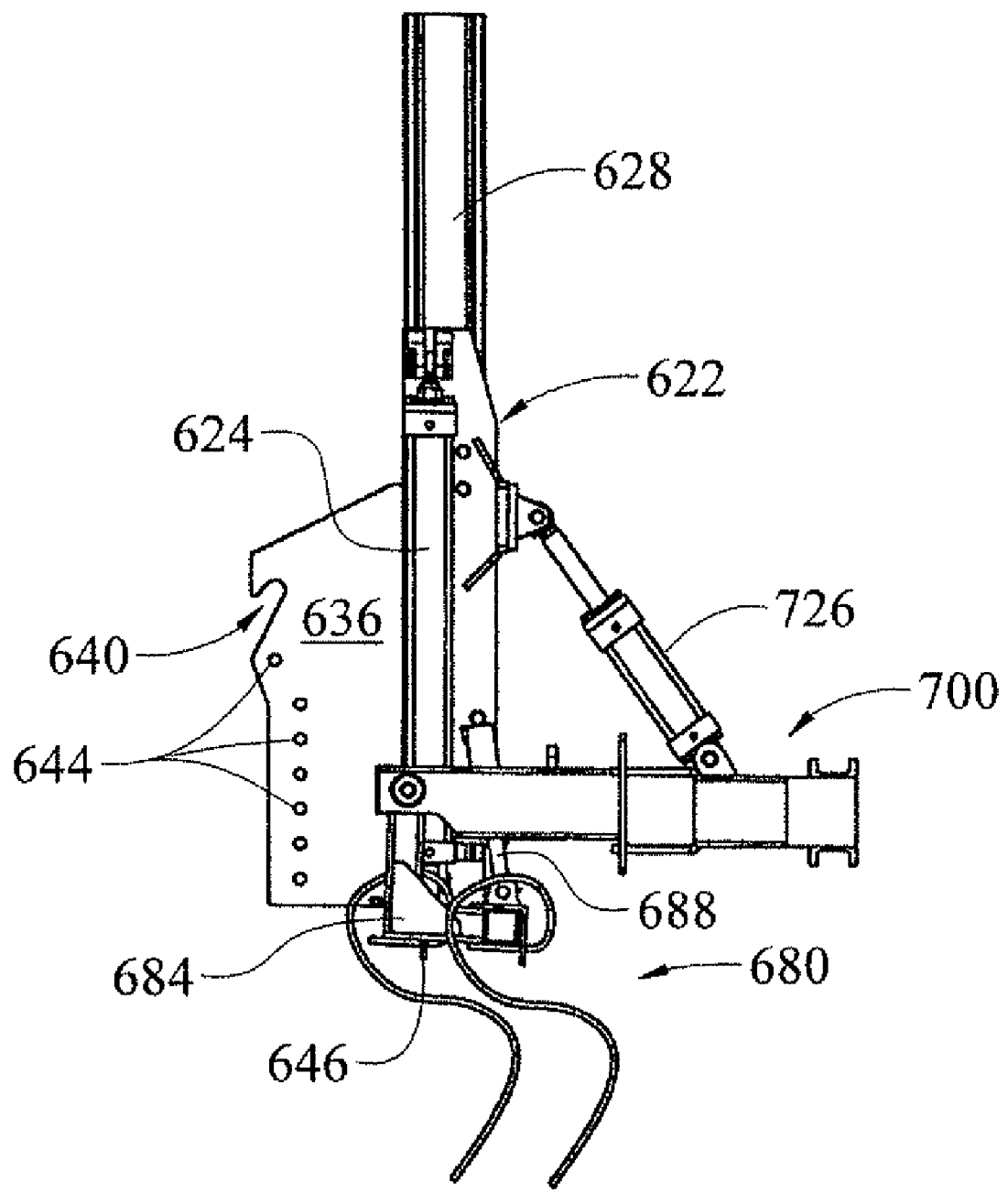
FIG. 30 is a left side elevation view of the lift mast and carriage and portions of the planter of the various embodiments of the planting system.

The PULP assembly 604 is adapted to be mounted on the rear of the vehicle 602 for mounting the planter assembly 606 thereto. The PULP assembly 604 can be capable of both lifting and tilting the planter assembly 606 between a deployed or "planting" position, (FIGS. 23 and 25) and a retracted or "transport" position (FIG. 24). As shown in FIGS. 26-28, in various embodiments, the PULP assembly 604 includes, a lift mast 620 and a carriage 622 (e.g., FIG. 26) that is translatable along sides 628 and 630 of the lift mast 620, via two actuators 624 and 626, e.g., piston and cylinder devices, disposed on either side of the lift mast 620. The lift mast 620 has left and right sides 628 and 630, which can be made of outwardly facing sections of C-channel. A top 632 extends transversely between the left and right sides 628 and 630 at their respective tops, and can be made of a downwardly facing section of C-channel. An intermediate support 634 extends transversely between the left and right sides 628 and 630 intermediate their ends.

Left and right mounting plates 636 and 638 are mounted on the inside faces of the left and right sides 628 and 630. The mounting plates 636 and 638 have a generally downwardly facing hook-shaped cut out 640 for hanging the lift mast 620 on a transversely extending crossbar (not shown) on the vehicle 602. In various embodiments, a plurality of mounting holes 644 are also provided to secure the lift mast 620 to the chassis 610 of the vehicle 602.

A base bar 646 extends transversely below the left and right sides 628 and 630 and through notches in the left and right mounting plates 636 and 638, projecting beyond the left and right sides 628 and 630. Each projecting end of the base bar 646 supports one end of one of the actuators 624 and 626.

As shown in FIG. 28, the carriage 622 is comprised of left and right side members 648 and 650 connected by upper and lower transverse supports 652 and 654. The left side member 648 of the carriage 622 comprises a left side plate 656, and a rear plate 658 forming an L-shaped cross-section. Similarly, the right side member 650 of the carriage 622 comprises a right side plate 660 and a rear plate 662, forming an L-shaped cross-section. The carriage upper transverse member 652 overlies and is secured to the rear plates 658 and 662 and is mounted to the left and right side plates 656 and 660 with wing brackets 664. Similarly, the lower transverse member 654 overlies and is secured to the rear plates 658 and 662 and is mounted to the left and right side plates 656 and 660 with the wing brackets 666. Mounting blocks 668 and 670 are mounted on the left and right side plates 656 and 660 for mounting an end of actuators 624 and 626 which can extend and retract to translate the carriage 622 along the sides 628 and 630 of the lift mast 620.

Left and right trunnions 672 and 674 are mounted on carriage lower transverse member 654, for pivotally mounting the planter assembly 606, as described in more detail below. Left and right brackets 676 and 678 are mounted on carriage upper transverse member 652 for mounting the ends of actuators 726 and 728, e.g., piston and cylinder devices, for pivoting the planter assembly 606 between its planting and transport positions.

In various embodiments, sets of track erasing cultivators 680 and 682 (see FIG. 29) are mounted on either side of the carriage 622 so that the track erasing cultivators 680 and 682 move with the carriage 622 when the carriage 622 moves to transition the planter assembly 606 between its "planting" and "transport" positions. The cultivators 680 and 682 are positioned directly behind the wheels on the left and right side of the vehicle 602 to fill or "erase" the track formed by the wheels. The cultivators 680 and 682 are mounted on L-shaped brackets 684 and 686 that are pivotally mounted to the carriage 622. Actuators 688 and 690, e.g., piston and cylinder devices, are connected between the L-shaped brackets 684 and 686 and the carriage 622 to pivot the brackets 684 and 686, and thus, the track erasing cultivators 680 and 682 thereon, between a "planting" (see FIG. 23) and a "transport" (FIG. 24) position independent of the planter assembly 606.

The planter assembly 606 comprises a frame 700 (see FIGS. 31, 32, 32A, and 32B) pivotally mounted to the carriage 622 via the trunnions 672 and 674. The frame 700 comprises a transversely extending support 702, and transversely extending tool bar 704, generally parallel to, but spaced rearwardly of, the support 702, by a plurality of spacers 706, 708, 710, 712, and 714. In various embodiments the support 702 and the tool bar 704 can be made of square or box beams, and the spacers 706, 708, 710, 712, and 714 can be made of I-beams. Two arms 716 and 718 extend through the support 702 and the tool bar 704, projecting forwardly of the support. The forward ends of the arms 716 and 718 have bearings 720 which are pivotally mounted in trunnions 672 and 674 on the carriage 622. Brackets 722 and 724 are mounted on the arms 716 and 718 for mounting the ends of actuators 726 and 728, e.g., piston and cylinder devices. The opposite ends of the actuators 726 and 728 are mounted in brackets 676 and 678 on the carriage 622. Thus, the operation of the actuators 726 and 728 causes the frame 700 to pivot about the trunnions 672 and 674.

Figure 31:
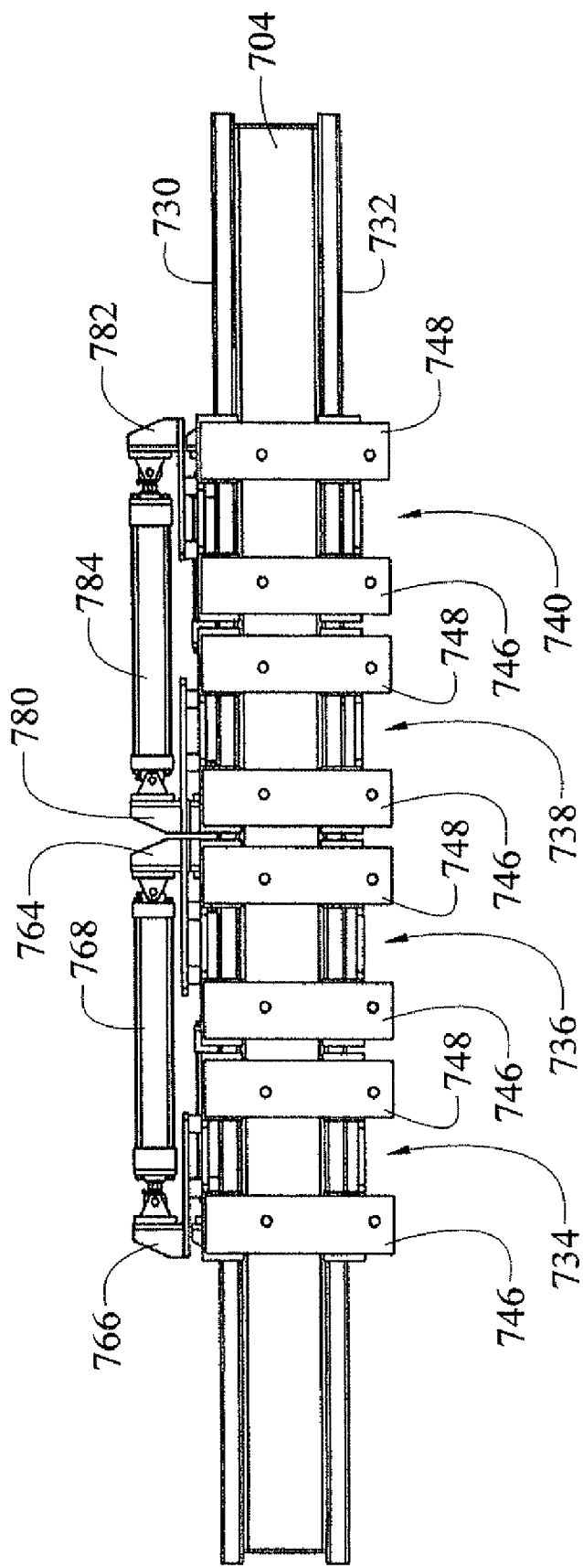
FIG. 31 is a rear elevation view of the planter of the various embodiments of the planting system, with the row planting units removed, in accordance with various embodiments of the present disclosure.
Figure 32:
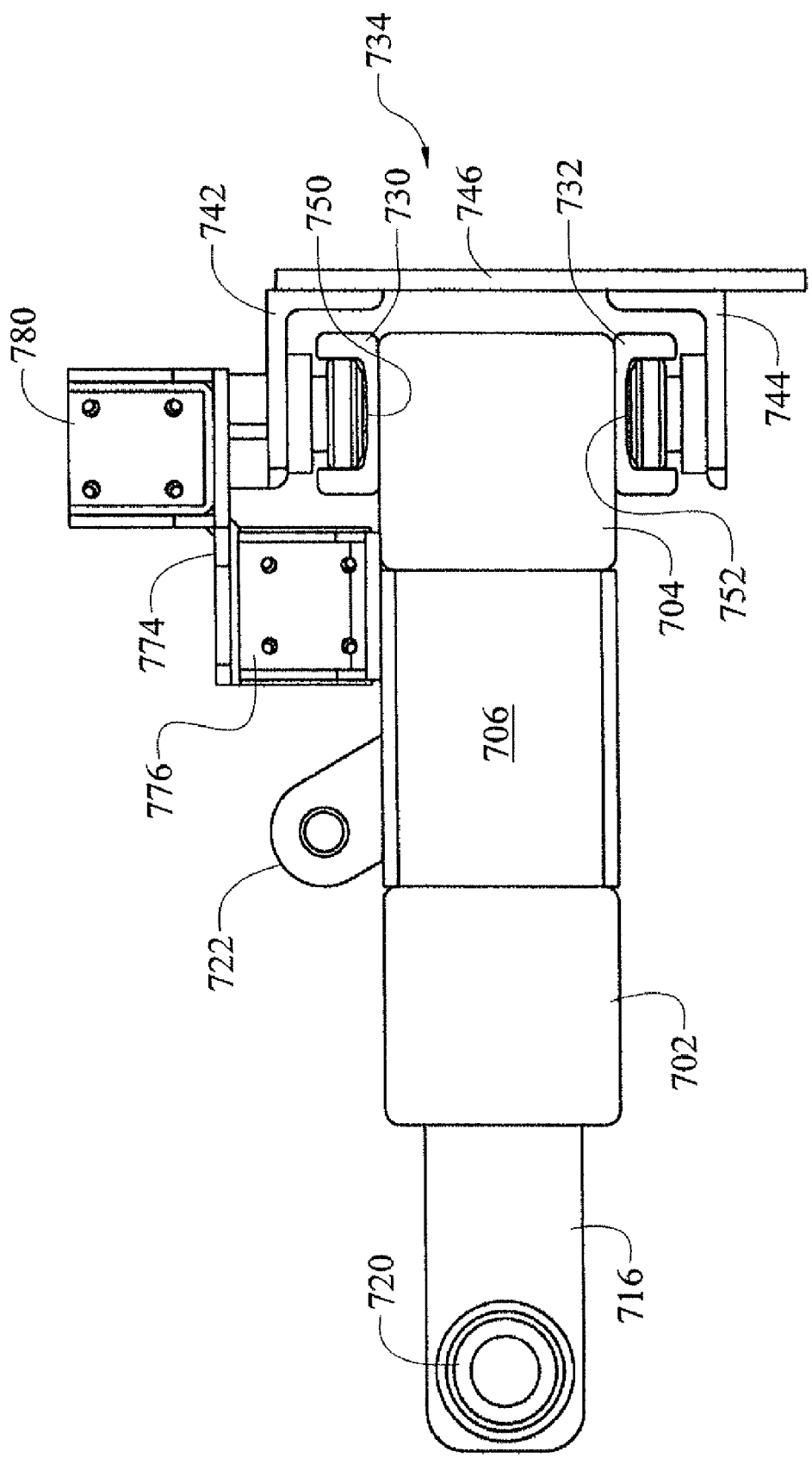
FIG. 32 is an enlarged partial side elevation view of the planter of the various embodiments of the planting system, showing the mounting of the row planting units, in accordance with various embodiments of the present disclosure.
Figure 32A:
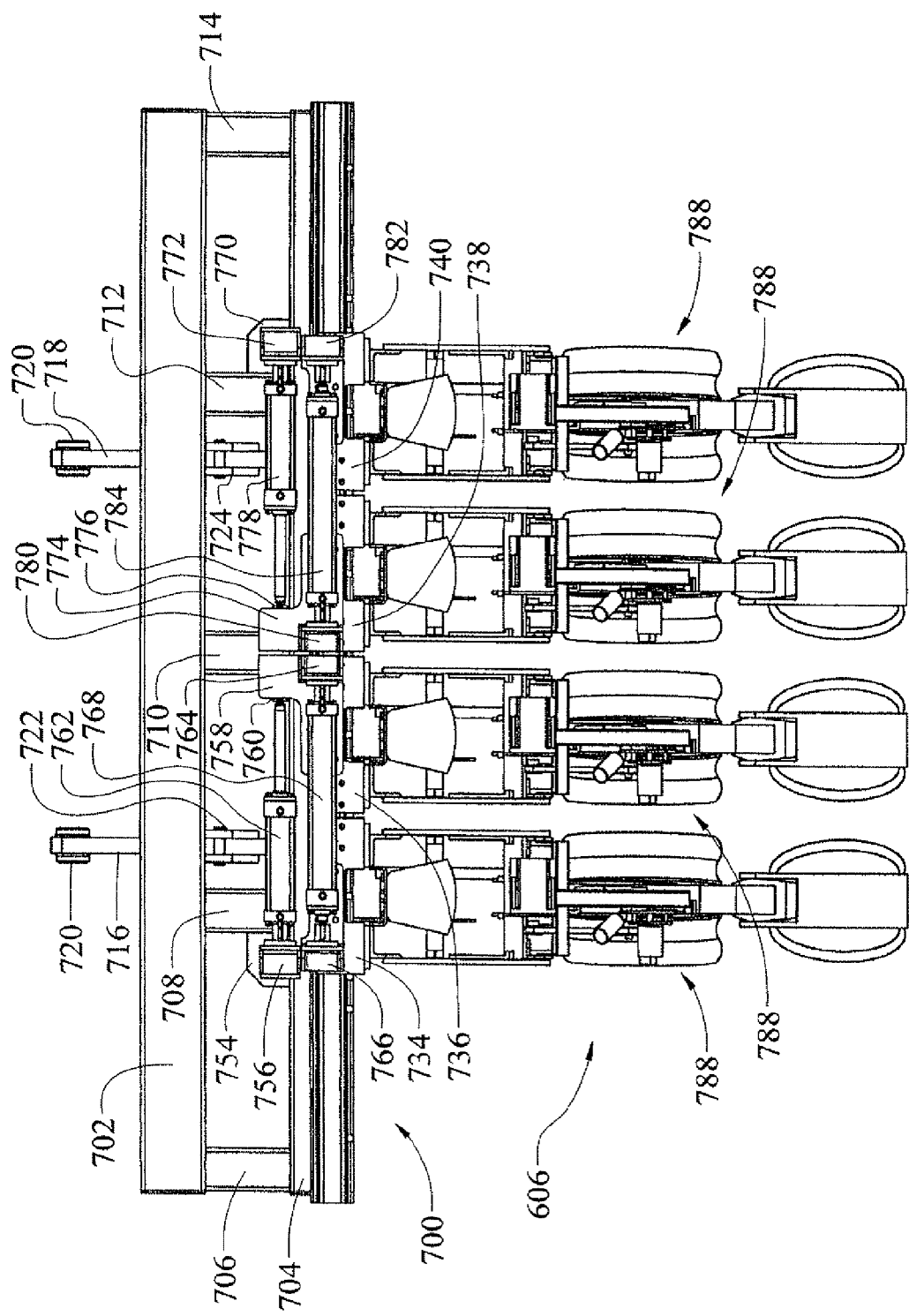
FIG. 32A is a top plan view of the planter of the various embodiments of the planting system, showing the row planting units in their collapsed configuration, in accordance with various embodiments of the present disclosure.
Figure 32B:
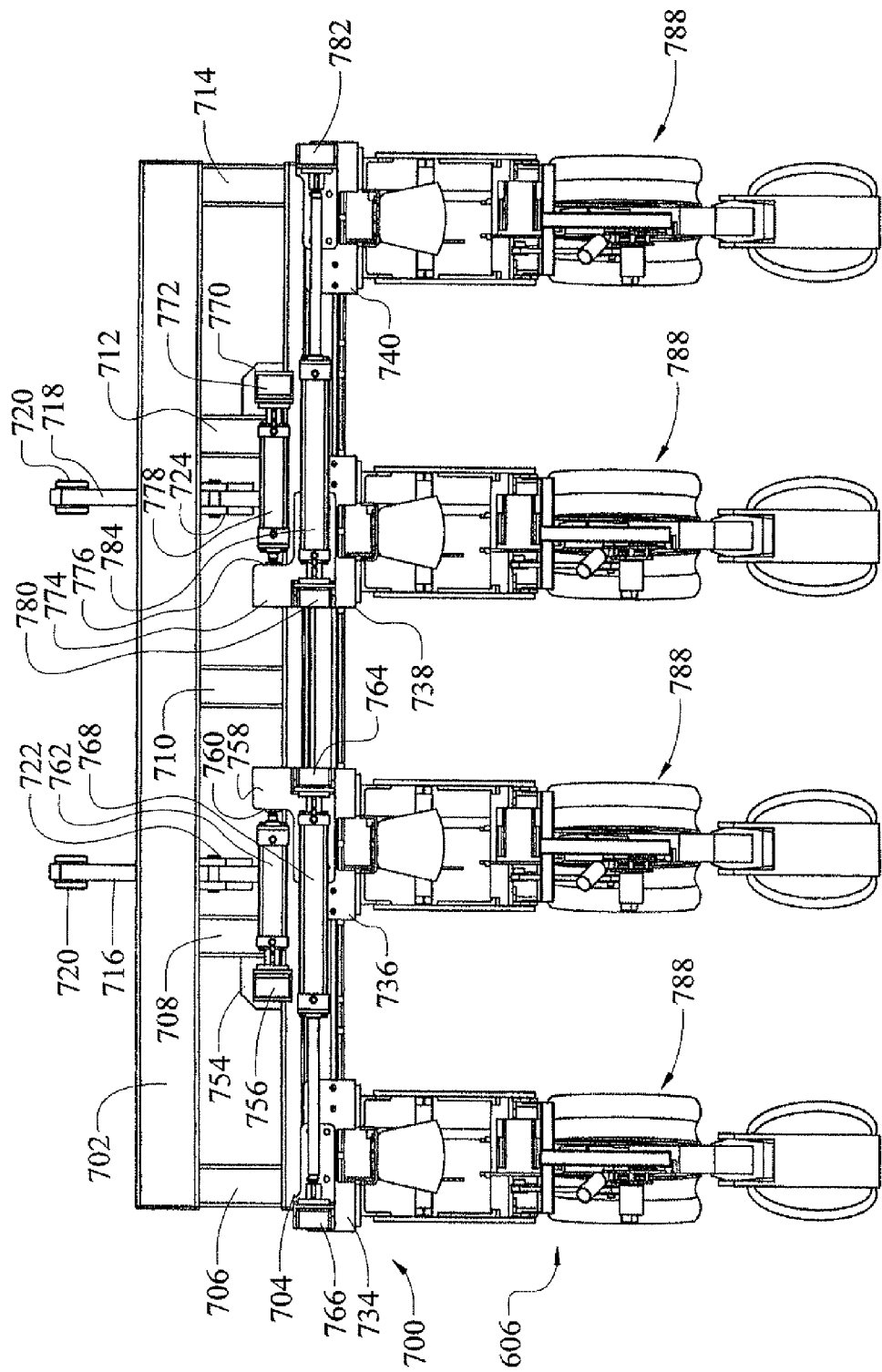
FIG. 32B is a top plan view of the planter of the various embodiments of the planting system, showing the row planting units in their expanded configuration, in accordance with various embodiments of the present disclosure.

Upper and lower tracks 730 and 732 are mounted on the top and bottom surfaces of the tool bar 704. The tracks 730 and 732 can be upwardly and downwardly facing sections of C-channel. One or more carriages, four carriages 734, 736, 738, and 740 are exemplarily illustrated in FIGS. 31, 32A and 32B, are slideably mounted on the tracks 730 and 732 to slide along the tool bar 704. As described below, each of the one or more carriages, e.g., carriages 734, 736, 738, and 740 has a respective planting unit 788 (described below) mounted thereto. As shown in FIG. 32, each of the carriages 734, 736, 738, and 740 comprises upper and lower members 742 and 744, which may be sections of L-stock. The carriages 734, 736, 738 and 740 further comprise first and second plates 746 and 748 extending between the upper and lower members 742 and 744. Sliders 750 and 752, e.g., rollers or wheel and bearing assemblies, are mounted on the upper and lower members 742 and 744, and slide, or roll, within the upper and lower tracks 730 and 732. The plates 746 and 748 form a mounting surface for planting units 788, as described in more detail below. The spacing between the planting units 788 can be controlled by controlling the spacing of their respective carriages 734, 728, 730 and 732.

In other various embodiments, a plurality of actuators 762, 768, 778 and 784, e.g., piston and cylinder devices, move the carriages 734, 736, 738 and 740 along the tool bar 704. As shown in FIGS. 32A and 32B, a bracket 754 is mounted on spacer 708, for supporting an actuator mount 756. An L-shaped plate 758 is mounted on carriage 736, for supporting an actuator mount 760. Actuator 762, e.g. piston and cylinder device, extends between the actuator mount 756 and 760 for moving the carriage 736 along the tool bar 704. An actuator mount 764 is mounted on the L-shaped plate 758 on the carriage 736. An actuator mount 766 is mounted on the top of the carriage 734. Actuator 768, e.g., a piston and cylinder device, extends between the actuator mount 764 and the actuator mount 766 for moving the carriage 734 relative to carriage 736. Similarly, as also shown in FIGS. 32A and 32B, a bracket 770 is mounted on spacer 712, for supporting an actuator mount 772. An L-shaped plate 774 is mounted on carriage 738, for supporting an actuator mount 776. Actuator 778, e.g., a piston and cylinder device, extends between the actuator mount 772 and 776 for moving the carriage 738 along the tool bar 704. An actuator mount 780 is mounted on the L-shaped plate 774 on the carriage 738. An actuator mount 782 is mounted on the top of the carriage 740. Actuator 784, e.g., a piston and cylinder device, extends between the actuator mount 780 and the actuator mount 782 for moving the carriage 740 relative to carriage 738. Accordingly, each of the row units 788 can be automatically positioned along the tool bar 704 to provide any desired row spacing. That is, each of the one or more carriages mounted on the tool bar 704, e.g., carriages 734, 736, 738 and 740, can be automatically positioned at any desired point along the tool bar 704 via the respective actuator, e.g., actuators 762, 768, 778 and 784, thereby dictating the space that will be provided between adjacent furrow rows created by the respective planting units 788.

Figure 33A:
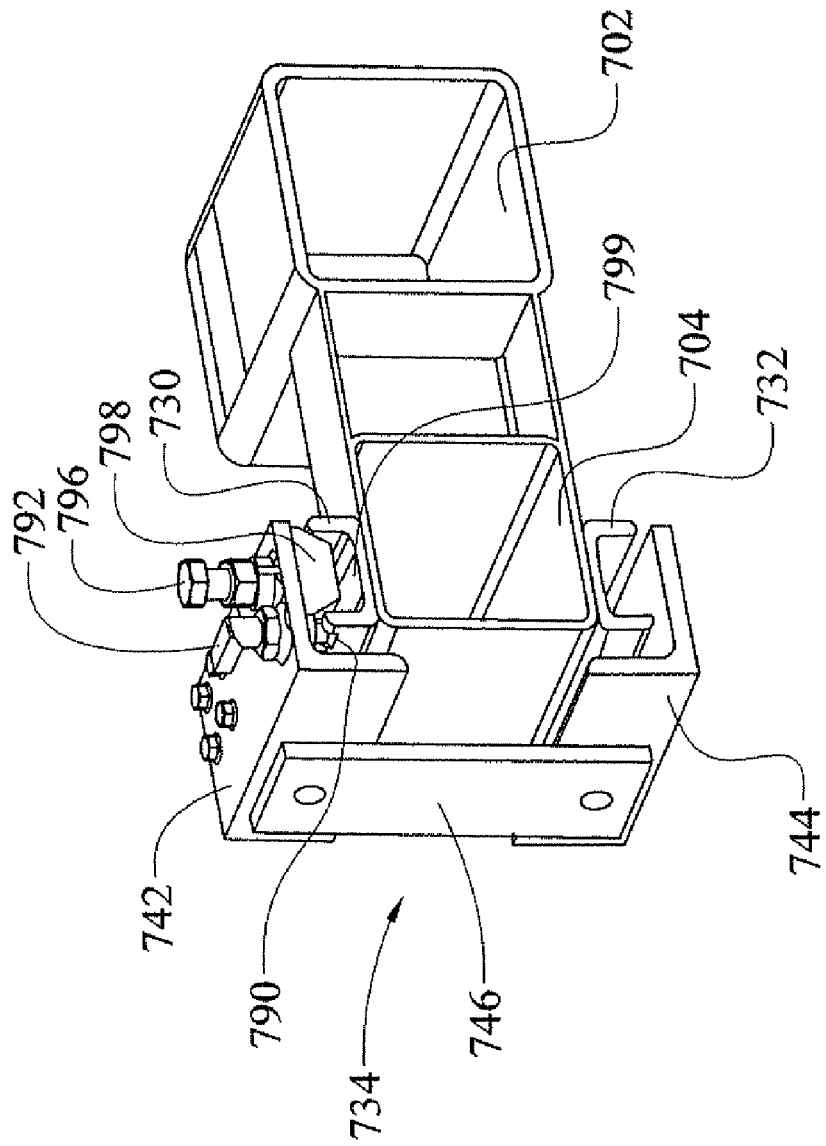
FIG. 33A is a partial isometric view of a mounting for the row planting unit, in accordance with various other embodiments of the present disclosure.
Figure 33C:
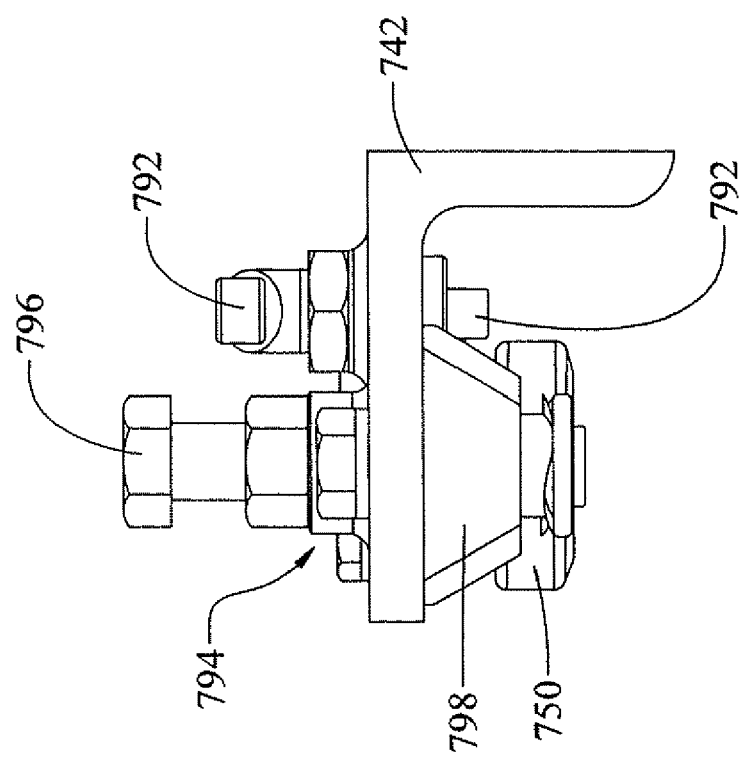
FIG. 33C is an end view of a portion of the carriage shown in FIG. 33B illustrating a locking mechanism, in accordance with various embodiments of the present disclosure.
Figure 33B:
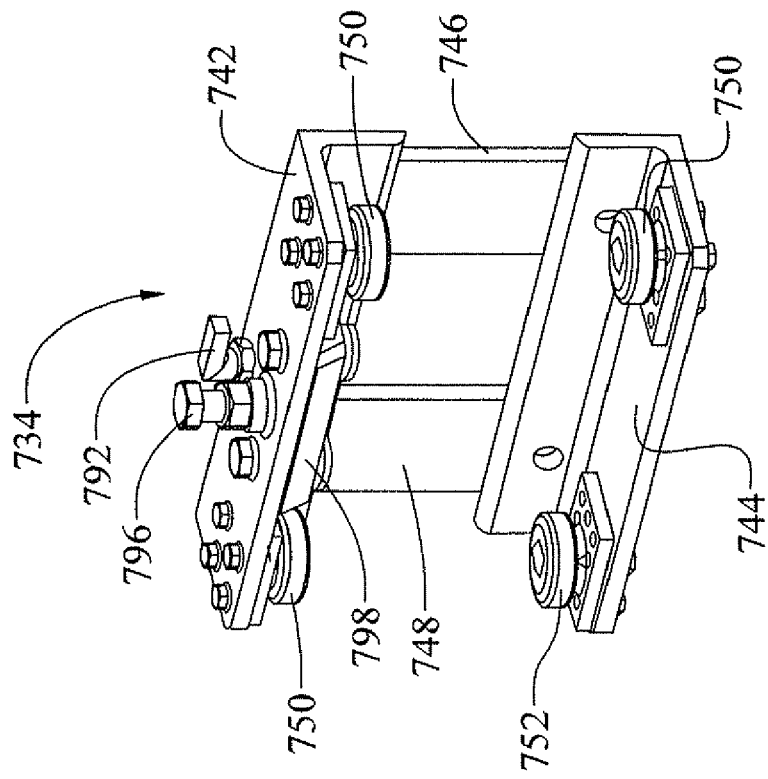
FIG. 33B is an isometric view of a carriage included in the mounting shown in FIG. 33A.

Referring now to FIGS. 33A, 33B and 33C, in various embodiments, each of the one or more carriages, e.g., carriages 734, 736, 738 and 740, can be structured to be manually moved and positioned along the tool bar 704. As described above, each of the exemplary carriages 734, 736, 738 and 740 are substantially identical, therefore, for clarity and simplicity, a single carriage, i.e., carriage 734 will be described and illustrated with reference to FIGS. 33A, 33B and 33C. In such implementations, the carriage 734 can be mechanically retained in a desired location along the tool bar 704 using any suitable "locking" or retention means, such as locking pins, nuts and bolts, clamps, wedges, "brake-like" friction devices that frictionally engage the tool bar 704, etc. For example, as illustrated in FIGS. 33A, 33B and 33C, in various embodiments, the carriage 734 includes the sliders 750 and 752 that allow the carriage 734 to be moved along the tool bar 704. In various embodiments, the sliders 750 and 752 are roller bearings that roll within the respective upper and lower tracks 730 and 732 to position the respective planting unit 788 along the tool bar 704. In accordance with various implementations, a plurality of notches 790 are machined, or formed, into an edge of the upper of the track 730 at predetermined increments.

Additionally, an alignment pin 792, e.g., a spring loaded pin, is mounted to and extends through the upper member 742 for engaging in a desired one of the notches 790 to position the carriage 734 and respective planting unit 788 at a desired location along the tool bar 704. Particularly, the alignment pin 792 can be lifted, or raised to disengage the alignment pin 792 from a particular notch 790. With the alignment pin 792 disengaged, the carriage 734 and respective planting unit 788 can be moved along the tool bar 704, via the sliders 750/752 and the upper and lower tracks 730/732. Once the carriage 734 and respective planting unit 788 are in a desired location along the tool bar 704 the alignment pin 792 can be released such that the pin 792 engages one of the notches 790 at the desired location along the tool bar 704.

In various embodiments, the carriage 734 further includes a placement locking mechanism 794 for firmly and stably retaining the carriage 734 and respective planting unit 788 in the desired location along the tool bar 704. In various implementations, the placement locking mechanism 794 can include a jack screw 796, i.e., bolt, threaded through the upper member 742 having a locking wedge 798 fixed to a distal end of the jack screw such that the locking wedge is positioned between the upper track 730 and the upper member 742. The locking wedge 798 is shaped such that a top portion of the wedge has a width that is greater than a width of a channel 799 of the upper track 730. Once the alignment pin 792 has been engaged with a desired one of the notches 790, the jack screw 796 can be tightened, i.e., threaded further into the upper member 742 such that the locking wedge 798 is forced into the upper track channel 799 and firmly engages the upper track. Accordingly, the carriage 734 and respective planting unit 788 is firmly retained in the desired position along the tool bar 704. More particularly, firmly engaging the locking wedge 798 with the upper track 730 removes play, or slop, between carriage 734 and the toolbar 704, and thereby stably retains the respective planting unit 788 at the desired position along the toolbar 704.

Figure 34:
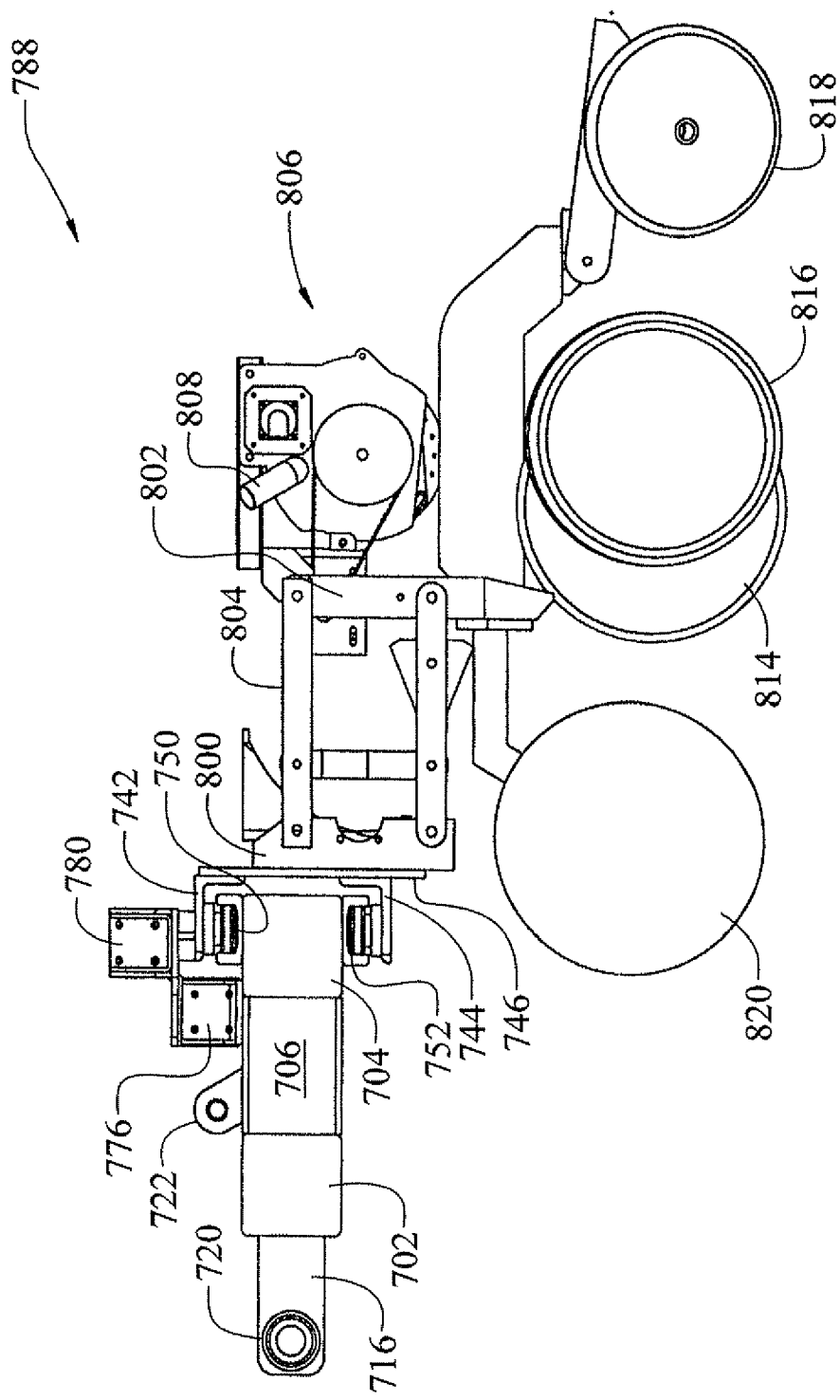
FIG. 34 is a side elevation of a row planting unit forming a part of the various embodiments of the planting system.
Figure 35:
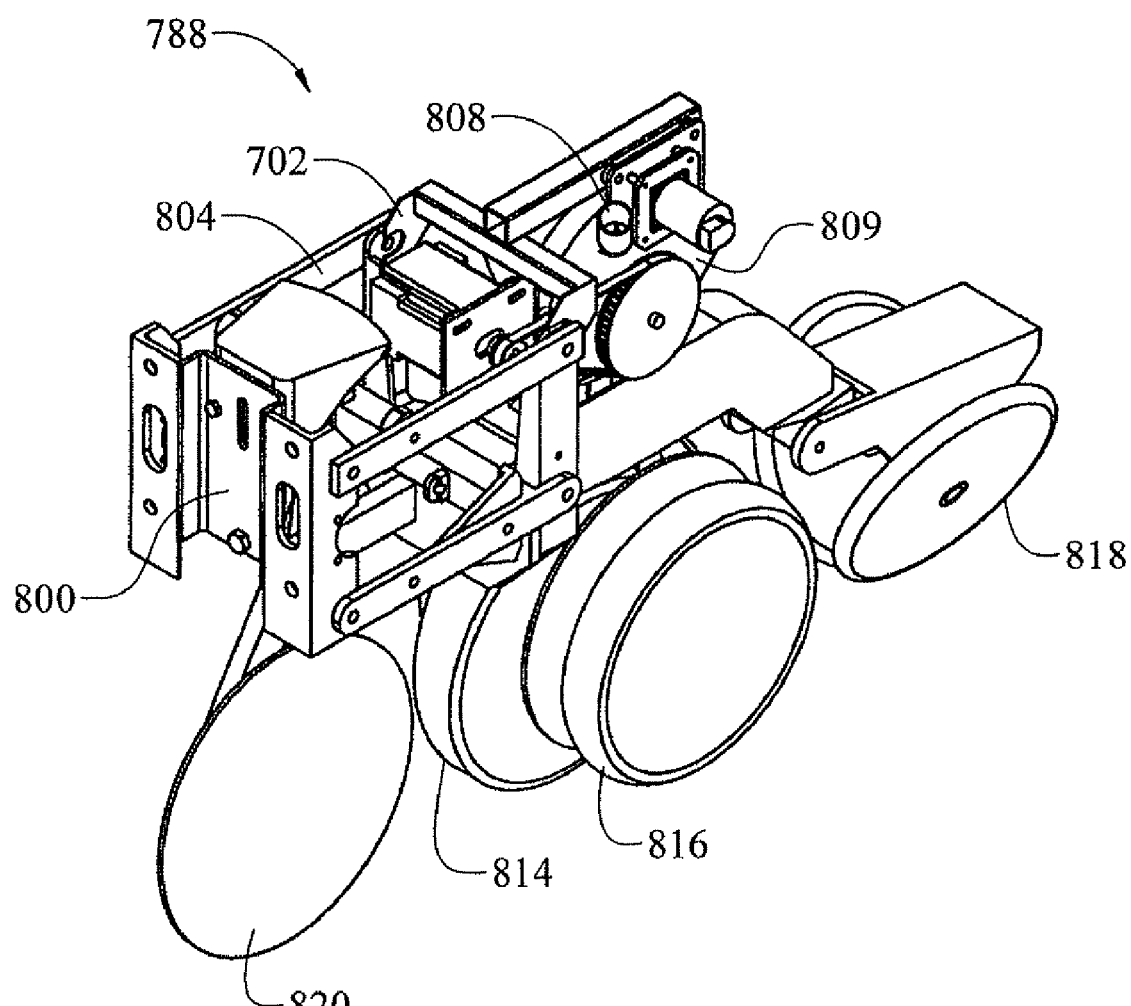
FIG. 35 is a perspective view of a row planting unit forming a part of the various embodiments of the planting system.

Referring now to FIGS. 34 and 35, as set forth above, each of the planting units 788 is secured to a carriage 734, 736, 738, and 740 for movement along the tool bar 704. In various embodiments, each of the planting units 788 comprises a mounting plate 800 and a frame 802 coupled to the mounting plate 800 by a parallel linkage 804. The parallel linkage 804 allows the planting unit 788 to move up and down to a limited degree relative to the toolbar 704. Additionally, referring to FIGS. 36, 36A and 36B, in various embodiments, each planting unit 788 includes an individually controlled seed metering system 806 operable to automatically dispense seed into a furrow created by the respective planting unit 788. Each seed metering system 806 can be supplied seed from the seed supply system via a seed inlet 808. In various embodiments, the seed supply system can be a pneumatically operated system, such as the systems described herein including the seed transport systems 32, 116/118 or 1004 and the seed storage system 30, 114 or 1008, which can be conveniently mounted on the bed 616 of the vehicle 602.

Figure 36:
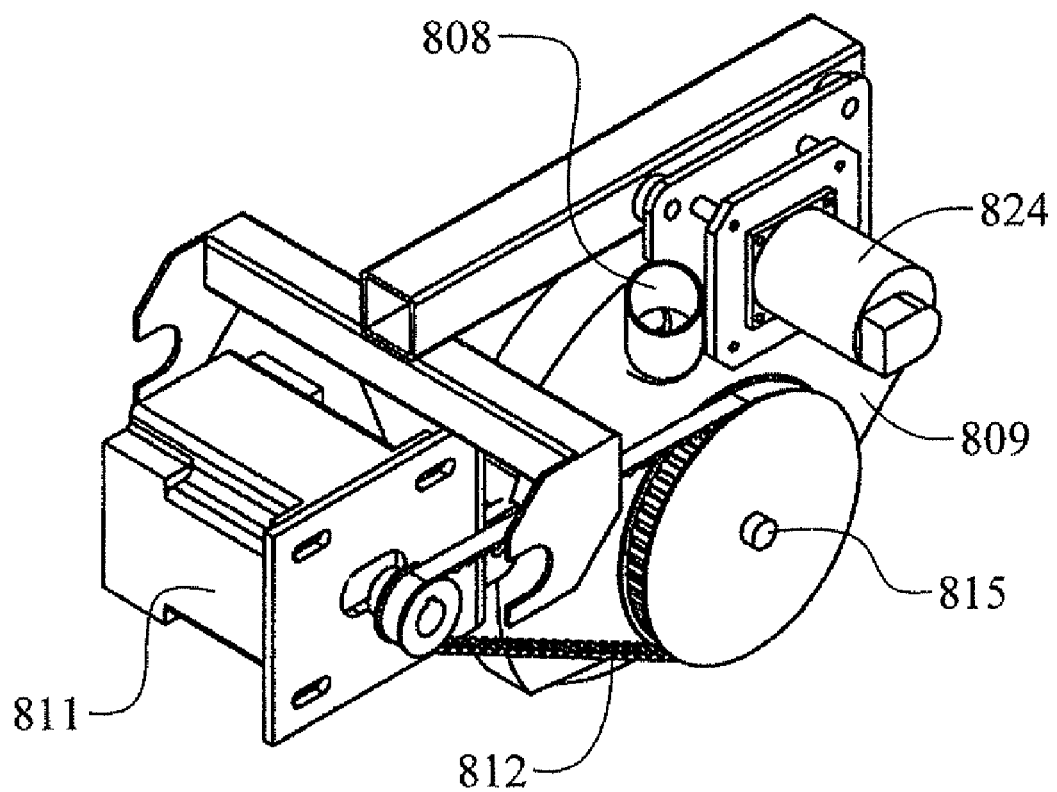
FIG. 36 is a perspective view of the seed meter forming a part of a row planting unit.
Figure 36A:
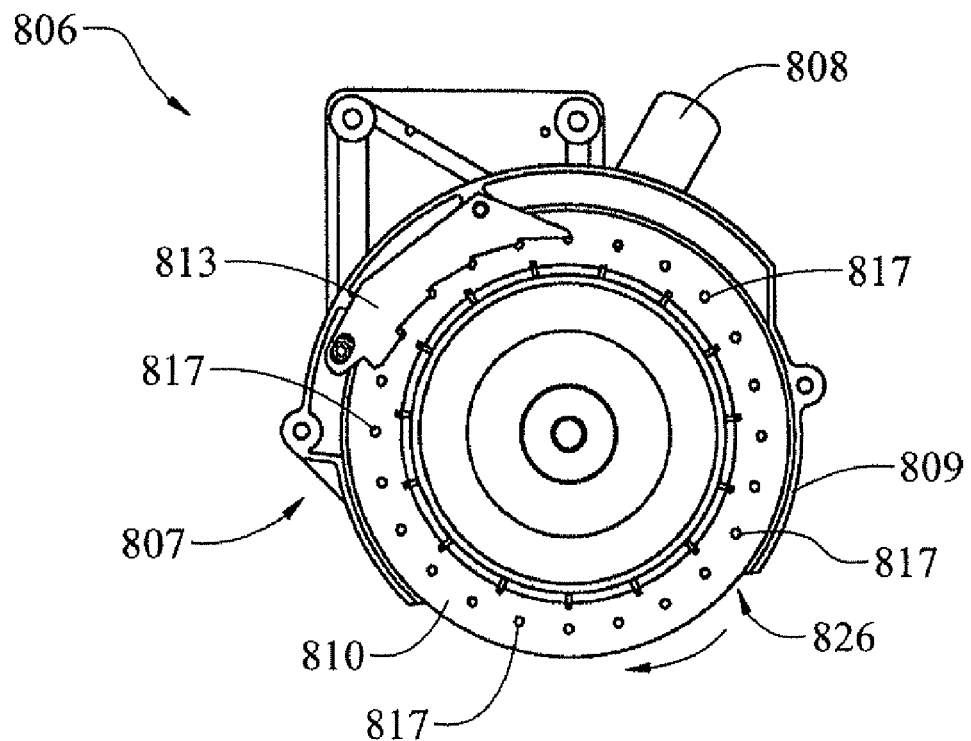
FIG. 36A is a side view of seed metering system having one half of a hopper of the seed metering system removed to illustrate a seed singulator system enclosed within the hopper, in accordance with various embodiments of the present disclosure.
Figure 36B:
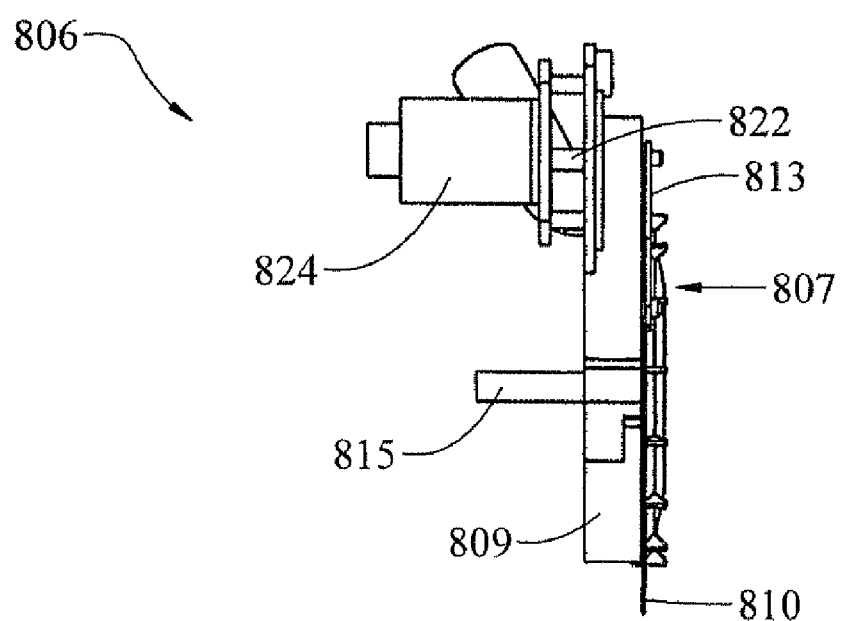
FIG. 36B is a rear view of the seed metering system shown in FIG. 36A.

Each seed metering system 806 includes a seed singulator system 807 enclosed and operable within a hopper 809 to singulate seeds transferred to the hopper 809 and dispense the seeds at a desired rate. With particular reference to FIGS. 36, 36A and 36B, each singulator system 807 includes a seed metering plate 810 and a singulating arm 813. The seed metering plate 810 is independently driven by a seed metering plate motor 811, e.g., a stepper motor, via a precision drive system, such as a toothed belt 812. The seed metering plate 810 is mounted to a shaft 115 of the seed metering plate motor 811 and includes a plurality of spaced apart recessed ports 817 that extend through the seed metering plate 810 and are communicatively coupled to a vacuum system (not shown) such that a vacuum can be provided at each of the recessed ports 817.

Seeds to be dispensed are routed into the hopper 109 and a vacuum is provided to at least some of the recessed ports 817. The seed metering plate 810 is then rotated, via the seed metering plate motor 811, such that recessed ports 817 sequentially rotate through the seeds collected in the hopper 809. As the seed metering plate 810 and the recessed ports 817 incrementally pass through the seeds collected in the hopper 809, one or more seeds are picked up and held at each recessed port 817 by the vacuum provided at the respective recessed ports 817. As the seed metering plate 810 continues to rotate, the seeds are carried toward the singulating arm 813 where the one or more seed retained at each recessed port 817 are singulated. That is, if more than one seed is carried by a respective recessed port 817, the sigulating arm 813 will dislodge, remove or push off seeds in excess of one seed from the each recessed port 817 such that a single seed remains retained by each recessed port 817 and is carried past the singulating arm 813. Additionally, in various embodiments, the sigulating arm can control the size of seed dispensed from the seed metering system 806 by dislodging, removing or pushing off seeds in excess of a desired size from the each recessed port 817 such that a single seed of a particular size remains retained by each recessed port 817 and is carried past the singulating arm 813.

As best illustrated in FIG. 36B, the singulating arm 813 is mounted to an eccentric, or 'off-center', shaft 822 of a singulating arm motor 824, e.g., a stepper motor. By controlling the eccentric rotation of the shaft 822 the singulating arm 813 can be moved circumferentially forward and backward and radially inward and outward with respect to the seed metering plate 810 and the recessed ports 817 therein. Thus, by controlling the singulating arm motor 824, it is possible to control singulating of the seed dispensed by the respective planting unit 788. After singulation by the singulating arm 813, the seed remaining retained by each recessed port 817 is carried to dispensing point 826 near the bottom of the hopper 809. At the dispensing point 826 the vacuum provided to each recessed port 817 is terminated allowing the respective seeds to be released from, i.e., drop off of, the seed metering plate 810 and be dispensed to the ground within the furrow created by the planting unit 788.

Accordingly, the seed metering system of 806 of each plating unit 788 includes the seed metering plate motor 811 that controls the speed of rotation of the seed metering plate 810 and the singulating arm motor 824 that controls the positioning of the singulating arm 813. More particularly, the seed metering plate motor 811 controls the rate at which seeds are dispensed, i.e., the seed spacing in the furrow, and the singulating arm motor 824 controls the sigulating, i.e., the quantity and/or size, of the seed dispensed from the respective seed metering system 806. Thus, the seed metering plate motor 811 and the singulating arm motor 824 of each seed metering system 806 are accurately and independently controlled for each respective planting unit 788. Therefore, the seed singulation and dispensing rate provided by each respective planting unit 788 can be automatically, accurately and independently controlled as the planter 603 traverses the field, i.e., "on the fly".

Referring again to FIGS. 34 and 35, each planting unit 788 includes a double disc furrow opener 814 having depth gauging wheels 816. The depth of the planting furrow is controlled by the positioning of a handle (not shown) which controls the vertical position of the depth gauging wheels 816 relative to the furrow opener 814. Each planting unit 788 additionally includes closing wheels 818 for closing the furrow into which the seeds have been deposited. A forward mounted coulter 820 is provided for slicing through crop residue.

In operation, the planter system 600 is driven to the field to be planted, and directly into the field. Once in the field, the PULP assembly 604 is operated to position the planter assembly 606 it the deployed position by operating actuator 624 and 626 to lower the carriage 622 relative to the mast 620, and by operating the actuators 726 and 728 to pivot the planter assembly 606 to its planting position. The individual planting units 788 can be manually loaded with seed, or an automated seed supply system can be used to convey seeds to the planting units 788, such as the system described above and illustrated in FIG. 1, including the seed transport system 32 and seed storage device 30; or the system described above and illustrated in FIGS. 2-18, including the seed transport systems 116/118 and the seed storage system 114; or the system described below and illustrated in FIG. 39-45 including seed transport system 1008 and seed storage system 1004. As also described herein, in various implementations, the seed supply system can both supply and remove seeds from each individual planting unit 788 so that the seeds being planted can be conveniently changed on the fly.

The inter-row spacing of the planting units 788, and thus, the spacing of the planted rows, can be easily changed, as described above, by operating actuators 762, 768, 778 and 784, in various embodiments, or by manually manipulating the carriages the alignment pins 792 and jack screws 796, in various other embodiments, to move carriages 734, 736, 738 and 740 and their respective planting units 788 along the tool bar 704.

The embodiments that utilize the actuators 762, 768, 778 and 784 allow the spacing of the planting units 788 to be changed even as the planter 603 is moving to allow rows to be made with variable spacing. Accordingly, in such embodiments, the planter assembly 606 allows a user to change the spacing between complete rows, or to make partial rows with different spacings from the adjacent rows.

Additionally, as described above, in various embodiments, the planter assembly 606 can allow the user to change the singulation, i.e., number and size of seeds dispensed from the seed metering system, and spacing between the seeds in a row, permitting adjacent rows with different seed spacings, or different seed spacings within the same row and/or different quality and quantity (i.e., size and number) of seeds at each planting location. This ability to select the spacing between adjacent rows, and/or the spacing between adjacent seeds in the rows, and/or the quality and quantity of seeds planted, allows customized planting, facilitating the planting of multiple test plots of different interseed spacings and qualities in a single field. For example, a particular type of seed can be test planted at a variety of spacings to determine the optimum spacing. The planter 603 and planter assembly 606 can also be used in production planting to plant seeds at varying spacings according to local conditions, and planting can even be automated to follow a pre-programmed planting plan (for example using a GPS or other positioning system) or it can be based upon an assessment of local conditions.

Moreover, coupled with the ability to change the type of seeds being planted, as disclosed herein, the planter assembly 606 allows a variety of different seeds to be planted at a variety of spacings in the same field. Particularly, the planting system 600 makes it possible to test plant a variety of seeds to find the best seed and the optimal spacing. Planter assembly 606 can also be used in production planting, allowing the user to change seeds and/or seed spacing to optimize production. Additionally, such custom planting can be according to a pre-programmed planting plan (for example using a GPS or other positioning system), or it can be based upon an assessment of local conditions.

Figure 37:
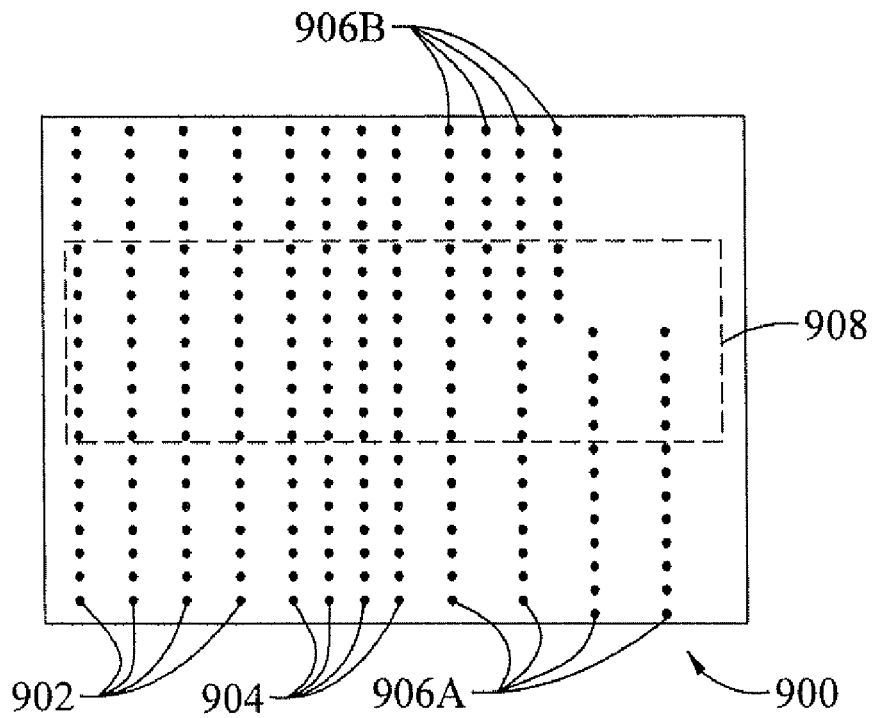
FIG. 37 is a plan view of a field planted in accordance with some embodiments of the systems and methods of the present disclosure.
Figure 38:
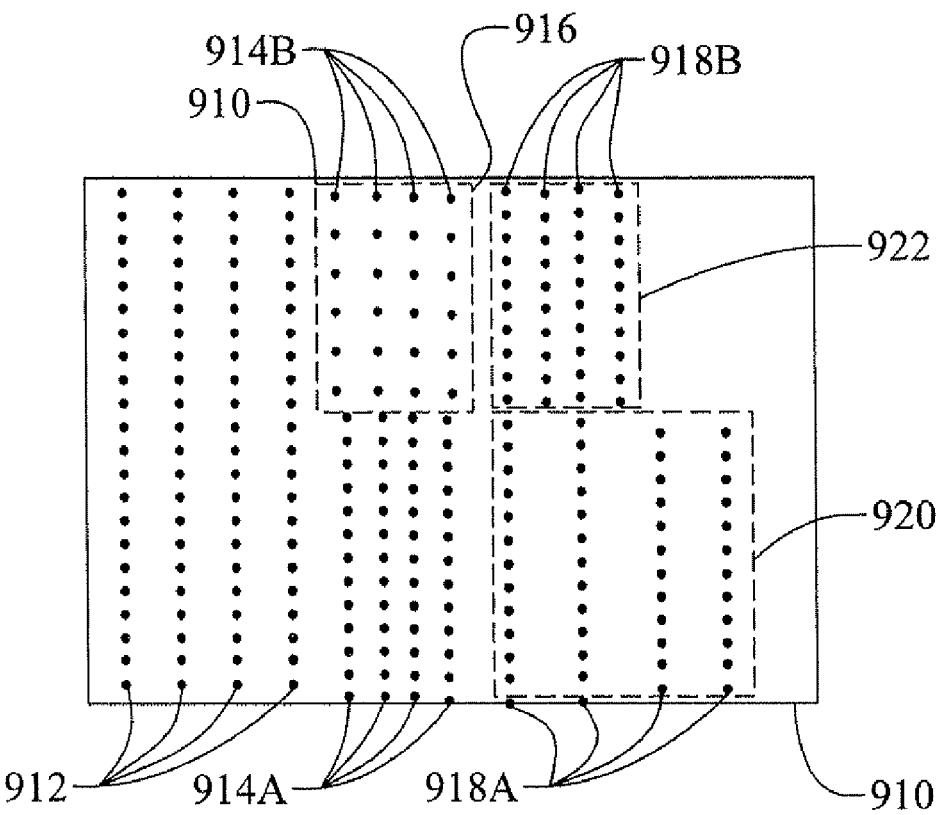
FIG. 38 is a plan view of a field planted in accordance with some embodiments of the systems and methods of the present disclosure.

Referring now to FIGS. 37 and 38, the systems and methods of the various embodiments of the present disclosure can be used to plant seeds in a field 900. Although, the planting system 600 described herein can include one or more planting units 788, for exemplary purposes only, in various embodiments, the planter 600 has been illustrated and described to include four planting units 788. The scope of the present disclosure can include planters 600 that include one, two, three, four, five, six or more planting units 788 and should not be limited to embodiments including four planting units 788. However, for simplicity, FIGS. 37 and 38 will be described with reference to the planting system 600 including four planting units 788. The planting system 600 can traverse a field 900 and plant a first set of four rows 902 at a first inter-row spacing. The planting system 600 can then traverse the field 900 again and plant a second set of four rows 904 at a second inter-row spacing. The planting system 600 can then traverse the field 900 yet again, planting a set of four partial rows 906A at a third inter-row spacing, and the spacing of the planting units 788 is changed and a set of four partial rows 906B at a fourth spacing is planted. Thus, the growth of seeds at a plurality of different spacings can be tested in a single field. Furthermore, in various embodiments, a first type of seed being planted by the planter 603 and planter assembly 606 can be changed to a different type of seed, illustrated as section 908, while the planting system 600 is moving. That is, in various embodiments, the seed type can be changed on the fly, without stopping movement of the planter assembly 606 across the field 900. This allows the comparison between two or more types of seeds at a variety of spacings.

As shown in FIG. 38 the systems and methods of the various embodiments of the present disclosure can be used to plant seeds in a field 910. For example, the planting system 600 can traverse a field 910 and plant a first set of four rows 912 at a first inter-row spacing. The planting system 600 can then traverse the filed 910 again while planting a set of four partial rows 914A at a second inter-row spacing, and first inter-seed spacing within the rows. The spacing of the planting units 788 and the rate of operation of the seed metering system 806 can be changed midway across the field 910 such that a set of four partial rows 914B at a third inter-row spacing, and a second inter-seed spacing is planted, forming section 916. The planting system 600 can then traverse the field 910 a third time, and the spacing of the planting units 788 and the rate of operation of the seed metering system 806 can be changed again to plant a set of four partial rows 918A, forming a section 920. The spacing of the planting units 788 and the rate of operation of the seed metering system 806 can then be changed yet again to plant a set of four partial rows 918B, forming a section 922. The various sections of the field 910 can be further divided into subsections having different types of seeds planted in each subsection so that different types of seeds can be compared at different inter-row and inter-seed spacings.

The density of a population of plants within a field can vary depending on the particular crop or variety. For example, the density of seeds to be planted in a field, including both the density of seeds planted in a particular row and the inter-row spacing of rows within the field, can depend on numerous factors such as the size and shape of the seed, local conditions such as the location and soil type of the field, and the post-emergence characteristics of the plant. Therefore, methods of the present disclosure allow for the planting of fields wherein row density and inter-row spacing can be varied within the field to customize the population based on seed type and local conditions.

Accordingly, in various embodiments, a method of the present disclosure provides for the planting of seeds in plots having variable inter-row spacing within a field. The method comprises loading seed into a multi-row planter having independently movable planting units and traversing the field to plant seed in a first plot of seed in a portion of the field. The inter-row spacing of the planting units on the multi-row planter is then changed by moving at least one planting unit and the field is traversed to plant a second plot of seed in a second portion of the field. In various embodiments, the inter-row spacing of the planting units is automatically changed.

In other embodiments, a method of the disclosure provides for the planting of seeds in plots having variable row density. In such embodiments, the planting units of the multi-row planter are independently powered such that the planting rate of at least one planting unit can be automatically increased or decreased during planting (i.e., either while the planter is being traversed across a field or while the planter is being turned for a subsequent pass across the field) to correspondingly increase or decrease the density of seeds planted in at least one row of a plot.

Various embodiments of the planting system and methods of the present disclosure are particularly useful in planting test plots of seeds as are commonly used for the evaluation of different seed varieties. In particular, the embodiments of the planting system and methods of the present disclosure allow for test plots to be customized to local conditions for evaluating the characteristics of plants cultivated from particular seed types and particular planting conditions. Such characteristics can be used to determine optimum planting parameters for particular seed types, soil types, regions, climates, etc., which can be used by seed companies to market the seeds and by farmers to make planting decisions for the efficient use of field resources to maximize crop yield. For example, test plots planted according to the methods of the present disclosure can be used to gather data related to population and yield for specific hybrids and soil types or locations so that farmers can determine the optimum population by hybrid and location based on input costs.

It is important to note that test plots can be designed to compare different seed types or to determine the optimum planting parameters for a particular seed type or mix of seed types in a location. Accordingly, one skilled in the art can prepare planting plans to determine optimum planting parameters (including row density and inter-row spacing) for a particular seed type or to compare different seed types within a test field. Likewise, the planter and methods of the present disclosure will allow for the planting of commercial fields wherein a farmer can automatically vary the inter-row spacing and/or row density depending on the particular type of seed (i.e., the crop, variety, or mix of varieties), the local soil conditions, geography, etc.

Referring now to FIG. 39, in various embodiments, each planting unit 788 includes a seed storage system 1004 and a seed transport system 1008 for transferring seed from the seed storage system 1004 to the respective seed metering system 806. Although the seed storage system 1004 and the seed transport system 1008 will be described herein as being implemented with a planting unit 788, it should be understood that seed storage system 1004 and the seed transport system 1008, as described herein, can be implemented with various other planting units, e.g., planting units 28 and 110, by incorporating minor alterations to the respective planting unit and/or the seed storage system 1004 and the seed transport system 1008, as would be readily recognizable by one of reasonable skill in the art.

Figure 41:
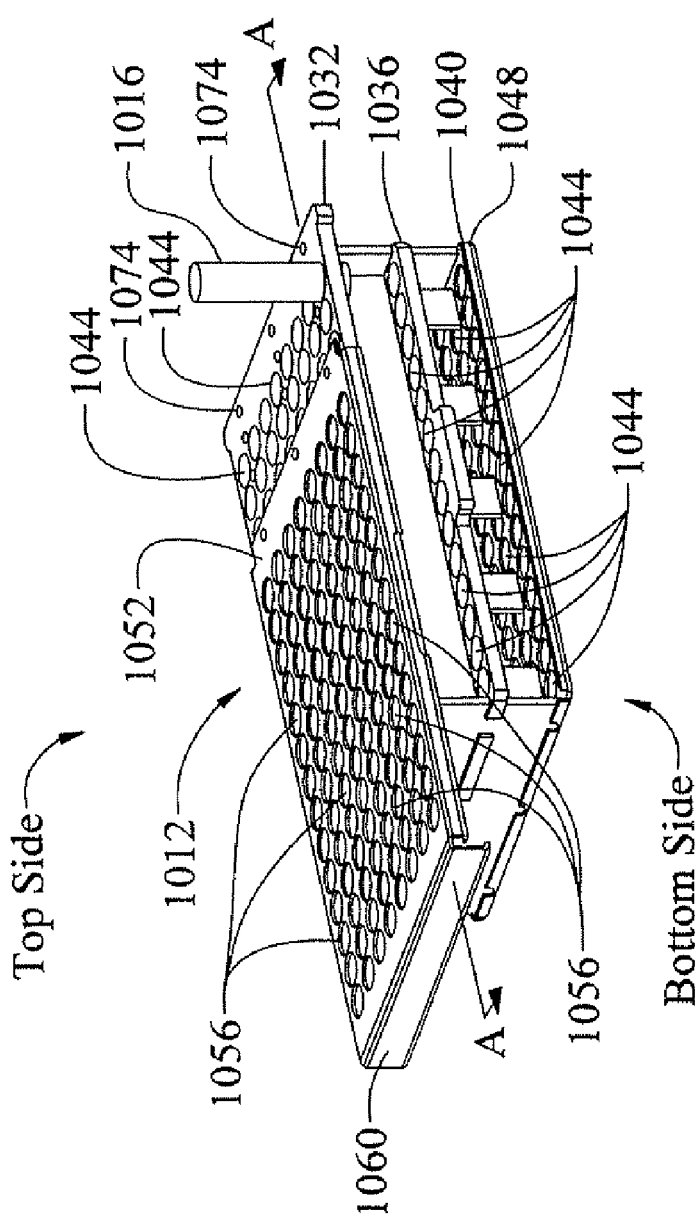
FIG. 41 is an isometric view of the seed rack shown in FIG. 40, in a top-side-up position, illustrating various components of the seed rack, in accordance with various embodiments of the present disclosure.
Figure 42:
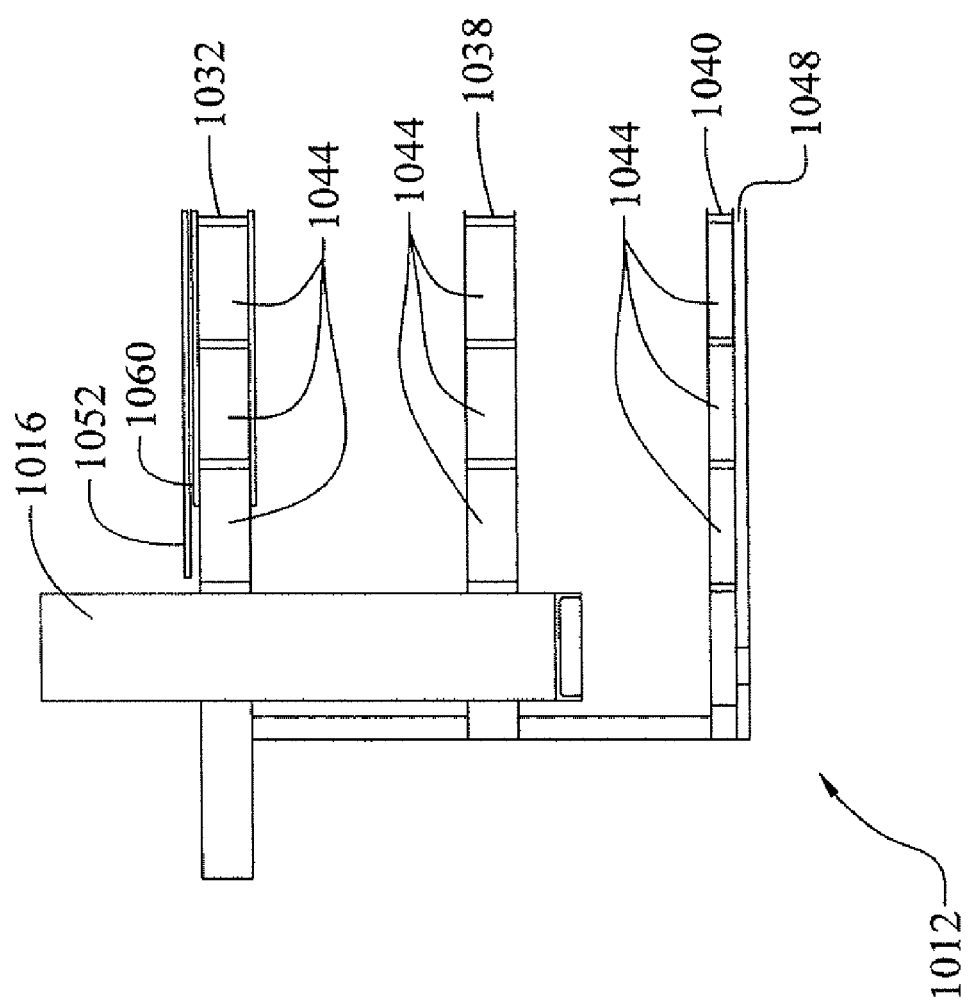
FIG. 42 is a partial sectional view of the seed rack shown in FIG. 41 along line A-A.

Generally, the seed storage system includes one or more seed racks 1012 that retain a plurality of seed receptacles 1016 (shown in FIGS. 41 and 42). The seed receptacles 1016 can be any seed containers such as vials, tubes, cups, etc., suitable for being retained within a seed rack 1012. Each seed receptacle 1016 can be pre-loaded, i.e., pre-filled, with a desired seed kind, i.e., seed of a desired, type, trait, quality, breed, size, characteristic, genotype, etc. Thus, each receptacle 1016 retained in a seed rack 1012 can be pre-loaded with a different seed kind, or groups of receptacles 1016 can be pre-loaded with the same seed kind, while other groups of receptacles 1016 can be pre-loaded with different seed kinds. Generally, the seed transport system 1008 includes an indexer 1020 mounted in a substantially horizontal plane above the seed metering system 806. The seed transport system 1008 additionally includes a funnel 1024 mounted to a bottom of the indexer 1020 and a transfer tube 1028 connecting a bottom of the funnel 1024 to the seed inlet 808 of the seed metering system 806.

In general operation, the seed storage unit 1004 is engaged with the seed transport system 1008, e.g., a seed rack 1012 retaining one or more pre-loaded seed receptacles 1016 is engaged with indexer 1020, and the indexer 1020 is controlled to selectively release seeds from one or more desired seed receptacles 1016 into the funnel 1024. Via gravity or forced air, the released seeds are funneled into the transfer tube 1028 where the seeds, via gravity or forced air, are transferred into the seed metering system 806 at inlet 808. The seeds are then singulated and dispensed at a desired rate, as described above. Accordingly, each planting unit 788 can independently control the kind and rate of seeds dispensed by each respective seed metering system 806 and planted by the respective planting unit 788 as the planter assembly 606 traverses a field. More particularly, each planting unit 788 can independently control and independently change or alter the kinds and spacing of seeds dispensed by each respective seed metering system 806 and planted by the respective planting unit 788 as the planter assembly 606 traverses a field.

Figure 40:
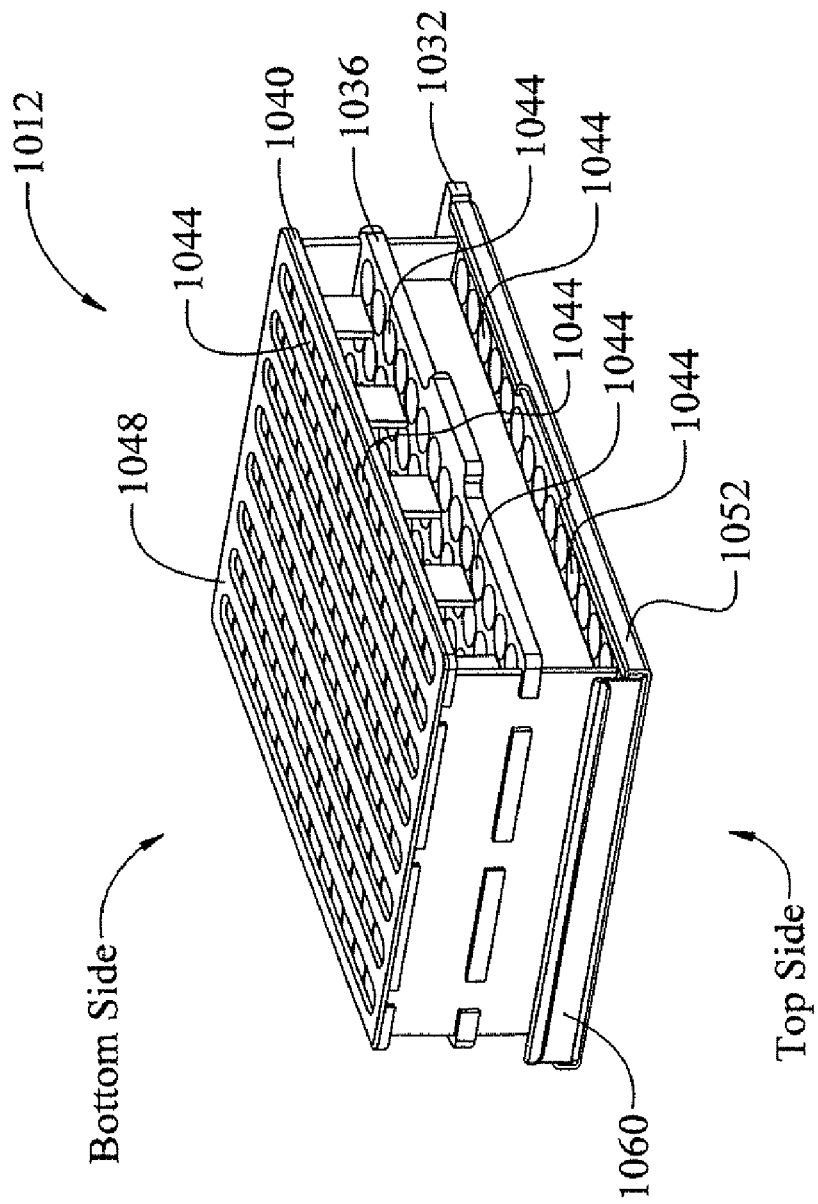
FIG. 40 is an isometric view of a seed rack of the seed storage system shown in FIG. 39, shown in a bottom-side-up position, in accordance with various embodiments of the present disclosure.

Referring now to FIGS. 40, 41 and 42, in various embodiments, each seed rack 1012 includes a top plate 1032, a middle plate 1036 and a bottom plate 1040 each having a plurality of concentrically aligned holes 1044. Each set of concentrically aligned holes 1044 are sized and adapted to retain a respective one of a plurality of seed receptacles 1016. That is, each set of concentrically aligned holes 1044 are substantially equal in size and shape and formed to accommodate and retain a respective one of the seed receptacles 1044. More particularly, each of a plurality of seed receptacles 1016 can be pre-loaded with a desired quantity and kind of seed and 'loaded' into the seed rack 1012, i.e., retained in a respective set of concentrically aligned holes 1044. Each seed rack 1012 additionally includes a cap plate 1048 coupled to the bottom plate 1040 such that the cap plate 1048 covers at least a portion of each hole 1044 in the bottom plate 1040, thereby preventing each of the seed receptacles 1016 from sliding completely through the holes 1044 in the bottom plate 1040. Thus, each seed receptacle 1016 is retained within the respective set of concentrically aligned holes 1044 by a bottom of each seed receptacle resting on the cap plate 1048.

Each seed rack 1012 further includes a seed receptacle retainer panel 1052 slidingly coupled to the top plate 1032. The retainer panel 1052 includes a plurality of holes 1056 equal in number and spacing to the number and spacing of holes 1044 in the top plate 1032. Additionally, the retainer panel holes 1056 are formed to have substantially the same shape as the top plate holes 1044, but have a slightly smaller cross-sectional area. That is, the retainer panel holes 1056 are the same shape as, but slightly smaller than, the top plate holes 1044. The retainer panel 1052 can be slid, or moved, between an 'Open' position, where each of the top plate holes 1044 are accessible for inserting a respective seed receptacle 1016, and a 'Closed' position, where the retainer panel 1052 covers the top plate 1032 and the retainer panel holes 1056 align with the top plate holes 1044. With the retainer panel 1052 in the Closed position, the seed rack 1012 can be turned over, or top-side-down, such that the bottom plate 1040 is physically above the top plate 1032, and the retainer panel 1052 will prevent any seed receptacles within the concentrically aligned holes 1044 from falling out of the concentrically aligned holes 1044. More particularly, as described below, with the retainer panel 1052 in the Closed position, the seed rack 1012 can be turned over such that seed in the respective seed receptacles 1016 will be allowed to fall out of the seed receptacles 1016 through the retainer panel holes 1056, but the seed receptacles 1016 will be retained within the concentrically aligned holes 1044.

Each seed rack 1012 still further includes a sluice panel 1060 that can be slidingly inserted between the seed receptacle retainer panel 1052 and the top plate 1032. The sluice panel 1060 is a solid panel such that when positioned between retainer panel 1052 and the top plate 1032 seed can not fall out of the seed receptacles 1016 if the seed rack 1012 is placed in the top-side-down orientation. As described below, during operation of the respective planting unit 788, the sluice plate 1060 is removed to allow the seed in each of the seed receptacles to be controllably dispensed by the seed metering system.

Figure 43:
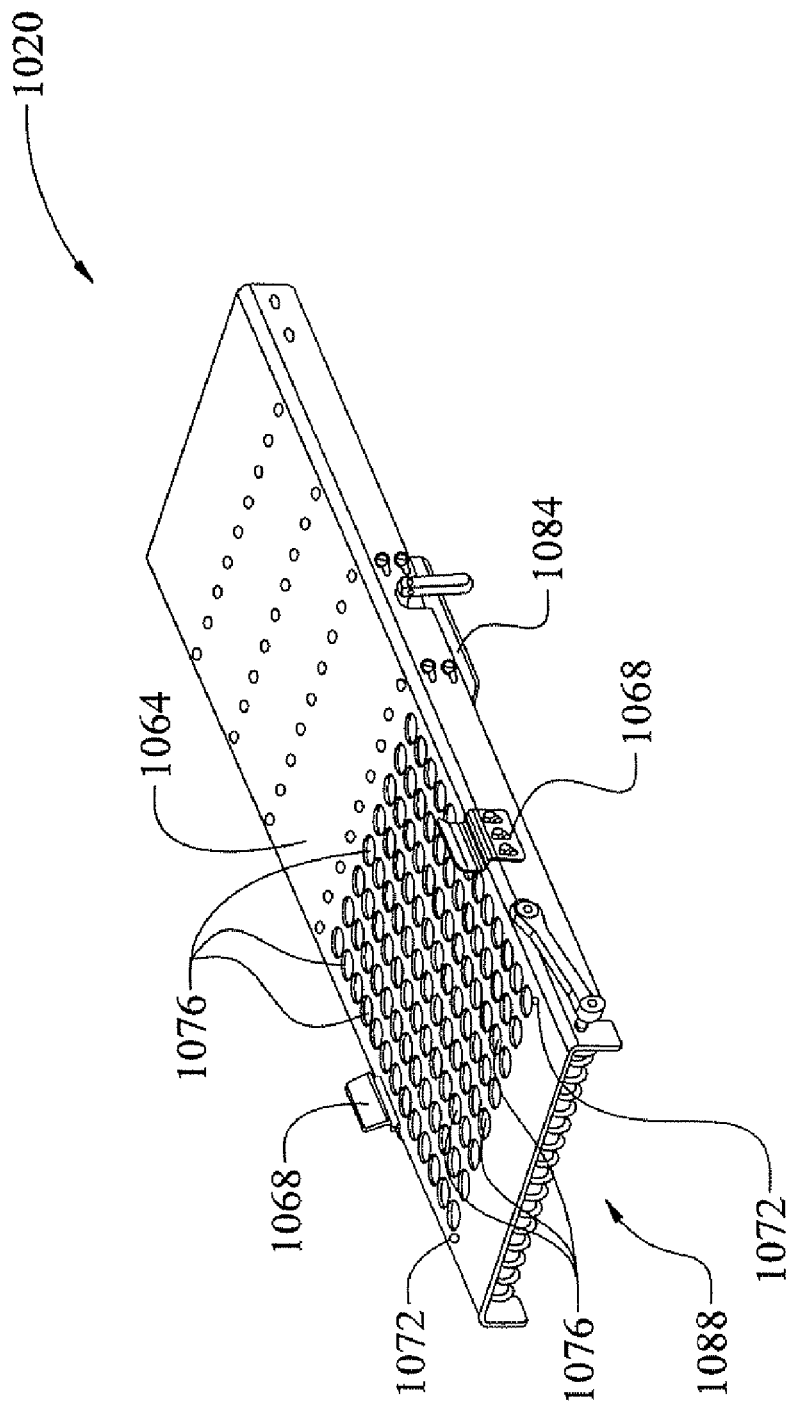
FIG. 43 is an isometric view of an indexer included in the seed transfer system of the planting unit, shown in FIG. 39, in accordance with various embodiments of the present disclosure.
Figure 44:
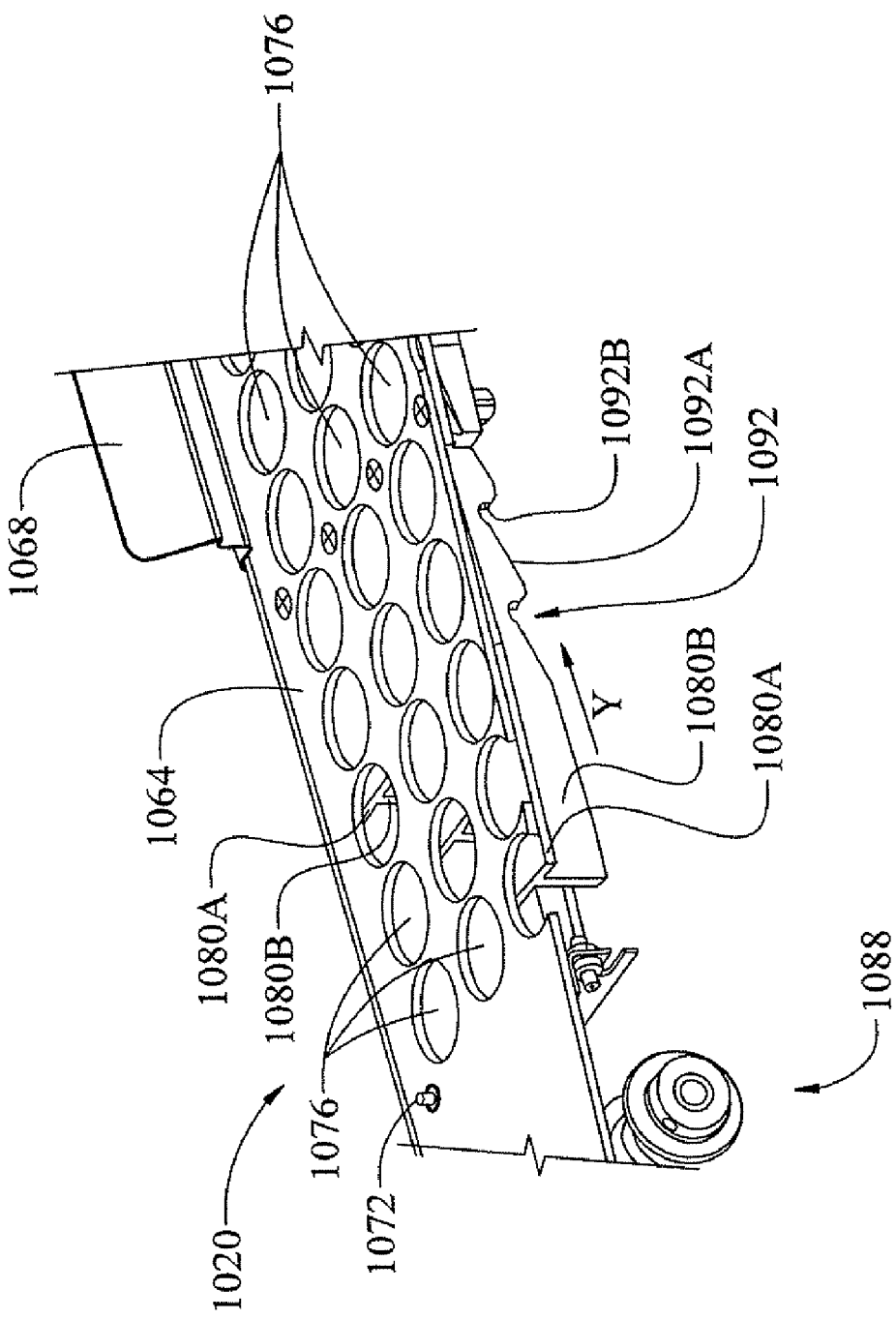
FIG. 44 is a cross-sectional view of a portion of the indexer shown in FIG. 43, in accordance with various embodiments of the present disclosure.
Figure 45:
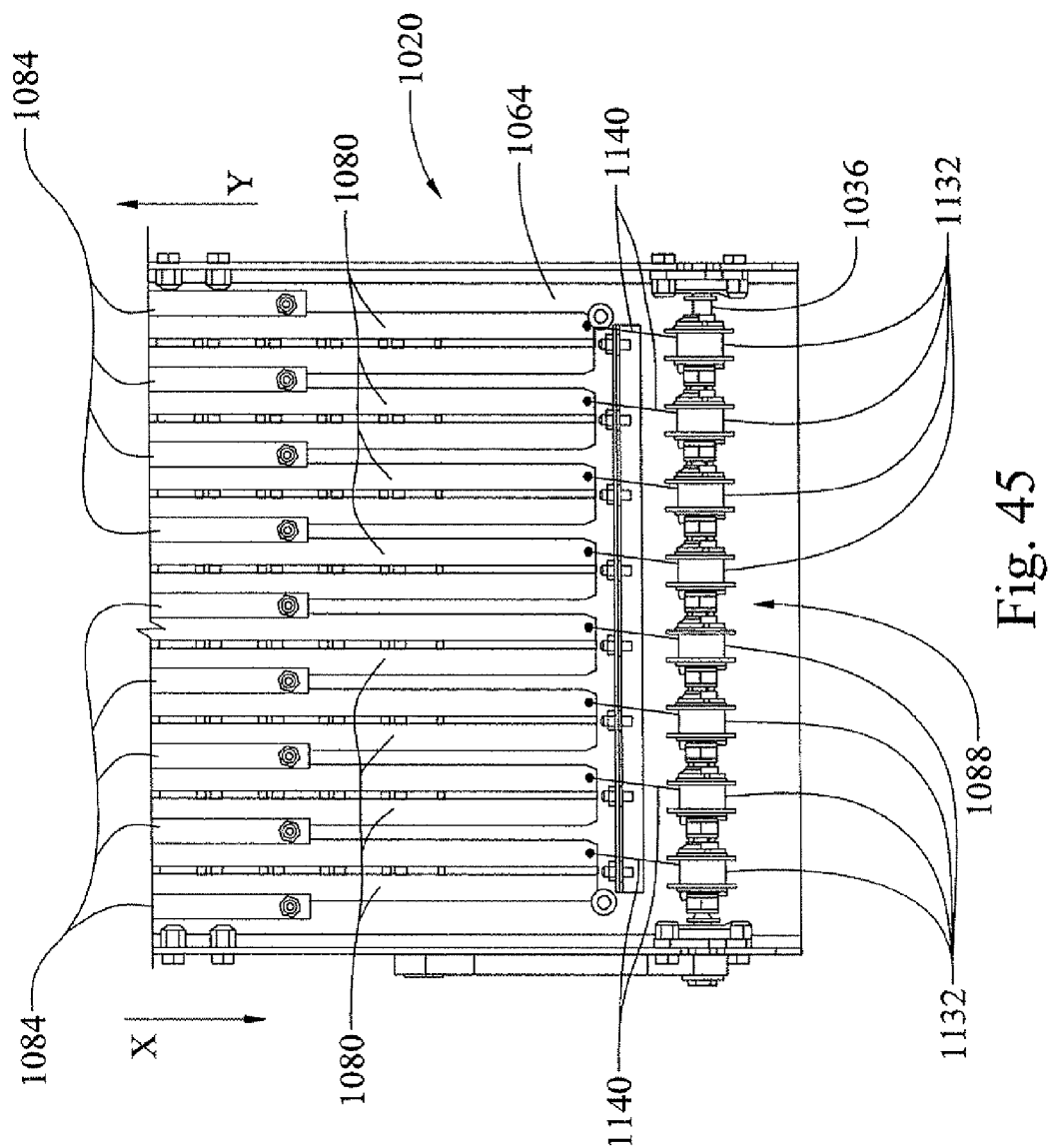
FIG. 45 is a partial bottom view of the indexer shown in FIG. 43, in accordance with various embodiments of the present disclosure.

Referring now to FIGS. 43, 44 and 45, in various embodiments, the indexer 1020 includes a base platform 1064 having one or more seed rack retaining devices 1068 mounted thereto. The seed rack retaining devices 1068 can be any device suitable for removably retaining one or more seed racks 1012 in a desired position on the base platform 1064. For example, in various embodiments, the seed rack retaining devices 1068 can be a pair of spring clips mounted to opposing sides of the base platform 1064 that are biased to removably retain a seed rack 1012. That is, the spring clips can have force applied opposing the biasing of the spring clips to allow the respective seed rack 1012 to be positioned on the base platform 1064. The force can then be released such that the spring clips engage the top plate 1032 of the respective seed rack 1012 to firmly retain the seed rack 1012 on the base platform 1064, as illustrated in FIG. 39. In other exemplary embodiments, the seed rack retaining devices can be spring-loaded pins, threaded fasteners, snapping fasteners, claming fasteners, etc. Additionally, in various embodiments, the base platform 1064 can include one or more indexing pins 1072 that mate with indexing apertures 1074 (FIG. 41) in the top plate 1032 of the seed rack 1012.

The base platform 1064 includes a plurality of holes 1076 arranged in columns longitudinally along a portion of the base platform 1064. In various embodiments, the base platform holes 1076 are equal in number and spacing to the number and spacing of holes 1044 in the top plate 1032. Therefore, the base platform holes 1076 will substantially concentrically align with the concentrically aligned seed rack holes 1044. And more particularly, if a seed rack 1012 is turned bottom-side-up and properly positioned and retained on the base platform 1064, the base platform holes 1076 will align with the seed receptacles 1016 retained in the seed rack holes 1044. The indexer 1020 additionally includes a plurality of seed dispensing control bars 1080 slidingly mounted to a bottom of the base platform 1064 via guides 1084 connected to the base platform 1064. Each control bar 1080 generally has a 'T' cross-section having a top rail 1080A a notched ratchet vane 1080B. The number of control bars 1080 is equal in number to the number of columns of base platform holes 1076. Specifically, the control bars 1080 are longitudinally slidingly mounted to the bottom of the base platform 1064 such that each control bar 1080 is collinear with a respective column of base platform holes 1076. More particularly, each control bar 1080 can be independently, controllably, bidirectionally moved along the length of the base platform 1064, as described below, to cover and uncover each of the base platform holes 1076 in the respective corresponding column of holes 1076.

Figure 46:
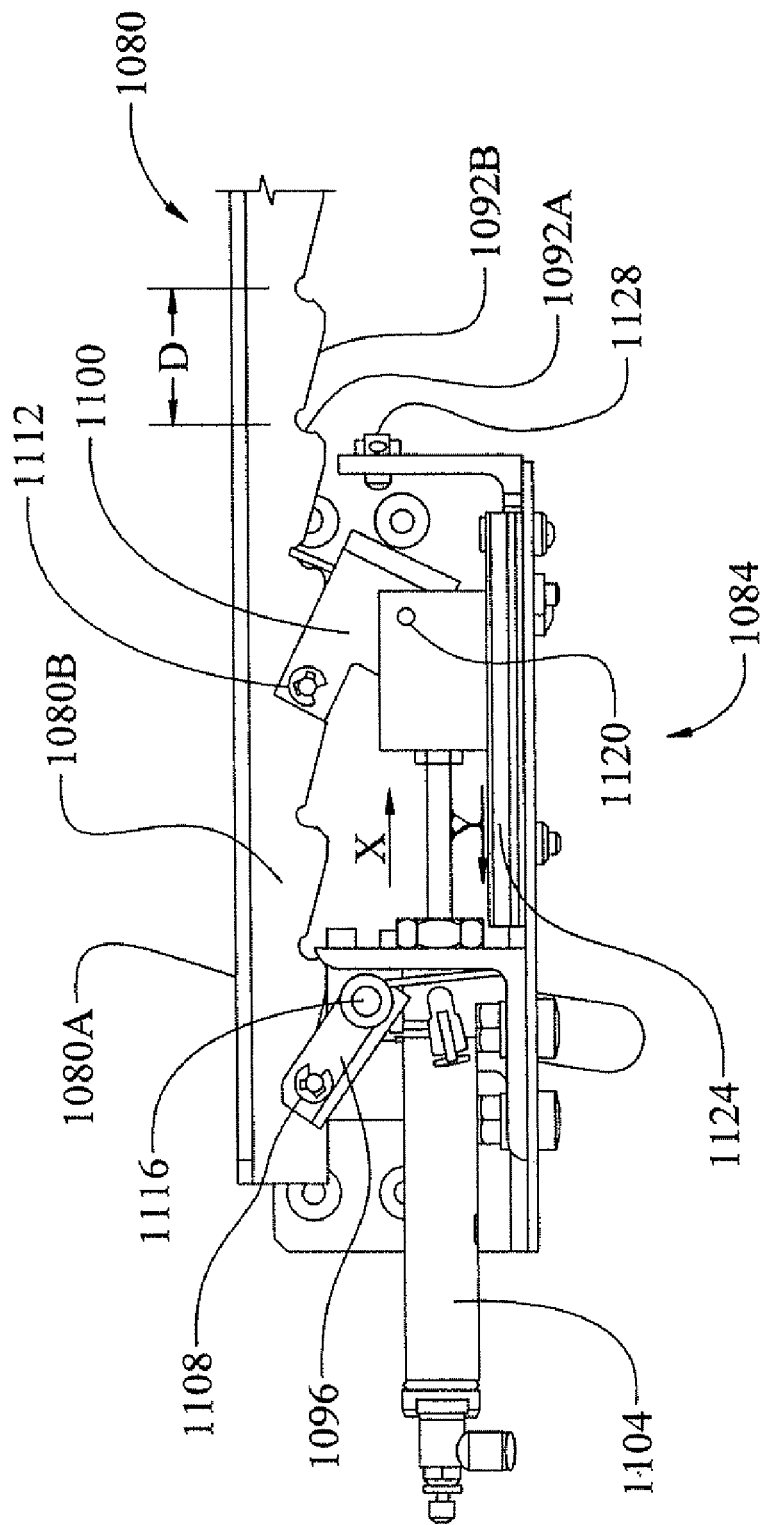
FIG. 46 is side view of one of a plurality of indexing mechanisms of the indexer shown in FIG. 43, in accordance with various embodiments of the present disclosure.

With additional reference to FIG. 46, in various embodiments, to independently, controllably, bidirectionally, move each of the control bars 1080, the indexer 1020 includes a plurality of indexing mechanisms 1084 and a rewind mechanism 1088 mounted to the bottom of the base platform 1064. More particularly, the indexer 1020 includes a separate and independent indexing mechanism 1084 for each control bar 1080. For example, if the indexer 1020 includes eight columns of base platform holes 1076, the indexer 1020 would also include eight control bars 1080 and eight indexing mechanisms 1084. Each indexing mechanism 1084 is operable to incrementally move a respective one of the control bars 1080 along the length of the base platform 1064 in a first direction to sequentially uncover, or open, each of the base platform holes 1076 in the respective column of holes 1076. That is, each indexing mechanism 1084 is operable to incrementally move the respective control bar 1080 such that the top rail 1080A of the respective control bar 1080 is sequentially moved from under each base platform hole 1076 in the respective column of holes 1076, thereby controllably uncovering, or opening, the holes 1076. The rewind mechanism 1088 is operable to move each of the control bars 1080 along the length of the base platform 1064 in a second direction, opposite the first direction, to return each control bar 1080 to a 'home' position where the top rail 1080A of each control bar 1080 covers, or closes, all the base platform holes 1076 in the respective column of holes 1076. As best illustrated in FIGS. 44 and 46, each control bar ratchet vane 1080B includes a plurality of angled notches 1092 formed along a bottom edge of the respective ratchet vane 1080B. Each notch 1092 includes a sloped leading edge 1092A and a hooked, or blocked, trailing edge 1092B.

Referring to FIG. 46, each indexing mechanism 1084 includes a biased fixed pawl 1096 and a biased slider pawl 1100 coupled to a slider pawl actuator 1104. The fixed and slider pawls 1096 and 1100 can be biased using any suitable biasing device such as a torsion spring, a leaf spring, extension spring, applied pneumatic or hydraulic force, etc.

Although the indexer 1020 includes a plurality of indexing mechanisms 1084, i.e., one for each control bar 1080, each indexing mechanism 1084 is substantially identical in form and function. Thus, for simplicity and clarity only a single indexing mechanism 1084 will be described herein and illustrated in FIG. 46. The indexing mechanism 1084 is mounted to the base platform 1020 such that fixed pawl 1096, slider pawl 1100 and actuator 1104 are positioned adjacent the notches 1092 of the respective control bar ratchet vane 1080B. The fixed pawl 1096 and the slider pawl 1100 respectively include clevis pins 1108 and 1112 sized to fit within the notches 1092. Additionally, the fixed pawl 1096 and the slider pawl 1100 are each biased to pivot around shafts 1116 and 1120, respectively, such that force is constantly applied to push the respective clevis pins 1108 and 1112 in contact with control bar ratchet vane 1080B. More particularly, the fixed pawl 1096 and the slider pawl 1100 are each biased such that the respective clevis pins 1108 and 1112 forcibly engage the notches 1092 as the indexing mechanism is operated, as described below.

The slider pawl actuator 1104 is controllable to bidirectionally reciprocate the slider pawl 1100 along a slider pawl track 1124 in the X and Y directions. Accordingly, in operation, the actuator 1104 can be extended in the X direction to move the slider pawl 1100 in the X direction. As the slider pawl 1100 moves in the X direction, slider pawl clevis pin 1112 is pushed against and along the trailing edge 1092A of the 'active notch' 1092, i.e., the notch 1092 with which the clevis pin 1112 is presently engaged. As the clevis pin 1112 is pushed along the trailing edge 1092A of the 'active' notch a force is applied to the slider pawl 1100 that is counter, or adverse, to the biasing force on the slider pawl 1100, thereby pivoting the slider pawl 1100 about the shaft 1120. As the actuator 1104 reaches the end of its stroke, the slider pawl 1100 contacts a slider pawl release 1128, e.g., a bolt or pin, that forces the slider pawl 1100 to further pivot about the shaft 1120 counter to the biasing force. More specifically, contacting the slider pawl release 1128 disengages the slide pawl clevis pin 1112 from the control bar ratchet vane 1080B. Additionally, the indexing mechanism 1084 is structured, and the actuator 1104 is calibrated, such that the stroke of actuator 1104 will travel a distance in the X direction that is slightly greater than a distance D between notches 1092. Accordingly, fully extending the actuator 1104 in the X direction will disengage the slide pawl 1100 from the 'active' notch 1092 and position the slider pawl clevis pin past the trailing edge 1092B of a 'subsequent' notch 1092, i.e., the next notch 1092 on the control bar ratchet vane 1080B in the X direction.

As the actuator 1104 is reciprocated in the Y direction, the slider pawl release 1128 disengages from the slider pawl 1100 and the biasing force of the slider pawl 1100 forces the slider pawl clevis pin 1112 into contact with the 'subsequent' notch 1092, which then becomes the 'active' notch 1092. As the actuator 1104 continues to travel in the Y direction, the slider pawl clevis pin 1112 engages the trailing edge of the 'active' notch 1092 moving the entire control bar in the Y direction (also shown in FIG. 44). Thus, the controlled reciprocating movement of the actuator 1104 operates the slider pawl 1100 in a ratchet fashion to incrementally move the control bar 1080 in the Y direction, each incremental movement equaling the distance D.

Additionally, as the slider pawl 1120 moves the control bar 1080 in the Y direction, the leading edge 1092A of a 'locking' notch 1092, i.e., the notch in which the fixed pawl clevis pin 1108 is presently engaged, is moved along the fixed pawl clevis pin 1108. The biasing force of the fixed pawl 1096 maintains the fixed pawl clevis pin 1108 in contact with the 'locking' notch 1092 leading edge until the actuator 1104 and slider pawl 1100 have moved the control bar 1080 the incremental distance D. Accordingly, as the actuator 1104 reaches the end of its stroke in the Y direction, the fixed pawl clevis pin 1108 passes the junction of the leading edge 1092A of a 'locking' notch and the trailing edge of the 'subsequent' notch 1092, i.e., the next notch 1092 on the control bar ratchet vane 1080B in the X direction. The biasing force of the fixed pawl 1096 will then force the fixed pawl clevis pin 1108 into the 'subsequent' notch 1092, which then becomes the 'locking' notch 1092. The fixed pawl 1096 prevents the control bar 1080 from moving in the X direction due to frictional force in the X direction of the slider pawl clevis pin 1112 along the leading edge 1092A of the 'active' notch 1092 as the actuator 1104 moves the slider pawl 1100 in the X direction, as described above. Thus, with the fixed pawl 1096 engaged in the 'locking' notch 1092, the control bar 1080 can only move in the Y direction.

Referring now to FIGS. 44 and 46, FIG. 44 is a cross-sectional view of a portion of the indexer 1020 illustrating portions of three columns of base platform holes 1076 and the three corresponding control bars 1080 at different longitudinal positions along the indexer base platform 1064. Particularly, FIG. 46 illustrates each of the control bars 1080 having been independently moved by the respective three independently controlled indexing mechanisms 1084, as described above, to different positions, such that various different base platform holes 1076 are uncovered, or opened. It should be noted that each of the control bars 1080 are illustrated in FIG. 44 to be positioned such that approximately one-half of hole 1076 in each column of holes 1076 is uncovered. This is primarily for illustrative purposes to clearly show that, in accordance with various embodiments, each of the control bars 1080 corresponding to each column of holes can be independently positioned by the respective independently controlled indexing mechanisms 1084. In normal operation, each control bar 1080 will be incrementally moved the distance D between the notches 1092 such that each of the respective base platform holes 1076 or either completely open or completely closed. Thus, holes 1076 would generally only be half open or closed, as exemplarily illustrated, during movement of the control bars 1080

Referring now to FIGS. 44 and 45, as described above, the rewind mechanism 1088 is operable to move each of the control bars 1080 along the length of the base platform 1064 in the Y direction to return each control bar 1080 to a 'home' position where the top rail 1080A of each control bar 1080 closes, or covers, all the base platform holes 1076 in the respective column of holes 1076. In various embodiments, the rewind mechanism 1088 includes a plurality of tensioning/rewind (T/R) spools 1132 mounted on a rewind mechanism shaft 1136 that is rotationally mounted to the base platform 1064. More particularly, each T/R spool 1132 is mounted on the shaft 1036 such that each T/R spool 1132 can rotate on the shaft 1036 in a first direction having a slight oppositional force to the rotation in the first direction, e.g., frictional resistance to the rotation. However, the T/R spools 1132 will be tied or bound to the shaft 1036, e.g., frictionally bound to the shaft 1036, in a limited-slip manner when the shaft is rotated in a second direction opposite the first direction. Furthermore, in various embodiments, the shaft 1036 is mounted to the base platform 1064 such that the shaft 1036 can be locked, or prevented, from rotating in the first direction such that the shaft 1036 can only be rotated in the second direction.

Each T/R spool 1132 is connected to a respective one of the control bars 1080 via a tether line 1140 that can be wound around the respective T/R spool to move the respective control bars 1080 to the home position. FIG. 45 illustrates each of the control bars 1080 in the home position. The tether lines 1140 can be any type of tether line suitable for winding around the respective T/R spools 1132, such as wire, cable, string, thread, nylon line, etc. As described above, the rewind mechanism 1088 is structured such that the T/R spools 1132 have slightly opposed rotation in the first direction. More specifically, each T/R spool 1132 will be rotated in the first direction, via the respective tether line 1140, as the corresponding control bar 1080 is advanced in the Y direction by the respective indexing mechanism 1084, as described above. The opposed rotation of the T/R spools 1132 in the first direction will maintain tension of the tether lines 1140. The tension on the tether lines 1140 maintains the 'locking' notch 1092 and 'active' notch 1092 of each control bar 1080 firmly engaged with the respective fixed and slider pawl clevis pins 1108 and 1112. Therefore, each control bar 1080 is firmly retained in each commanded position by the tension in the respective tether line 1140 as each control bar 1080 is incrementally advanced in the Y direction to open the respective base platform holes 1076.

As described above, when the shaft 1036 is rotated in the second direction, the T/R spools 1132 will be tied or bound to the shaft 1036 in a limited-slip manner. For example, each T/R spool 1132 can be frictionally mounted on the shaft 1036 utilizing a clutch-type device, system or mechanism, or mounted to the shaft 1036 utilizing a biased recoil device, system or mechanism, i.e., a spring biased recoil device, system or mechanism. Accordingly, the shaft 1036 can be rotated in the second direction to move the control bars 1080 in the X direction and return the control bars 1080 to the home position. The shaft 1036 can be rotated in the second direction using any suitable rotating means. For example, the shaft 1036 can be rotated in the second direction by hand or by an automated means such as motor mounted to the shaft 1036 or an automated hand tool, e.g., a battery operated hand tool, that can be removably coupled to the shaft 1036.

Figure 47:
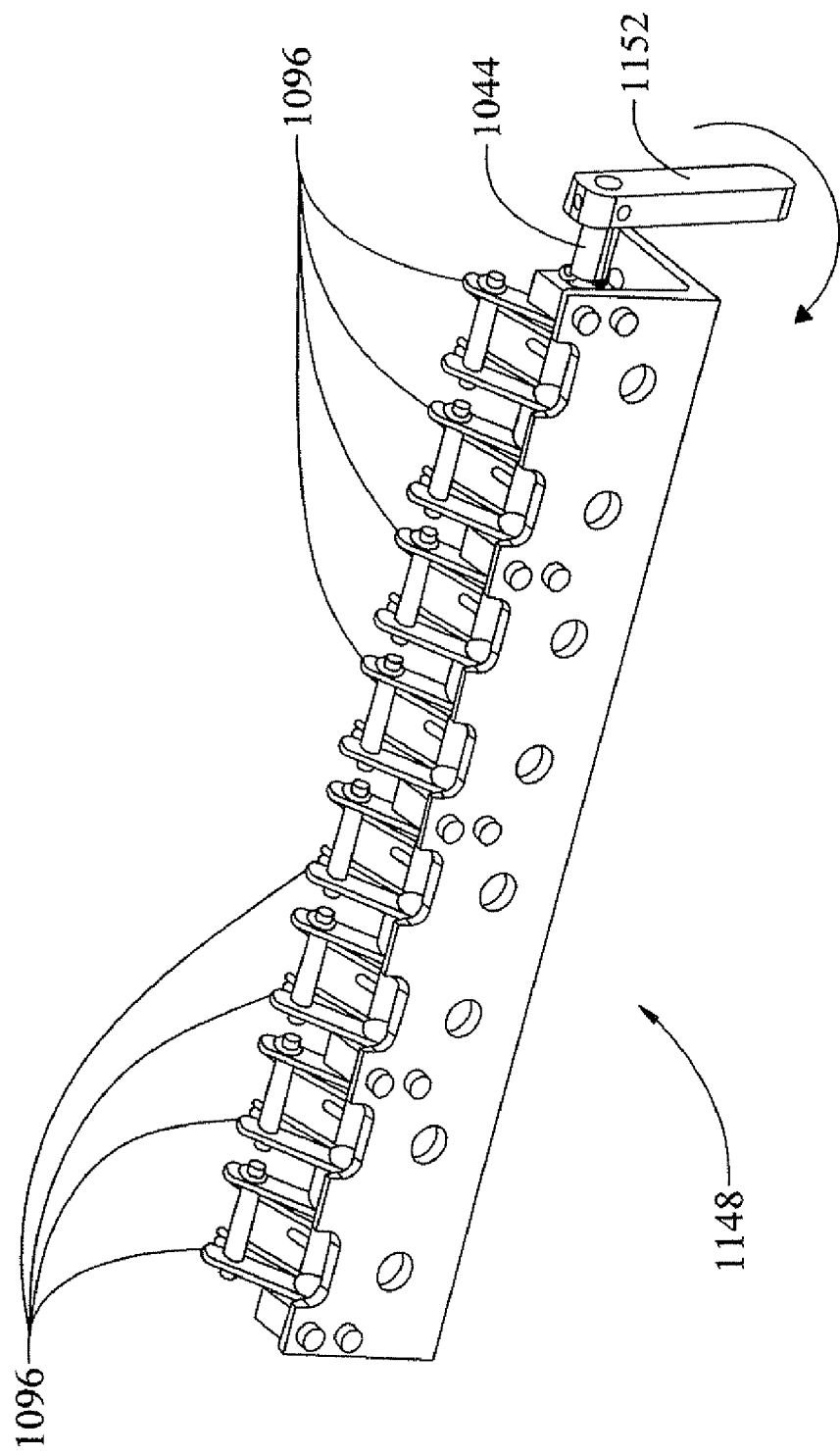
FIG. 47 is an isometric view of a fixed pawl assembly of the indexer shown in FIG. 43, in accordance with various embodiments of the present disclosure.

Referring now to FIGS. 43, 45 and 47, in various embodiments, each of the fixed pawls 1096 are mounted on a fixed pawl shaft 1144 of a fixed pawl assembly 1148 that is mounted to the base platform 1064. The fixed pawl assembly 1148 additionally includes a disengaging lever 1152 fixedly coupled to the fixed pawl shaft 1144. As described above, each fixed pawl 1096 is biased to firmly engage the 'locking' notches 1092 of the respective control bars 1080 to prevent the control bars 1080 from moving in X direction. Thus, the control bars 1080 can not be moved in the X direction and returned to the home position until each of the fixed pawls 1096 are disengaged from the respective 'locking' notches 1092. Therefore, in various embodiments, the fixed pawls 1096 are mounted on the fixed pawl shaft 1144 such that pivoting, or turning, the disengaging lever 1152, will rotate each of the fixed pawls 1096 away from the respective control bars 1080 and substantially simultaneously disengage each fixed pawl 1096 from the respective 'locking' notch 1092. It is envisioned that the disengaging lever 1152 can be manually and/or automatically pivoted to disengage the fixed pawls 1096.

Accordingly, in various embodiments, to return, or move, each of the control bars 1080 to the home position, the fixed pawls 1096 are disengaged from the 'locking' notches 1092 by pivoting the disengaging lever 1152, and the rewind mechanism 1088 is operated to recoil the tether lines 1140 about the respective T/R spools 1132, thereby pulling the control bars 1080 to the home position.

Referring now to FIGS. 39-47, the overall operation of the seed storage system 1004 and the seed transport system 1008 will now be described. One or more seed racks 1012 are loaded with seed receptacles 1016 filled with selected seed. That is, one or more seed receptacles 1016 pre-loaded, or pre-filled, with selected seeds of various kinds and are inserted into particular ones of the concentrically aligned holes 1044. Particularly, in various embodiments each set of concentrically aligned holes 1044 is given a particular location identification indicative of the location of each respective set of concentrically aligned holes 1044 within the seed rack 1012. For example, each set of concentrically aligned holes 1044 can be plotted to a particular X-Y Cartesian coordinate within the seed rack. Each of the pre-loaded seed receptacles 1016 can then be placed in particular set of concentrically aligned holes 1044 having a specific location identification, e.g., an X-Y coordinates, such that the seeds will be dispensed in a particular sequence. More specifically, the pre-loaded seed receptacles 1016 are loaded into the seed rack 1012 such that after the seed rack 1012 is mounted on the base platform 1064 with the control bars 1080 in the home position, as described below, the seed receptacle loaded with a particular seed kind that is desired to be dispensed first will be loaded into a particular set of concentrically aligned holes 1044. The particular set of concentrically aligned holes 1044 is logistically located within the seed rack 1012 to allow a respective one of the controls bar 1080 to be incremented a single distance D from the home position to open the base platform hole 1076 that corresponds to the location identification, e.g., X-Y coordinates, of the desired seed receptacle.

Once all desired seed receptacles 1016 are strategically loaded in the desired locations within the seed rack 1012, the receptacle retainer panel 1052 is installed, i.e., slidingly coupled to the seed rack top plate 1032. Subsequently, the sluice panel 1060 is installed, i.e., slid between the retainer panel 1052 and the seed rack top plate 1032. A seed rack 1012 having the pre-loaded seed receptacles 1016 logistically loaded into the concentrically aligned holes 1044 and having the receptacle retainer panel 1052 and sluice panel 1060 installed will be referred to herein as a 'packed' seed rack 1012. In the various embodiments wherein more than one planting unit 788 is utilized, e.g., planter assembly 606, a plurality of packed seed racks 1012 can be prepared. The seed racks 1012 can be packed on-site, e.g., at or near the area where the seeds are to be planted. Or, the seed racks 1012 can be packed off-site, e.g., a location remote from the area where the seeds are to be planted, and then transported to the area where the seeds are to be planted.

At the location where the seeds are to be planted, a desired packed seed rack 1012 for each planting unit 788 is turned bottom-side-up and placed on the indexer base platform 1064 of a respective planting unit 788. When in the bottom-side-up orientation, the seeds within the seed receptacles 1016 are prevented from falling out, or being removed from, the seed receptacles 1016 by the sluice panel 1060. As described above, in various embodiments, the base platform indexing pins 1072 can be engaged with the seed rack indexing apertures 1074 and the seed rack retaining device 1068 engaged with the seed rack top plate 1032 to retain the packed seed rack in a desired location and orientation on the base platform 1064. When the packed seed racks 1012 are placed, oriented and retained on the respective indexer base platforms 1064, the holes 1076 of each base platform 1064 are substantially concentrically aligned with the retainer panel holes 1056, and thus, with the seed receptacles of the respective seed rack 1012.

If the each of the control bars 1080 of the indexer base platform 1064 are not in the home position, the fixed pawl assembly 1148 is operated to disengage the fixed pawls 1096 and the rewind mechanism 1088 is operated to return all the control bars 1080 to the home position, as described above. This can be done prior to or subsequent to mounting each packed seed racks 1012 on the respective base platform 1064. Accordingly, all the base platform holes 1076 of each indexer 1020 are closed when the control bars 1080 are returned to the home position. The sluice panels 1060 of each packed seed rack 1012 can then be removed such that the seeds within each seed receptacle 1016 are prevented from falling out, or being removed from, the seed receptacles 1016 by the respective control bars 1080.

Still referring now to FIGS. 39-47, in various embodiments, each planting unit 788 can include a computer based controller 1156 that can include various computer based components such as one or more electronic data storage device for storing such things a data, algorithms, programs, lookup-tables, spread sheets, databases, etc., and a processor operable to execute various algorithms and programs. The data storage device can be any removable, external, internal or peripheral data storage device suitable for storing such things as data, algorithms, programs, lookup-tables, spread sheets, databases, etc. In various embodiments, each controller 1156 is autonomous and operates to independently and autonomously control the function and operation of the respective planting unit 788. In other various embodiments, each controller 1156 can be communicatively linked, e.g., wireless or hard wired, to a main controller (not shown). In such embodiments, the main controller can communicate with the respective controllers 1156 to independently control the function and operation of each planting unit 788. For simplicity and clarity, the operation of the planting units 788 implementing the seed storage and transport systems 1004 and 1008 will be described below as being controlled by autonomous controllers 11 56.

As described above, in various embodiments, the planter 603 and planter assembly 606 provides for and facilitates the planting of individual plots of different seed kinds in the same field. Once the seed racks are mounted on the respective indexer base platforms 1020, the planter assembly 606 can be positioned to traverse a field, for example field 900 shown in FIG. 37. Each controller 1156 can then command a specific one of the indexing mechanisms 1084 to advance the respective control bar 1080 in the Y direction the incremental the distance D. As the selected control bar 1080 is incrementally advanced in the Y direction, the base platform hole 1076 nearest the rewind mechanism 1088 in the respective column of holes 1076 will be opened, i.e., uncovered by the advanced control bar 1080, releasing the seeds from the corresponding seed receptacle 1016. The respective seed receptacle 1016 will be retained within the seed rack 1012 by receptacle retainer panel 1052 because the diameter of holes 1056 in the retainer panel 1052 is slightly smaller than the diameter of the seed receptacles 1016. The released seeds fall into the indexer funnel 1024 and via gravity or forced air, the released seeds are funneled into the transfer tube 1028 where the seeds, via gravity or forced air, are transferred into the seed metering system 806 at inlet 808. As described above, the seeds are then singulated and dispensed at a desired rate into a furrow created by the disc furrow opener 814 of the respective planting unit 788.

To control the operation of each indexer 1020, i.e., the indexing mechanism 1084 of each indexer 1020, each controller 1156 executes a planting algorithm or program. Each respective planting algorithm or program is executable to dispense the seeds from the respective seed rack 1012 in an order corresponding with the particular logistic placement of the seed receptacles 1016 within the respective seed rack 1012. That is, as described above, the seed receptacles 1016 are logistically placed within the seed rack 1012 based on the particular kind of seeds contained within the respective seed receptacles 1016. The seed receptacles 1016 are additionally placed within the seed rack 1012 in the order in which the particular seed kinds are to be dispensed and planted by the planting unit 788. The planting algorithm or program is then executed by each controller 1156 to independently control the operation of each respective indexing mechanism 1084 to dispense the seeds from the respective seed rack 1012 in a pre-planned, or pre-configured order based on the logistical placement of the seed receptacles 1016 within the seed rack 1012.

Thus, each planting unit 788 can independently control the kind and rate of seeds dispensed by each respective seed metering system 806 and planted by the respective planting unit 788 as the planter assembly 606 traverses the field. More particularly, each planting unit 788 can independently control and independently change or alter the kinds and spacing of seeds dispensed by each respective seed metering system 806 and planted by the respective planting unit 788 as the planter assembly 606 traverses a field.

In various embodiments, the seed metering system 806 can include a discard bin 1160 (FIG. 39) for collecting discarded seeds. Each seed receptacle 1016 can be filled with a greater amount of seeds than necessary to fulfill the seed requirements of the particular planting scheme. That is, each seed receptacle 1016 will contain more seeds than the particular planting algorithm or program will dispense and plant. Therefore, in various embodiments, after the a particular seed kind has been dispensed and planted in accordance with the particular planting scheme, the seed metering system 806 will evacuate any seeds remaining within the hopper 809 to the discard bin 1160. Thus, the hopper 809 is then prepared to receive a subsequent group of seeds of a different kind from the seed storage and transport systems 1004 and 1008, without commingling seed kinds.

Figure 48:
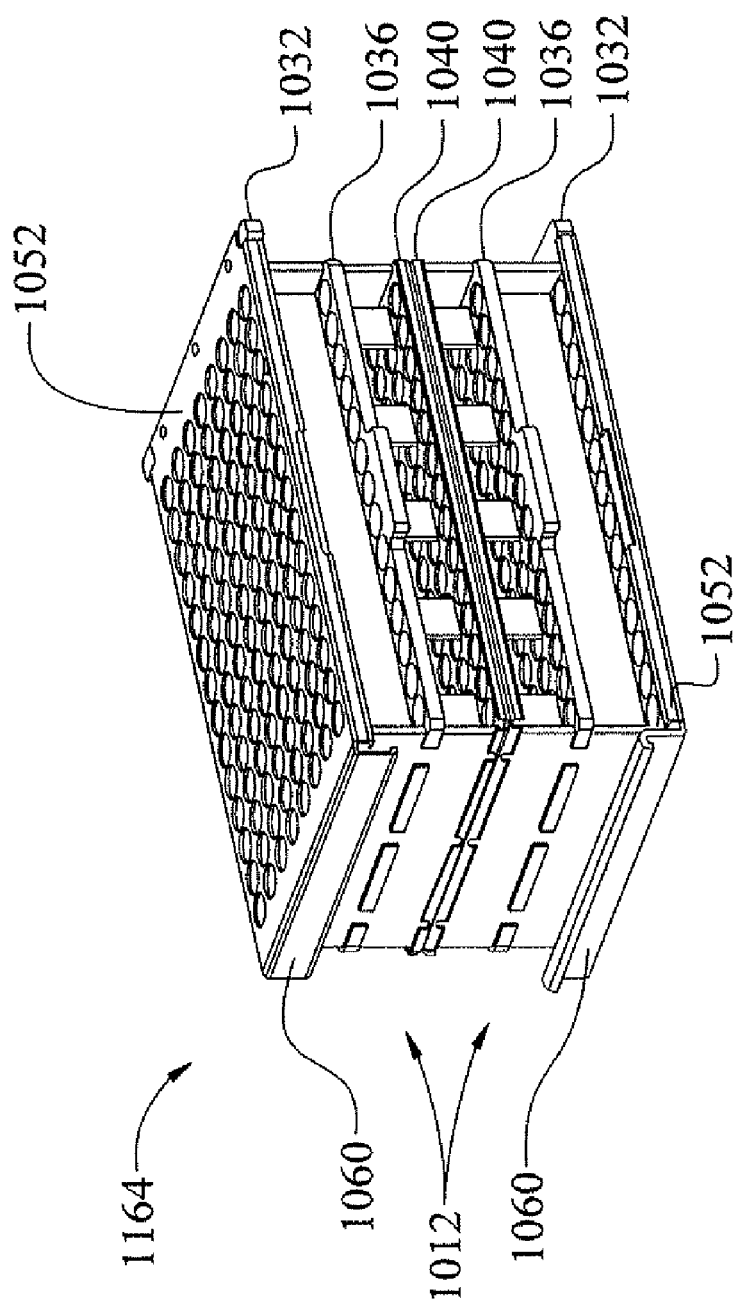
FIG. 48 is an isometric view of a multi-layer seed rack that can be implemented in the seed storage system shown in FIG. 39, in accordance with various other embodiments of the present disclosure.

Referring to FIGS. 39 and 48, in various embodiments the seed storage system 1004 can include a multi-layer (ML) seed storage rack, such as the exemplary multi-layer seed storage rack 1164 illustrated in FIG. 48. The ML seed rack 1164 can include one or more seed racks 1012 (FIG. 40) coupled together in an inverted stacked formation. That is, the ML seed rack 1164 can include a pair seed racks 1012 stacked on top of each other and coupled together in an inverted orientation such that bottom plates 1040 of the seed racks are coupled together. In such embodiments, the ML seed rack 1164 would be mounted on the indexer base platform 1020 in the same manner as described above with regard to seed rack 1012. Each seed rack 1012 within the ML seed rack 1164 includes seed receptacles 1016 logistically placed, as described above. The planting unit 788, including the seed transport system 1008 and the seed storage system 1004 incorporating the ML seed rack(s) 1164, is operated generally the same as described above with regard to the embodiments implementing the single layer seed rack 1012. However, in the embodiments implementing the ML seed rack 1164, after the controller 1156 controls the dispensing, singulating and planting of the seeds from a first one of the seed racks 1012, an operator will disengage the ML seed rack 1164 from the base platform 1064, flip the ML seed rack 1164 over, i.e., invert the ML seed rack 1134, and engage the second seed rack 1012 with the base platform 1064. The controller 1156 then controls the dispensing, singulating and planting of the seeds form the second seed rack 1012 of the ML seed rack 1164 in the same manner as described above. Thus, a greater number of plots of seed can be planted in a single planting operation utilizing the ML seed rack 1164.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A planter for planting multiple rows of seeds in a field, the planter comprising:
   multiple planting units, each planting unit structured and operable for planting a row of seeds at a planting rate in a field;
   wherein at least one of the planting units includes a seed metering system operable to adjust a planting rate of the at least one of the planting units during planting; and
   wherein at least one of the planting units is moveable relative to an adjacent planting unit, the planter being operable to move said at least one of the planting units relative to said adjacent planting unit during planting to change a spacing between said at least one of the planting units and said adjacent planting unit and to thereby change a spacing between rows of seeds planted by said at least one of the planting units and said adjacent planting unit across the field;
   whereby the planter can control a seed population planted in the field by adjusting the planting rate of at least one of the planting units during planting and/or by changing the spacing between adjacent planting units during planting.

2. The planter according to claim 1 further comprising a tool bar, and wherein at least one of the planting units is slidably mounted on the tool bar to allow the spacing between said at least one of the planting units and an adjacent planting unit to be changed.

3. The planter according to claim 2 further comprising a planting unit lift and position (PULP) assembly that is removably connectable to a vehicle, and wherein the tool bar is removably pivotally mounted to a carriage of the PULP for axial rotation.

4. The planter according to claim 3, wherein the carriage is movably mounted to a lift mast of the PULP for vertical translation along side of the lift mast.

5. The planter according to claim 2 further comprising an actuator for automatically moving said at least one of the slidably mounted planting units relative to the tool bar.

6. The planter according to claim 2 further comprising an actuator acting between the tool bar and said at least one of the slidably mounted planting units for automatically moving said planting unit relative to the tool bar, and an actuator acting between said at least one of the slidably mounted planting units and another planting unit.

7. The planter according to claim 2, wherein each planting unit includes a carriage movably mounted to the tool bar for translating the planting units along the tool bar to change the spacing between adjacent planting units, and wherein each carriage includes an alignment pin structured and operable to engage the tool bar to maintain the respective planting unit at a desired location along the tool bar.

8. The planter according to claim 7, wherein each carriage further includes a placement locking mechanism structured and operable to secure the carriage and respective planting unit in the desired location along the tool bar.

9. The planter according to claim 1, wherein each planting unit comprises a seed storage system for retaining a plurality of groups of seeds independently segregated by groups of seeds and a seed transport system structured and operable to controllably select and release the groups of seeds from the seed storage system in a desired sequence.

10. The planter according to claim 1, wherein a type of seed planted by at least one of the planting units can be changed during planting so that the type of seed in a row planted by said at least one of the planting units can be varied across the field.

11. The planter according to claim 1, wherein the planting units include a first planting unit and a second planting unit, wherein the first planting unit is configured to dispense seeds at a first planting rate and the second planting unit is configured to dispense seeds at a second planting rate different from said first planting rate.

12. The planter according to claim 1 further comprising a seed storage system configured to retain at least two different types of seeds, and a seed transport system configured to selectively feed at least one of the at least two different types of seeds to at least one of the planting units.

13. The planter according to claim 12, wherein the at least two different types of seeds include a first type of seed and a second type of seed, and wherein the seed transport system is configured to feed the first type of seed to said at least one of the planting units and then to feed the second type of seed to said at least one of the planting units.

14. The planter according to claim 1, wherein the seed metering system is configured to automatically adjust the planting rate of the at least one of the planting units during planting according to a predetermined planting plan.

15. The planter according to claim 14, wherein the predetermined planting plan is based on at least one local condition.

16. The planter according to claim 1, wherein:
   the seed metering system is configured to automatically adjust the planting rate of the at least one of the planting units during planting according to a predetermined planting plan;
   the planter is configured to automatically change the spacing between at least two planting units according to the predetermined planting plan; and
   the predetermined planting plan is based on type of seed to be planted in the field.

17. The planter according to claim 1, wherein the planter is configured to automatically change the spacing between at least two planting units during planting according to a predetermined planting plan.

18. The planter according to claim 17, wherein the predetermined planting plan is based on at least one local condition.

19. The planter according to claim 1, further comprising a positioning system for providing a position of the planter in the field, and wherein the seed metering system is configured to automatically adjust the planting rate of the at least one of the planting units according to the position of the planter in the field.

20. The planter according to claim 19, wherein the positioning system includes a global positioning system.

21. The planter according to claim 1, further comprising a positioning system for providing a position of the planter in the field, and wherein the planter is configured to automatically change the spacing between at least two of planting units according to the position of the planter in the field.

22. The planter according to claim 21, wherein the positioning system includes a global positioning system.

\* \* \* \* \*